US011890632B1

(12) United States Patent
Morris et al.

(10) Patent No.: US 11,890,632 B1
(45) **Date of Patent: *Feb. 6, 2024**

(54) VARIABLE PRESSURE REGULATORS AND ASSOCIATED METHODS

(71) Applicant: Husqvarna AB, Huskvarna (SE)

(72) Inventors: Andrew Richard Morris, Roseville, MN (US); Eric Tres Wangsgaard, Salt Lake City, UT (US); Jonathan Taylor Merrill, Victor, ID (US)

(73) Assignee: HUSQVARNA AB

( * ) Notice: Subject to any disclaimer, the term of this patent is extended or adjusted under 35 U.S.C. 154(b) by 145 days.

This patent is subject to a terminal disclaimer.

(21) Appl. No.: 17/463,307

(22) Filed: Aug. 31, 2021

Related U.S. Application Data

(63) Continuation of application No. 16/590,772, filed on Oct. 2, 2019, now Pat. No. 11,103,890.

(60) Provisional application No. 62/740,387, filed on Oct. 2, 2018.

(51) Int. Cl.
*B05B 15/74* (2018.01)

(52) U.S. Cl.
CPC .................................... *B05B 15/74* (2018.02)

(58) Field of Classification Search
CPC ..... B05B 1/3006; B05B 1/306; B05B 1/3066; B05B 3/0409; B05B 3/0418; B05B 3/0422; B05B 12/085; B05B 12/087; B05B 15/74
USPC .......................................... 239/203–206, 508
See application file for complete search history.

(56) References Cited

U.S. PATENT DOCUMENTS

| | | | |
|---|---|---|---|
| 3,948,285 A | 4/1976 | Flynn | |
| 4,479,611 A | 10/1984 | Galvis | |
| 4,681,260 A | 7/1987 | Cochran | |
| 4,913,352 A | 4/1990 | Witty | |
| 6,997,393 B1 | 2/2006 | Angold | |
| 7,438,083 B2 | 10/2008 | Feith | |
| 8,833,672 B2 | 9/2014 | Skripkar | |
| 11,103,890 B1 | 8/2021 | Morris | |
| 11,541,411 B2 * | 1/2023 | Kah, III | B05B 15/65 |

OTHER PUBLICATIONS

Dig Corporation, Adjustable Pressure Regulator, web page (online), apparently published on or before Feb. 20, 2016, retrieved from the Internet Archive on Oct. 25, 2019, from <URL: https://web.archive.org/web/20160220200842/http://www.digcorp.com/homeowner-drip-irrigation-products/adjustable-pressure-regulator> 1 Page (shown in attachment 1).

Watts, model No. 3/4 LF25AUB-Z3 shown in attachment 2 was apparently sold or offered for sale at least by Oct. 1, 2017, 1 Page.

Watts, Watts 3/4 in. Brass FPT x FPT Pressure Reducing Valve, web page (online), apparently published on or before May 24, 2014, retrieved from the Internet Archive on Oct. 25, 2019, from <URL: https://web.archive.org/web/20140524103540/http://www.homedepot.com:80/p/Watts-3-4-in-Brass-FPT-x-FPT-Pressure-Reducing-Valve-3-4-LF25AUB-Z3/202922385> 22 Pages (shown in attachment 3).

(Continued)

*Primary Examiner* — Christopher S Kim
(74) *Attorney, Agent, or Firm* — Austin Rapp

(57) ABSTRACT

A variable pressure regulator defining a distance between a proximal end of a piston and a floor of a piston seat is disclosed. Adjustment mechanisms for adjusting this distance to alter output pressure are disclosed.

20 Claims, 50 Drawing Sheets

(56) References Cited

OTHER PUBLICATIONS

Vallecitos Water District, Pressure Regulator Information, Household Water Pressure Regulators Questions and Answers, web page (online), apparently published on or before Sep. 26, 2014, retrieved from the Internet Archive on Oct. 25, 2019, from <URL: https://web.archive.org/web/20190410073502/http://www.vwd.org/departments/customer-service/pressure-regulator-information> 2 Pages (shown in attachment 4).

Notice to File Corrected Application Papers, U.S. Appl. No. 16/590,772, dated Oct. 22, 2019, 2 Pages (included as attachment 5).

Response to Notice to File Corrected Application Papers, U.S. Appl. No. 16/590,772, filed Dec. 18, 2019, 68 Pages (included as attachment 6).

Notice of Allowance and Fee(s) Due (including a Notice of Allowability section, and an Allowable Subject Matter section), U.S. Appl. No. 16/590,772, dated Apr. 21, 2021, 7 Pages (included as attachment 7).

Amendment After Allowance, U.S. Appl. No. 16/590,772, filed Jul. 15, 2021, 104 Pages (included as attachment 6).

* cited by examiner

VARIABLE PRESSURE REGULATORS AND ASSOCIATED METHODS

RELATED APPLICATIONS

The present application is a continuation application and claims priority to U.S. application Ser. No. 16/590,772, filed on Oct. 2, 2019, which is a non-provisional application of and claims priority to U.S. Provisional App. No. 62/740,387, filed on Oct. 2, 2018, which is incorporated herein by this reference.

TECHNICAL FIELD

The present invention relates generally to irrigation devices. More specifically, the present invention relates to variable pressure regulators for use in sprinklers and elsewhere.

BACKGROUND

Sprinklers are used, for example, to deliver water to a lawn or garden area. Improvements in usability, functionality, and manufacturability of sprinklers are desirable. Furthermore, improvements in usability, functionality, and manufacturability as well as ease of adjustment of variable pressure regulators used in sprinklers and elsewhere is also desirable.

SUMMARY

Embodiments of the disclosed subject matter are provided below for illustrative purposes and are in no way limiting of the claimed subject matter.

Various embodiments of a variable pressure regulator are disclosed. For example, a variable pressure regulator is disclosed. The variable pressure regulator may comprise an axial dimension and a lateral dimension. The variable pressure regulator may comprise a pressure regulator housing. A pressure regulator assembly may be disposed within the pressure regulator housing. The pressure regulator assembly may comprise a piston, a regulator spring, a spring support, and a piston seat, the piston being repositionable along the axial dimension in response to the regulator spring and fluid pressure when the variable pressure regulator is in an operational state. The piston seat may comprise one or more entry openings and a floor. The floor may comprise a proximal region. The piston may comprise a proximal end and a distal end with the proximal end being closer to the proximal region of the floor of the piston seat than the distal end along the axial dimension. The proximal region of the floor may comprise that region of the floor closest to the proximal end of the piston along the axial dimension. The regulator spring may bias the piston away from the spring support. The pressure regulator assembly may define a central passageway in fluid communication with the one or more entry openings. The pressure regulator assembly may further comprise an adjustment mechanism shaped and arranged to alter a resting axial distance intermediate the proximal end of the piston and the proximal region of the floor when the variable pressure regulator is in a resting state.

The adjustment mechanism may be selected from a group consisting of a threaded adjustment mechanism and a snap-fit adjustment mechanism.

The adjustment mechanism may be shaped and arranged to change a position of the spring support with respect to the piston seat along the axial dimension to alter the resting axial distance. The adjustment mechanism may comprise a first set of threads on the piston seat and a second set of threads on the spring support with the first and second sets of threads being in mutual engagement such that rotational movement of the piston seat relative to the spring support alters the resting axial distance.

The piston may comprise a piston body and a piston extender, and the adjustment mechanism may be shaped and arranged to change a position of the piston extender with respect to the piston body along the axial dimension to alter the resting axial distance. The adjustment mechanism may comprise a first set of threads on the piston body and a second set of threads on the piston extender with the first and second sets of threads being in mutual engagement such that rotational movement of the piston extender relative to the piston body alters the resting axial distance.

The piston seat may comprise a piston seat body and an adjustable seat floor, and the adjustment mechanism may be shaped and arranged to change a position of the adjustable seat floor with respect to the piston seat body along the axial dimension to alter the resting axial distance. The adjustment mechanism may comprise a first set of threads on the piston seat body and a second set of threads on the adjustable seat floor with the first and the second set of threads being in mutual engagement such that rotational movement of the adjustable seat floor alters the resting axial distance. The adjustable seat floor may comprise a planar end. The adjustable seat floor may further comprise the planar end disposed on a frustoconical section.

In various embodiments, a variable pressure regulator may have an axial dimension and a lateral dimension. The variable pressure regulator may comprise a pressure regulator housing. A pressure regulator assembly may be disposed within the pressure regulator housing. The pressure regulator assembly may comprise a piston, and a piston seat with the piston being movable along the axial dimension when the variable pressure regulator is in an operational state. The piston seat may comprise a floor, and the floor may comprise a proximal region. The piston may comprise a proximal end and a distal end with the proximal end being closer to the floor of the piston seat than the distal end along the axial dimension. The proximal region of the floor may comprise that region of the floor closest to the proximal end of the piston along the axial dimension. The pressure regulator assembly may further comprise an adjustment mechanism shaped and arranged to alter a resting axial distance intermediate the proximal end of the piston and the proximal region of the floor when the variable pressure regulator is in a resting state.

The adjustment mechanism may be selected from a group consisting of a threaded adjustment mechanism and a snap-fit adjustment mechanism.

The variable pressure regulator assembly may further comprise a regulator spring and a spring support. The regulator spring may bias the piston away from the spring support. The piston may be movable along the axial dimension in response to the regulator spring and fluid pressure when the variable pressure regulator is in the operational state. The adjustment mechanism may be shaped and arranged to change a position of the spring support with respect to the piston seat to alter the resting axial distance. The adjustment mechanism may comprise a first set of threads on the piston seat and a second set of threads on the spring support with the first and second sets of threads being in mutual engagement such that rotational movement of the piston seat relative to the spring support may alter the resting axial distance.

The piston may comprise a piston body and a piston extender, and the adjustment mechanism may be shaped and arranged to change a position of the piston extender with respect to the piston body along the axial dimension to alter the resting axial distance. The adjustment mechanism may comprise a first set of threads on the piston body and a second set of threads on the piston extender with the first and second sets of threads being in mutual engagement such that rotational movement of the piston extender relative to the piston body may alter the resting axial distance.

The piston seat may comprise a piston seat body and an adjustable seat floor. The adjustment mechanism may be shaped and arranged to change a position of the adjustable seat floor with respect to the piston seat body along the axial dimension to alter the resting axial distance.

Various embodiments of associated methods are disclosed. The variable pressure regulator may comprise a keying shape for receiving and engaging a tool with the keying shape being disposed on a user-adjustable portion of the adjustment mechanism. For example, a method may comprise positioning the tool to engage the keying shape and employing the engagement between the tool and the keying shape, to adjust a position of the user-adjustable portion of the adjustment mechanism to alter the resting axial distance.

The positioning the tool to engage the keying shape may comprise orienting the tool in a first orientation to engage the keying shape.

The variable pressure regulator may comprise a second keying shape for receiving and engaging the tool. The positioning the tool to engage the key may comprise orienting the tool in a second orientation different from the first orientation to engage the second keying shape.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

Figure 1:
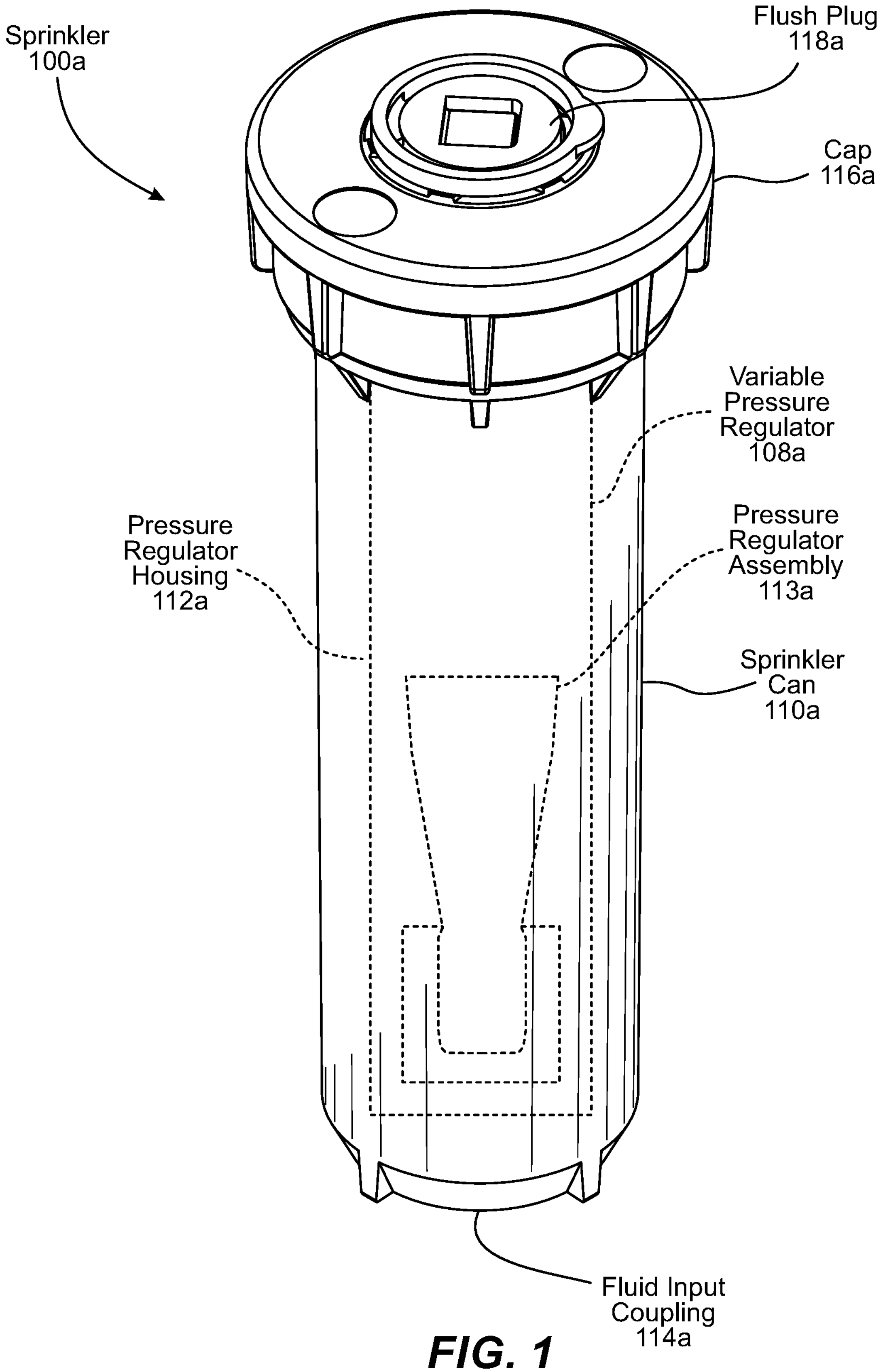
FIG. 1 is a perspective view of a first embodiment of a variable pressure regulator within a sprinkler.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. Additional definitions will be provided in the context of the discussion of the figures herein. As used herein, "exemplary" can indicate an example, an implementation, and/or an aspect, and should not be construed as limiting or as indicating a preference or a preferred implementation. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

A reference numeral without a suffix (e.g., the suffix may comprise a lowercase letter or a hyphen followed by a number) may refer to one or more of a particular item, which may include a group of items. A reference numeral with a suffix comprising a hyphen followed by a number (e.g., 110-1, 110-2, 110-3, etc.) refers to a specific one of a group of items. In this case, the reference numeral without the suffix comprising a hyphen followed by a number refers to all of the items in the group, while, when reference is made to a specific one of the items, a suffix comprising a hyphen followed by a number will be utilized. When multiple items in a group are present in a single figure, not all such items may be labeled with a reference numeral to avoid the undue proliferation of reference numerals on the figure. In addition, it should be noted that the general reference number (i.e., the reference number without a suffix) may be used in the figure and in the specification to refer to the items in the group or a reference numeral with the suffix may be used to refer to a specific item in the group. A reference numeral with a suffix comprising a lowercase letter (e.g., 100a, 100b, 100c, etc.) references an item that is a variation of or the same as one or more items bearing the same reference numeral with a different suffix (i.e., similar but not identical to the item bearing the reference numeral without the suffix). In such a case, all variations of the item bearing the same reference numeral may be referred to by use of the reference numeral without any suffix.

For this application, the phrases "secured to," "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "substantially parallel," as used herein, signifies that the pertinent members, components, or items that are "substantially parallel" to each other are within 15° of being perfectly parallel to each other.

The phrase "substantially perpendicular," as used herein, signifies that the pertinent members, components, or items that are "substantially perpendicular" to each other are within 15° of being perfectly perpendicular to each other.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The term "integrally formed" refers to a body that is manufactured integrally (i.e., as a single piece, without requiring the assembly of multiple pieces). Multiple parts may be integrally formed with each other if they are formed from a single workpiece.

As used herein, the term "shaped and arranged" or grammatical variants thereof signifies that two or more referenced components are of a physical shape and relative physical position to interact to perform a specified operation or function.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

Figure 2A:
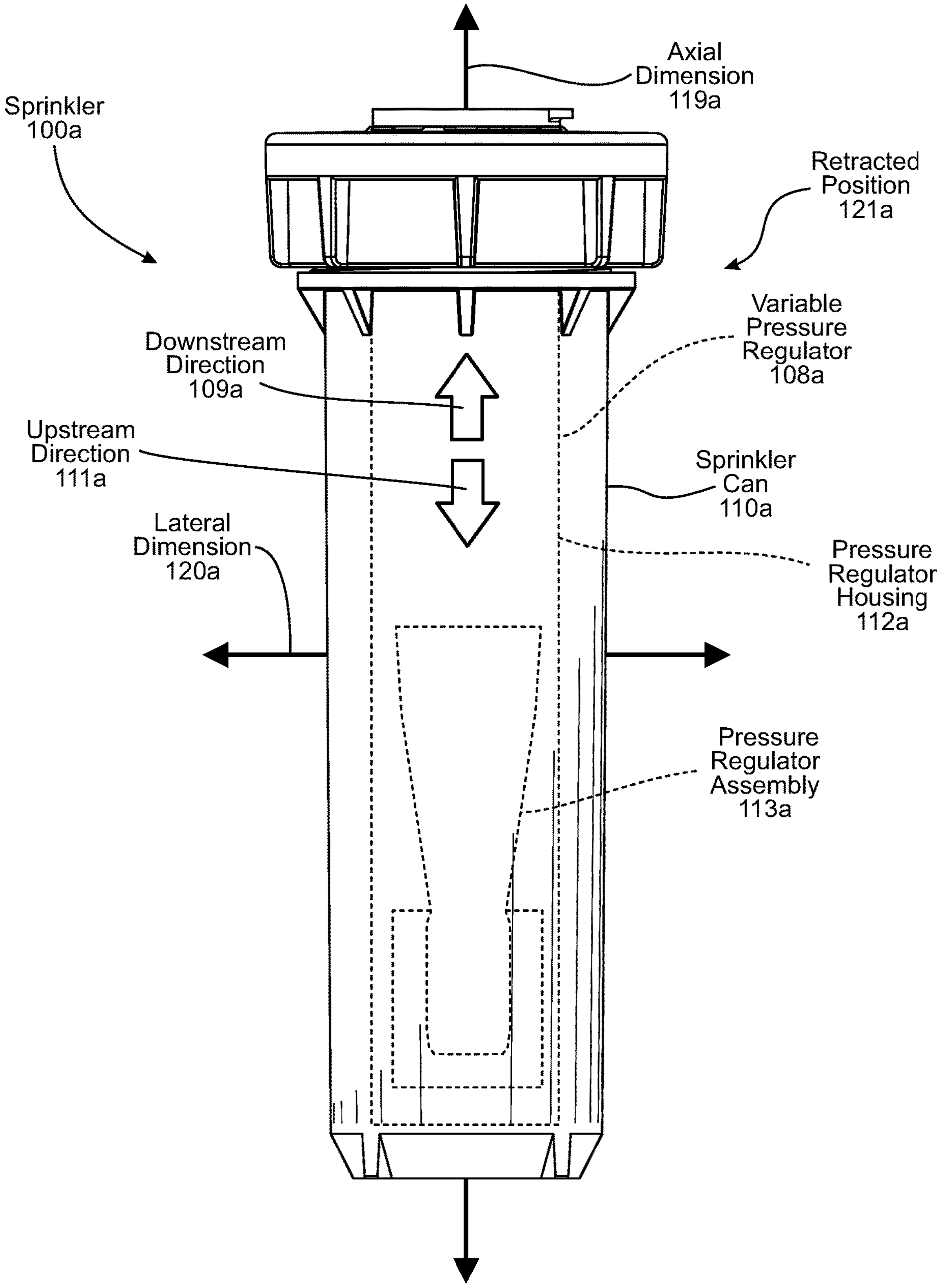
FIGS. 2A-C comprise side views of the first embodiment of the variable pressure regulator in a sprinkler with a pressure regulator housing at various positions along an axial dimension with respect to the sprinkler can.
Figure 2B:
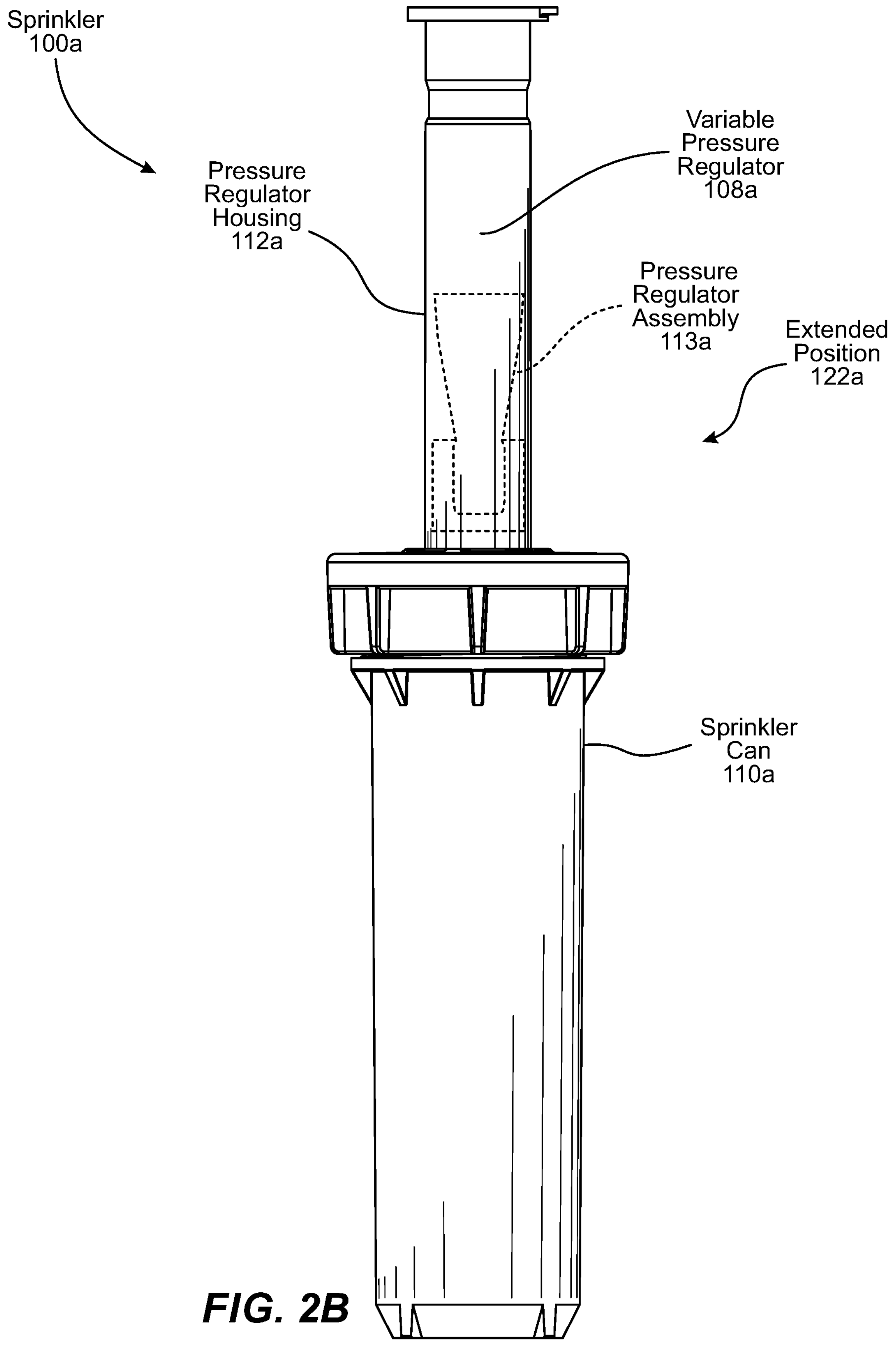
Figure 2C:
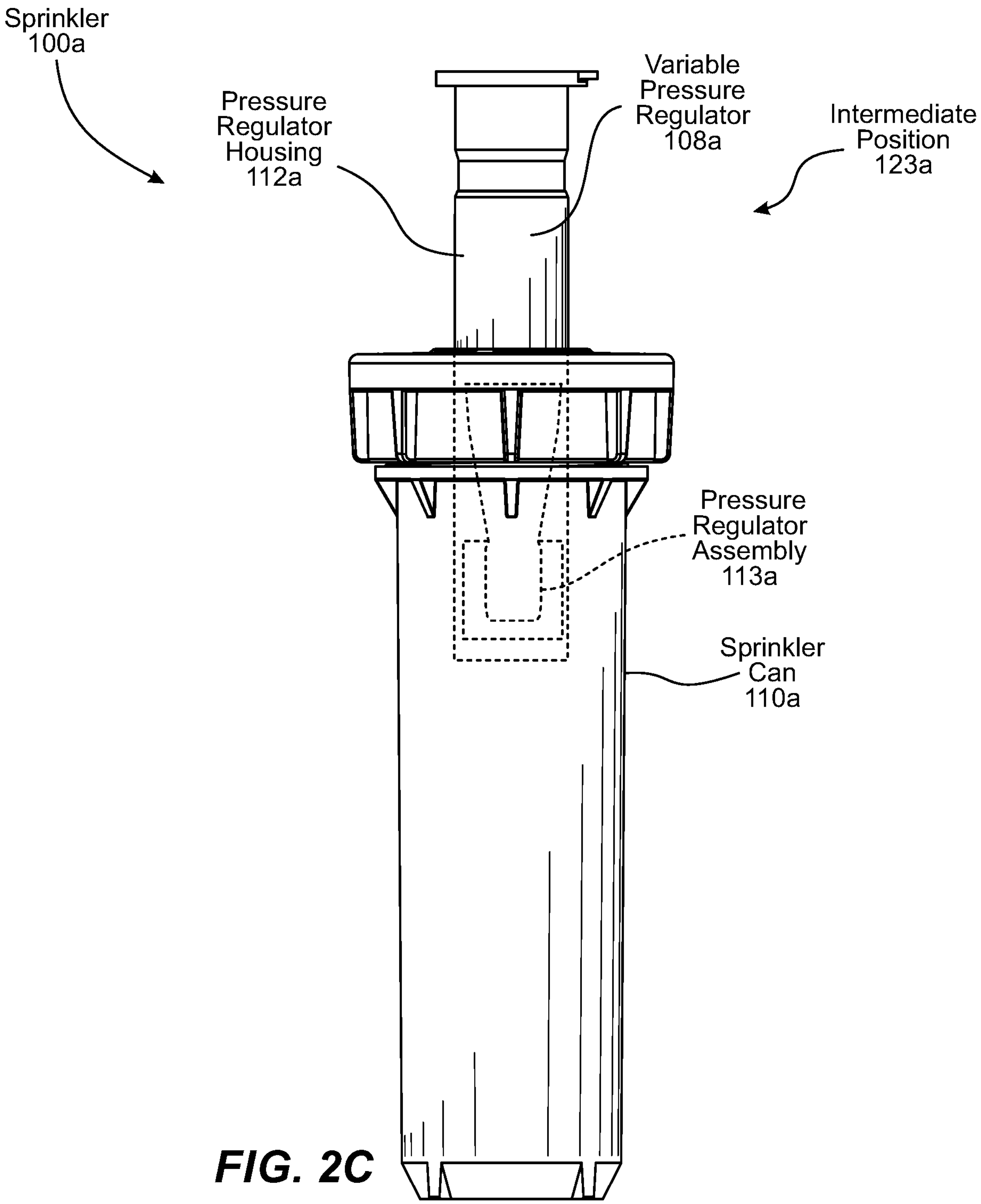

First Embodiment (FIGS. 1-2C)

FIG. 1 is a perspective view of a first embodiment of a variable pressure regulator 108*a* within a sprinkler 100*a* (e.g., an irrigation sprinkler 100*a*). FIG. 1 illustrates the first embodiment of a pop-up sprinkler 100*a*, although other types of sprinklers 100*a* may come within the scope of the disclosed and claimed subject matter.

The sprinkler 100*a* may include, for example, a sprinkler can 110*a*, a cap 116*a*, and a flush plug 118*a*. The sprinkler can 110*a* may hold, support, and/or house one or more sprinkler components, such as a pressure regulator housing 112*a*. (The pressure regulator housing 112*a* will be explained in further detail below.) A passageway for delivering fluid may be disposed within the sprinkler can 110*a*. For example, fluid may flow through the passageway when in use. The sprinkler can 110*a* may include a fluid input coupling 114*a*. The fluid input coupling 114*a* may be connected to a source of pressurized fluid (e.g., pressurized water that may optionally include fertilizer, fungicides and/or pesticides) through, for example, a coupling, a pipe, or a hose. In various embodiments, the fluid input coupling 114*a* may include threads (or another type of coupling mechanism) for connecting a pressurized fluid source to the fluid input coupling 114*a*.

As illustrated in FIG. 1, the sprinkler 100*a* may include a flush plug 118*a*. However, it should be noted that the sprinkler 100*a* may include a nozzle (illustrated in subsequent figures) in place of the flush plug 118*a* when in use. More specifically, the flush plug 118*a* may be removed and replaced by a nozzle. One or more examples of nozzles are illustrated in subsequent figures and discussed below.

The cap 116*a* may cover and/or contain one or more internal components. The cap 116*a* may include an opening to allow a pressure regulator housing 112*a* to protrude from the sprinkler can 110*a* during operation. For example, when pressurized fluid is supplied to the sprinkler 100*a*, the pressurized fluid may cause the pressure regulator housing 112*a* to protrude from the sprinkler can 110*a*. A nozzle may dispense the pressurized fluid from the top of the pressure regulator housing 112*a*.

As will be described in greater detail below, the sprinkler 100*a* may include a variable pressure regulator 108*a*. The variable pressure regulator 108*a* may control and alter the pressure of fluid exiting the sprinkler 100*a* during operation. The variable pressure regulator 108*a* may include a pressure regulator housing 112*a* and a pressure regulator assembly 113*a* disposed within the pressure regulator housing 112*a*. Various examples of variable pressure regulators 108*a* are given in the figures and description provided below. Some embodiments of the variable pressure regulators 108*a* may be beneficial to control sprinkler pressure. For example, if sprinkler pressure is too high, a significant amount of the dispensed fluid may be released as a fine mist and subject to wind drift or nonuniform watering, leading to waste. Also, the area (e.g., distance) covered by a sprinkler 100*a* is related to pressure. Accordingly, a variable pressure regulator 108*a* may be beneficial to adjust the area covered by a sprinkler 100*a*.

As illustrated in FIGS. 2A-C, the sprinkler 100*a* and variable pressure regulator 108*a* may include an axial dimension 119*a*, a lateral dimension 120*a*, a downstream direction 109*a* and an upstream direction 111*a*. FIGS. 2A-C will be addressed collectively such that components may be labeled with reference numerals in one or more of the figures but not necessarily in all of these figures. The downstream direction 109*a* is the direction along which fluid generally flows through the sprinkler 100*a* and variable pressure regulator 108*a* when in operation with the understanding that in limited circumstances and positions within the sprinkler 100*a* fluid passing through the sprinkler 100*a* and variable pressure regulator 108*a* may travel in other directions besides the downstream direction 109*a* along the axial dimension 119*a*. Yet, on the whole, fluid generally travels through the sprinkler 100*a* and variable pressure regulator 108*a* along the axial dimension 119*a* in a downstream direction 109*a*. The lateral dimension 120*a* is perpendicular or substantially perpendicular to the axial dimension 119*a*. The terms axial dimension 119*a*, lateral dimension 120*a*, downstream direction 109*a* and upstream direction 111*a* will be used herein, in the manner explained above, although not specifically labeled in connection with each of the remaining figures in embodiments disclosed herein. When the sprinkler 100*a* is assembled, the axial dimension 119*a* of both the sprinkler 100*a* and the variable pressure regulator 108*a* are the same or similarly oriented and thus may be referred to interchangeably throughout this specification. The sprinkler 100*a* (including the variable pressure regulator 108*a*) is in an operating state when pressurized fluid is passing through the sprinkler 100*a* and/or pressure regulator 108*a*. In contrast, the sprinkler 100*a* (including the variable pressure regulator 108*a*) is in a resting state when pressurized fluid is not passing through the sprinkler 100*a* and/or pressure regulator 108*a*.

As noted above, the variable pressure regulator 108*a* may include a pressure regulator housing 112*a* and a pressure regulator assembly 113*a* disposed within the pressure regulator housing 112*a*. The pressure regulator housing 112*a* is repositionable along the axial dimension 119*a* relative to the sprinkler can 110*a* from a retracted position 121*a*, to an extended position 122*a* and at various intermediate positions 123*a* between the retracted position 121*a* and the extended position 122*a*. The pressure regulator housing 112*a* is biased toward the retracted position 121*a* by a pop-up spring, which is illustrated subsequently. Pressure exerted by fluid flowing through the sprinkler 100*a*, if sufficient, overcomes the force exerted by the pop-up spring and causes the pressure regulator housing 112*a* to be repositioned through one or more of the intermediate positions 123*a* to the extended position 122*a*.

Second Embodiment (FIGS. 3A-6B)

Figure 3A:
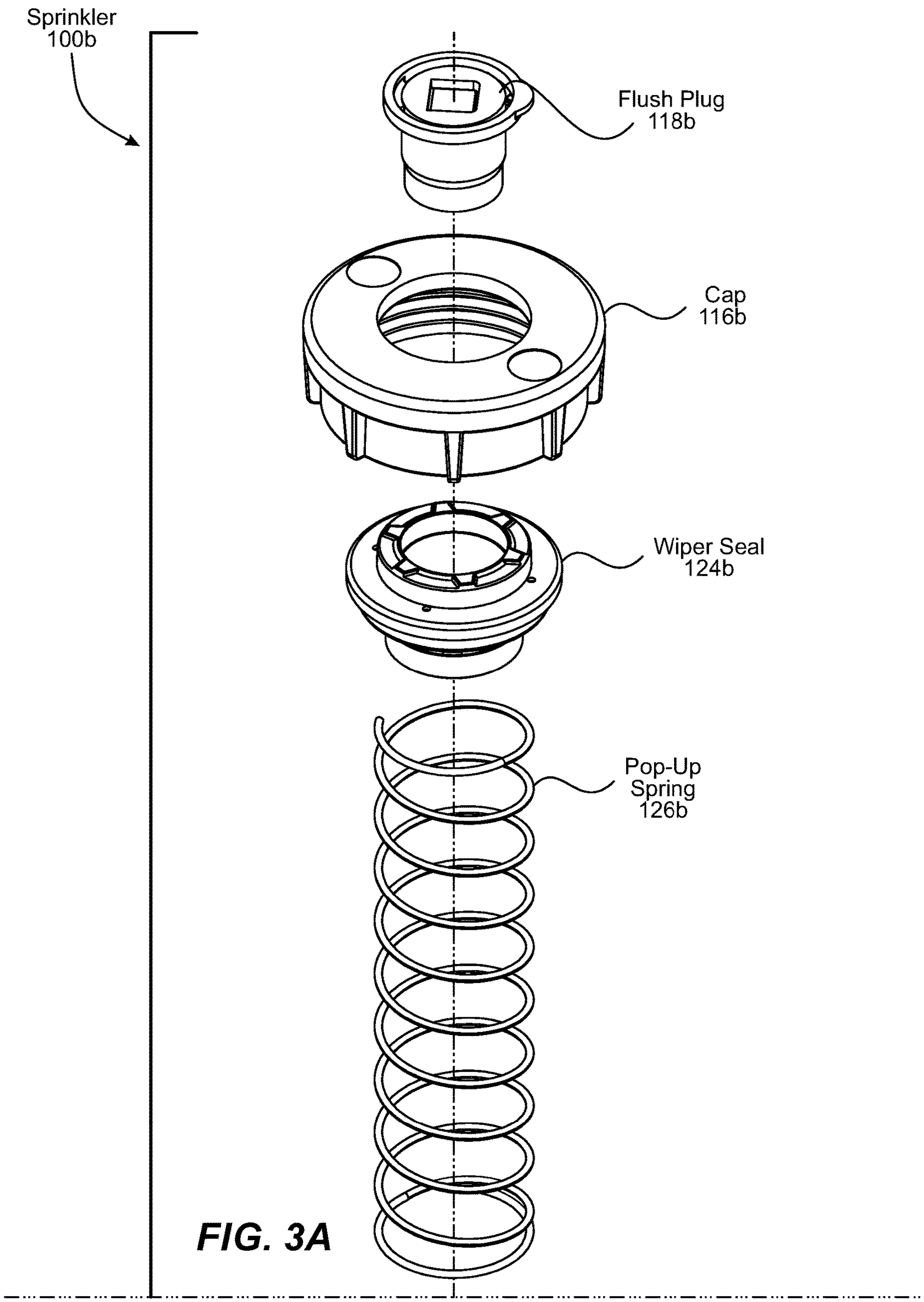
FIGS. 3A-C comprise a perspective, exploded view of a second embodiment of a variable pressure regulator within a sprinkler.
Figure 3B:
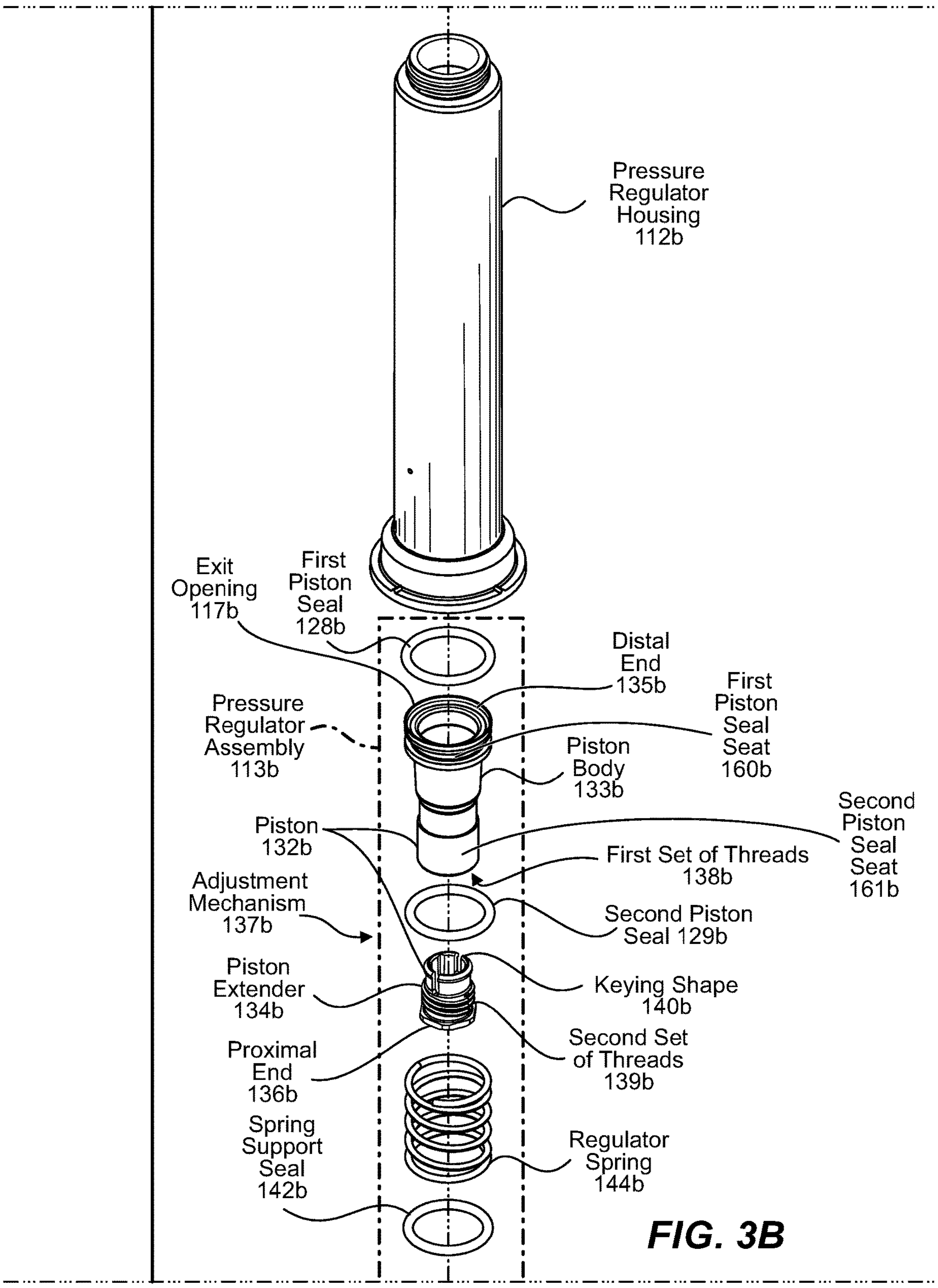
Figure 3C:
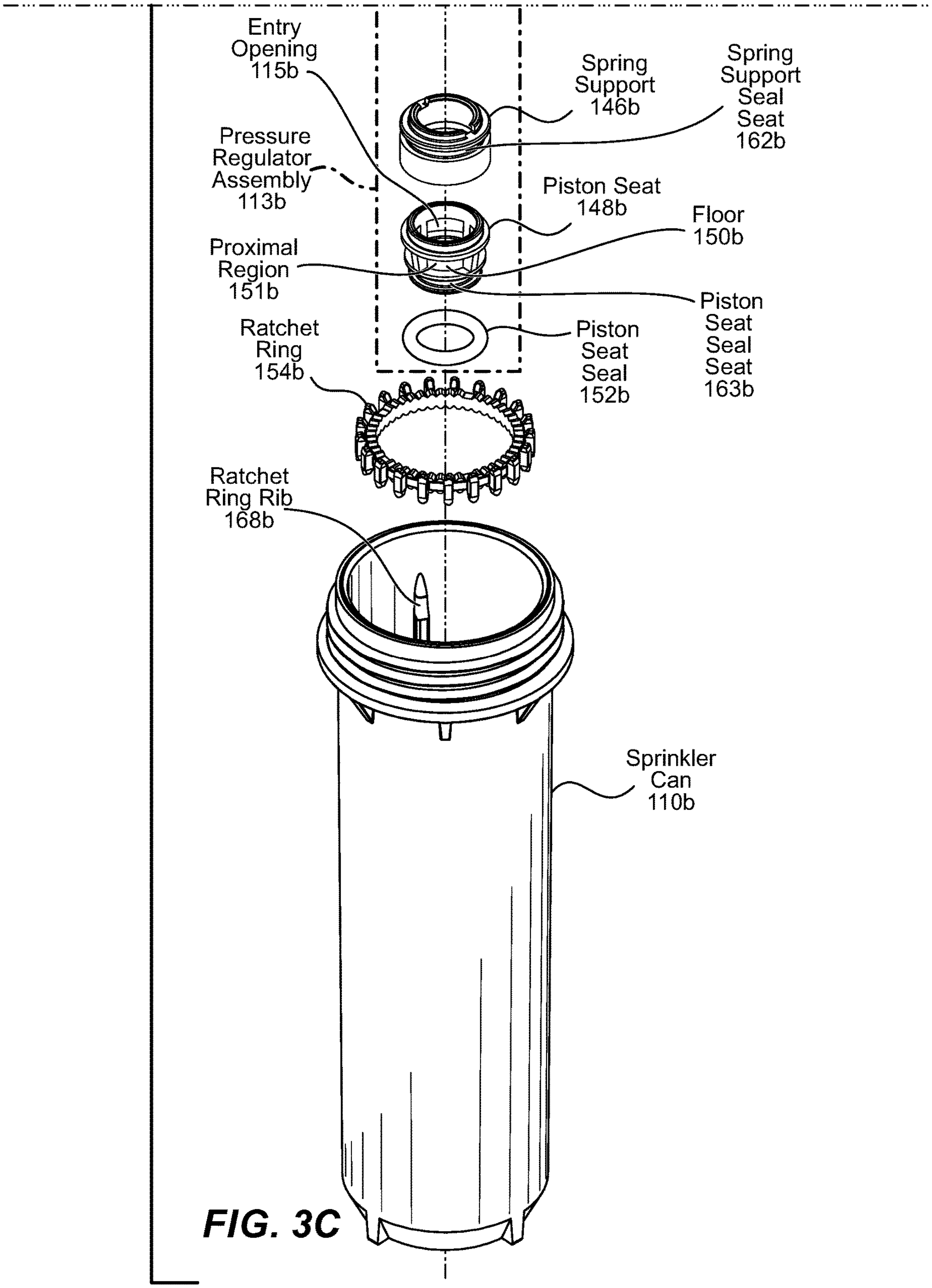
Figure 4A:
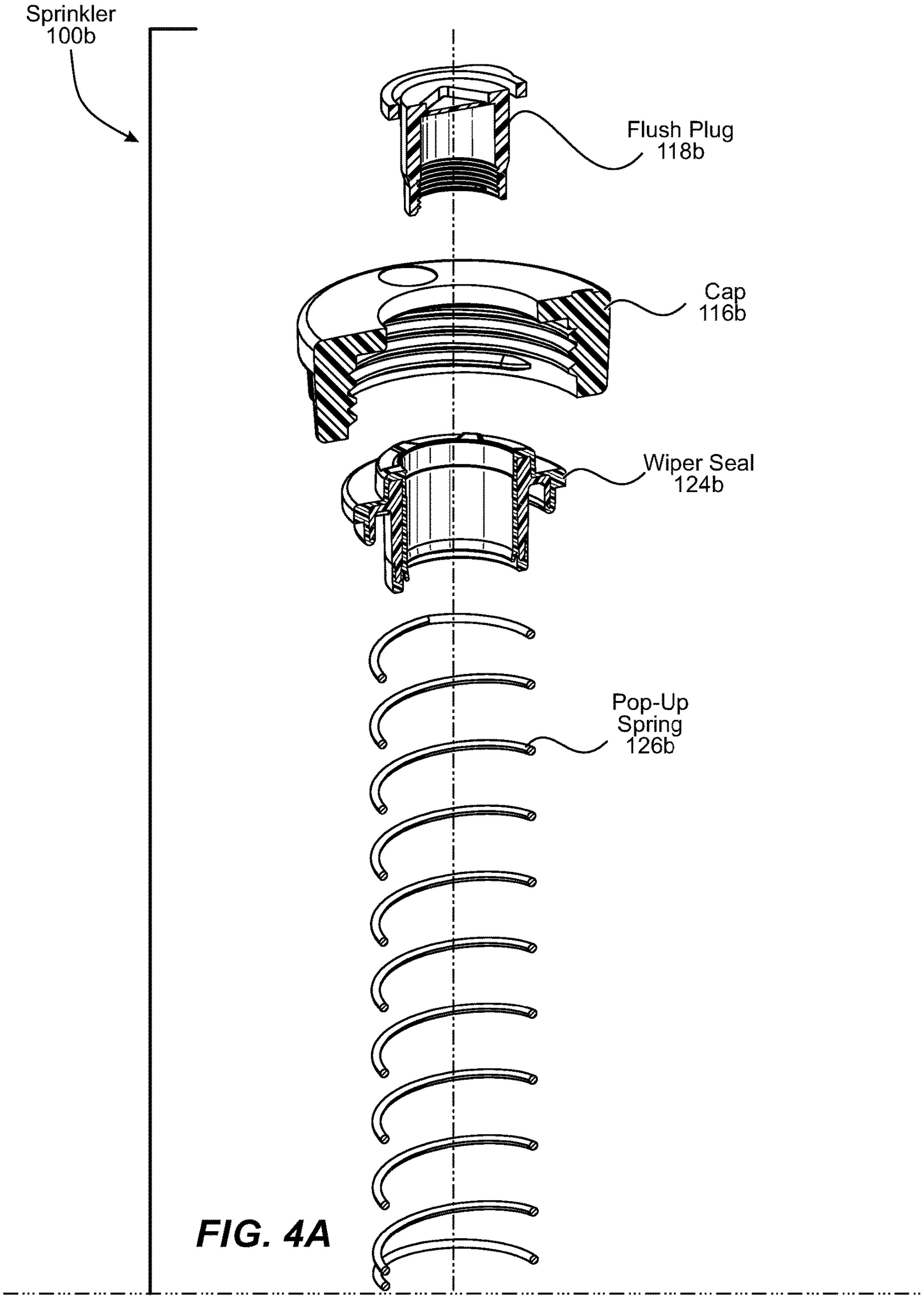
FIGS. 4A-C comprise a perspective, exploded cross-sectional view of the second embodiment of the variable pressure regulator within the sprinkler.
Figure 4B:
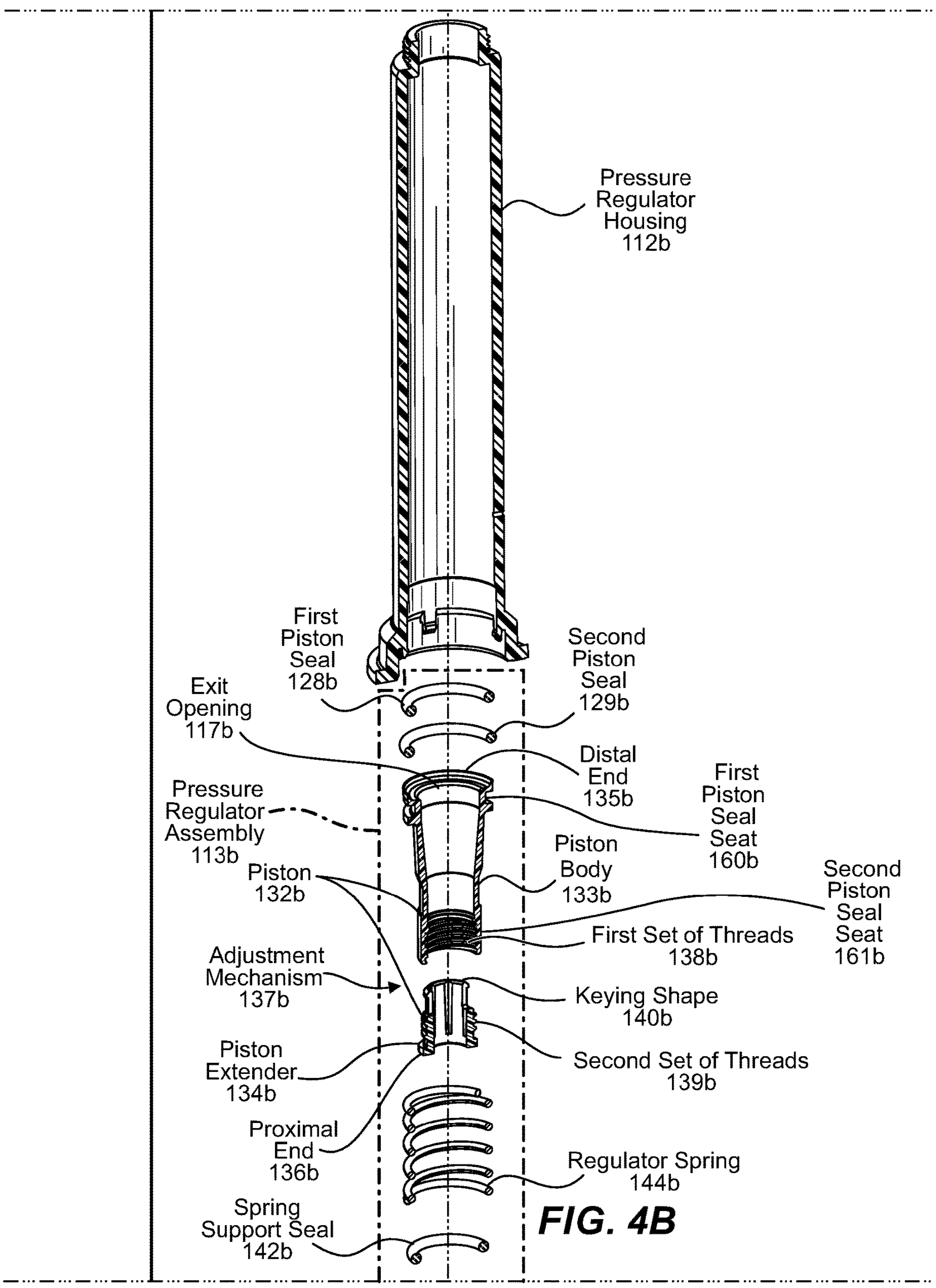
Figure 4C:
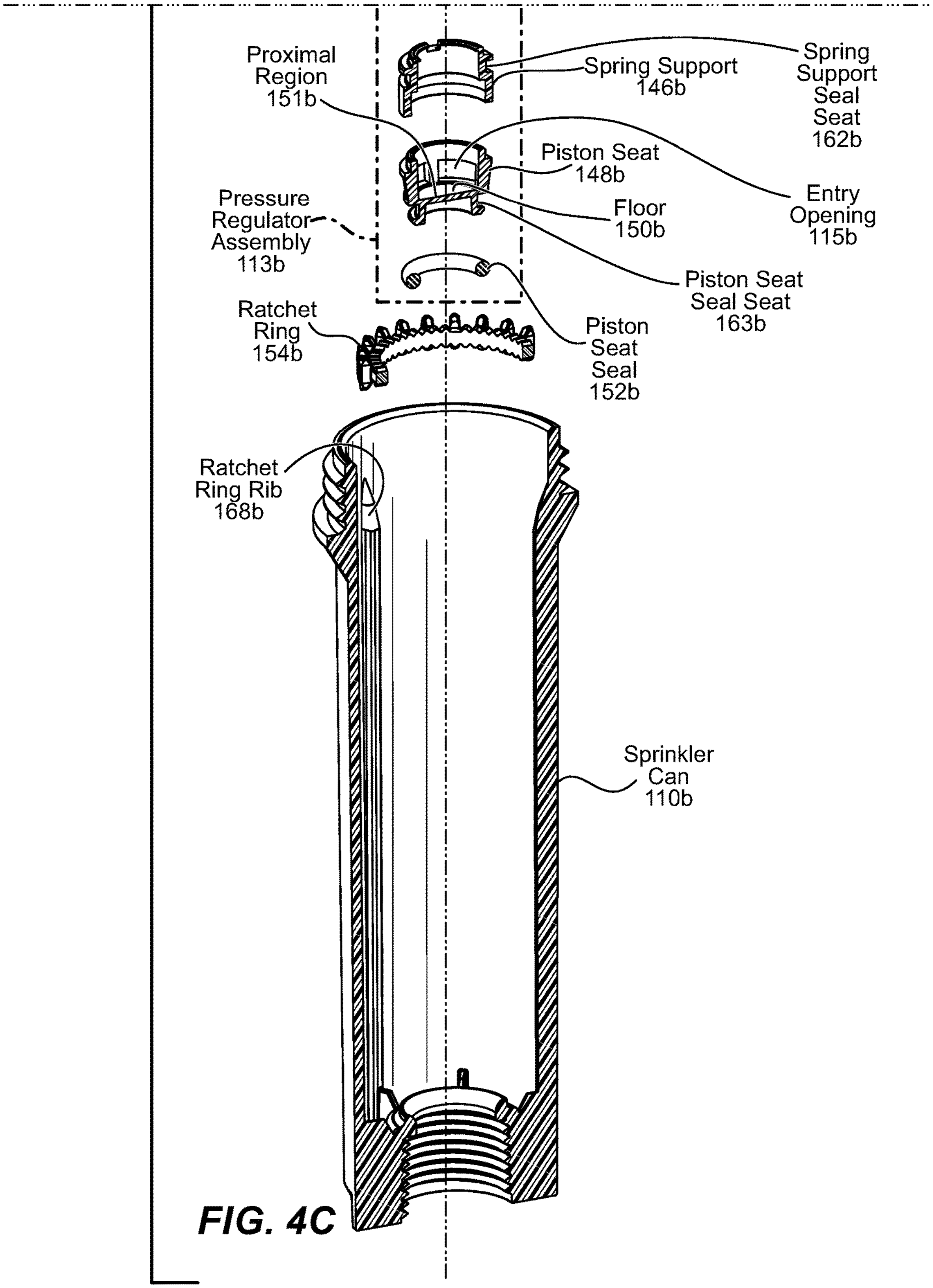
Figure 5A:
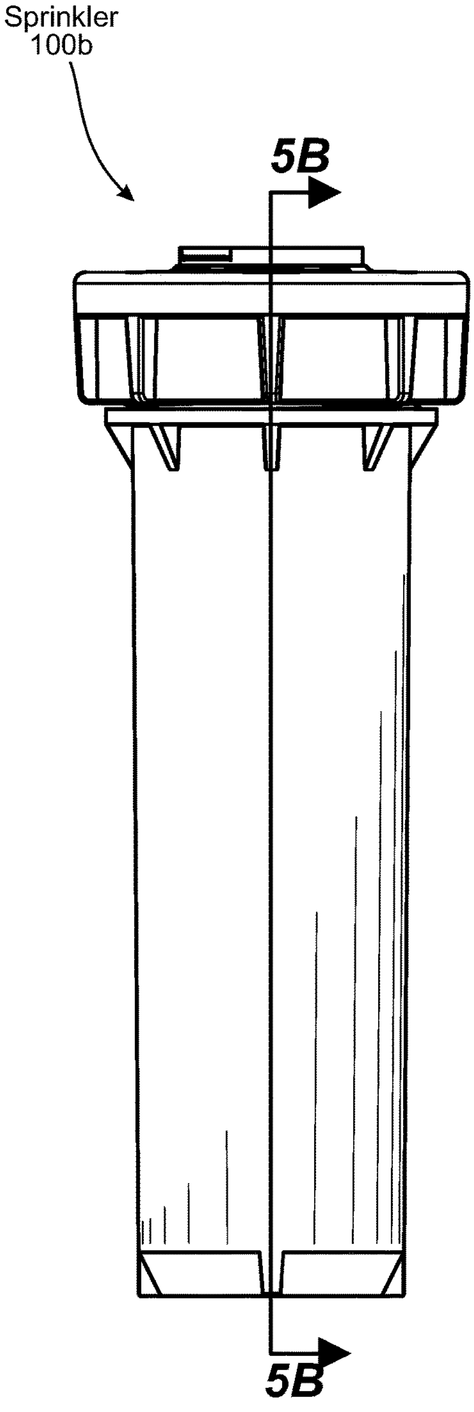
FIG. 5A is a side elevational view of the second embodiment of the variable pressure regulator within the sprinkler.
Figure 5B:
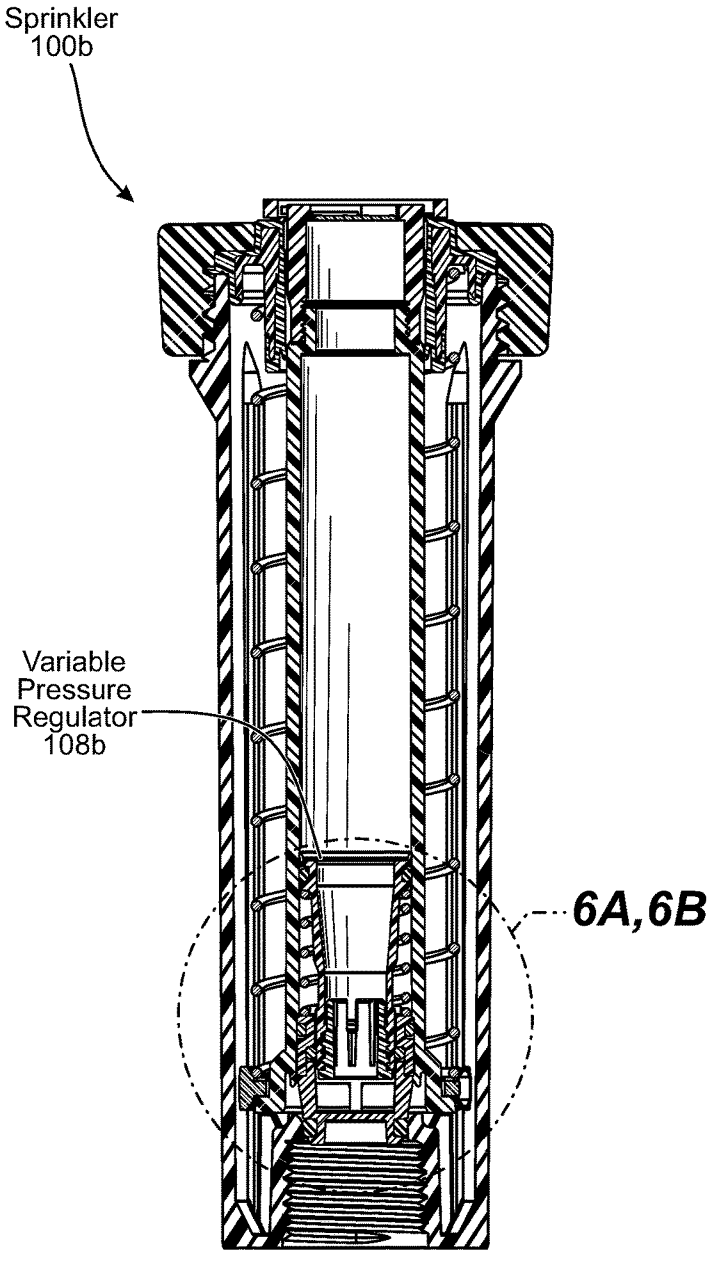
FIG. 5B is a cross-sectional side elevational view of the second embodiment of the variable pressure regulator within the sprinkler taken across the line 5B-5B in FIG. 5A.
Figure 6A:
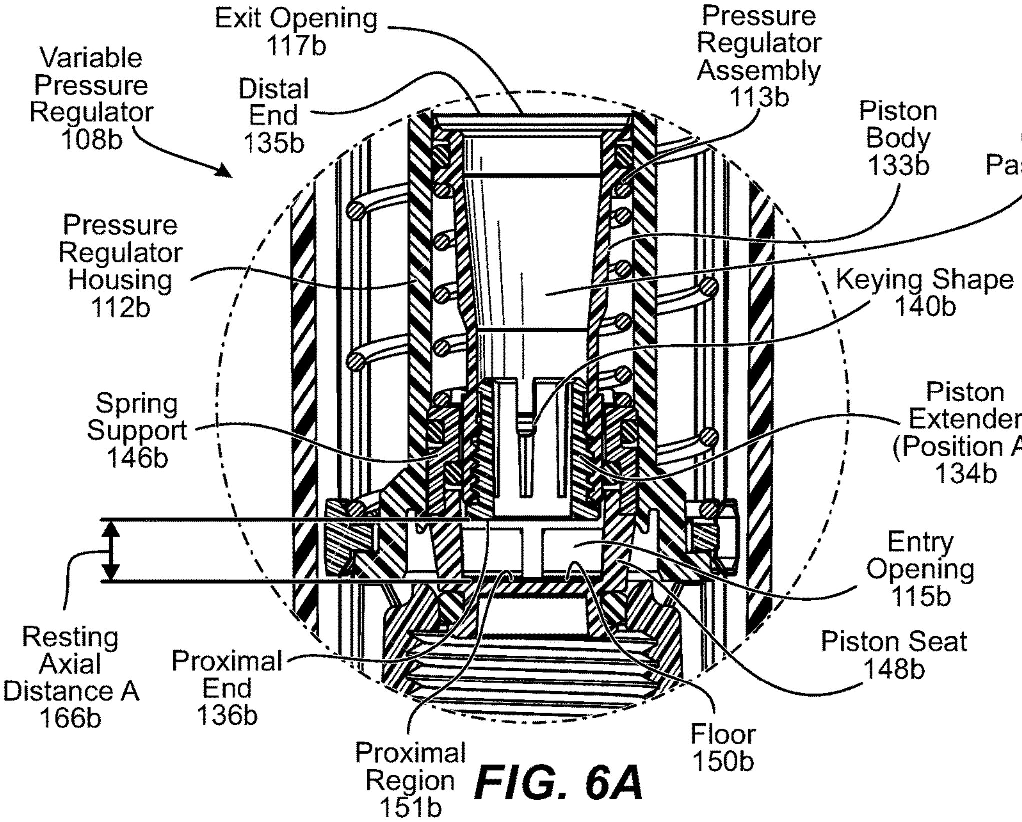
FIGS. 6A-B comprise side elevational cross-sectional views of the region 6A, 6B of FIG. 5B of the second embodiment of the variable pressure regulator within the sprinkler in different user-specified positions and in a resting state.
Figure 6B:
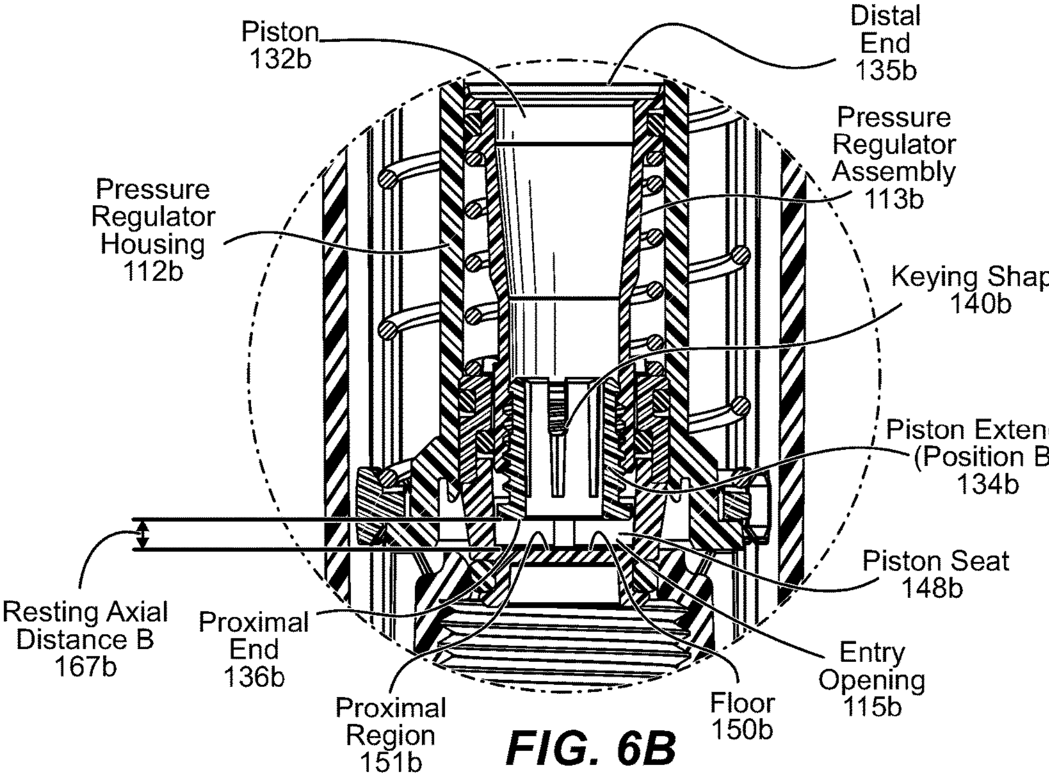

FIGS. 3A-6B illustrate a second embodiment of a variable pressure regulator 108*b* employed within a sprinkler 100*b*. These figures will be addressed collectively such that components may be labeled with reference numerals in one or more of the figures but not necessarily in all of these figures. Accordingly, some aspects of FIGS. 3A-6B may be described concurrently, while reference to specific figures may be explicitly indicated. FIGS. 3A-C comprise a perspective, exploded view of a second embodiment of a variable pressure regulator 108*b* within a sprinkler 100*b*. FIGS. 4A-C comprise a perspective, exploded cross-sectional view of the second embodiment of the variable pressure regulator 108*b* within the sprinkler 100*b*. FIG. 5A is a side elevational view of the second embodiment of the variable pressure regulator 108*b* within the sprinkler 100*b*. FIG. 5B is a cross-sectional side elevational view of the second embodiment of the variable pressure regulator 108*b* within the sprinkler 100*b* taken across the line 5B-5B in FIG. 5A. FIGS. 6A-B comprise side elevational cross-sectional views of the region 6A, 6B of FIG. 5B of the second embodiment of the variable pressure regulator 108*b* within the sprinkler 100*a* in different user-specified positions and in a resting state.

This second embodiment of the variable pressure regulator 108*b* varies a length of the piston 132*b* comprising a piston body 133*b* and a piston extender 134*b* along an axial dimension 119*a* to alter the pressure regulation, as will be explained below.

Referring now generally to FIGS. 3A-6B, the sprinkler 100*b* may include a flush plug 118*b* (or a nozzle in place of the flush plug 118*b* with at least one example of a nozzle illustrated in subsequent figures), a cap 116*b*, a wiper seal 124*b*, a pop-up spring 126*b*, a pressure regulator housing 112*b*, a regulator spring 144*b*, a first piston seal 128*b*, a second piston seal 129*b*, a piston seat seal 152*b*, a piston 132*b* comprising a piston body 133*b* and a piston extender 134*b*, a spring support seal 142*b*, a spring support 146*b*, a piston seat 148*b*, a ratchet ring 154*b*, and/or a sprinkler can 110*b*.

The wiper seal 124*b* may engage with and form a seal with the pressure regulator housing 112*b*. The cap 116*b* engages the sprinkler can 110*b* and retains components within the enclosure formed thereby. The wiper seal 124*b* may include an opening through which the pressure regulator housing 112*b* may extend to varying degrees in an operating state (i.e., a state in which pressurized fluid is being supplied to the sprinkler 100*b* and variable pressure regulator 108*b*).

The pop-up spring 126*b* may be situated between the wiper seal 124*b* and a lip at the bottom of the pressure regulator housing 112*b*. In an operating state, the pop-up spring 126*b* may be compressed to allow the pressure regulator housing 112*b* to extend through the wiper seal 124*b* and cap 116*b*. In a resting state (e.g., when pressurized fluid is not provided to the sprinkler 100*b* and variable pressure regulator 108*b*), the pop-up spring 126*b* may expand causing the pressure regulator housing 112*b* to withdraw into the sprinkler can 110*b*. Thus, the pop-up spring 126*b* biases the pressure regulator housing 112*b* toward the retracted position 121*b* (which position is illustrated in FIG. 2A in connection with the first embodiment).

The pressure regulator housing 112*b* may comprise a pipe or channel to conduct pressurized fluid through the sprinkler 100*b* and house the pressure regulator assembly 113*b*. The pressure regulator housing 112*b* may include threads on a top portion of the pressure regulator housing 112*b* to allow engagement with a flush plug 118*b* or nozzle. As indicated above, when pressurized fluid is supplied to the sprinkler 100*b*, the pressurized fluid may force the pressure regulator housing 112*b* to extend from the sprinkler can 110*b*. The pressurized fluid may be dispersed from a nozzle secured to the top of the pressure regulator housing 112*b*.

The ratchet ring 154*b* may selectively engage with one or more ratchet ring ribs 168*b* in the interior of the sprinkler can 110*b*. The ratchet ring 154*b* may enable removal and rotation of the pressure regulator housing 112*b* relative to the sprinkler can 110*b*, such that the pressure regulator housing 112*b* may be rotated to and retained at a desired position relative to the sprinkler can 110*b*.

The sprinkler 100*b* may comprise a pressure regulator assembly 113*b* disposed within the pressure regulator housing 112*b*. The pressure regulator assembly 113*b* may comprise a regulator spring 144*b*, a first piston seal 128*b*, a second piston seal 129*b*, a piston seat seal 152*b*, a piston 132*b* comprising a piston body 133*b* and a piston extender 134*b*, a spring support seal 142*b*, a spring support 146*b*, and/or a piston seat 148*b*. The pressure regulator assembly 113*b* may be disposed entirely or partially within the pressure regulator housing 112*b*.

The piston 132*b* may comprise a distal end 135*b* and a proximal end 136*b* with the proximal end 136*b* being closer to a proximal region 151*b* of the floor 150*b* of the piston seat 148*b* than the distal end 135*b* along the axial dimension 119*a* of the sprinkler 100*b* when the sprinkler 100*b* is assembled. (As noted above, the axial dimension 119*a* is the dimension along which fluid generally flows through the sprinkler 100*b*.) The proximal region 151*b* of the floor 150*b* may comprise that region of the floor 150*b* closest to the proximal end 136*b* of the piston 132*b* along the axial dimension 119*a*.

The pressure regulator assembly 113*b* may comprise a number of seals, namely, a first piston seal 128*b*, a second piston seal 129*b*, a spring support seal 142*b*, and a piston seat seal 152*b*. When assembled, the first piston seal 128*b* may be positioned within a first piston seal seat 160*b* of the piston 132*b*; the second piston seal 129*b* may be situated within the second piston seal seat 161*b* of the piston 132*b*; the spring support seal 142*b* may be situated within the spring support seal seat 162*b* of the spring support 146*b*; and the piston seat seal 152*b* may be situated within the piston seat seal seat 163*b* of the piston seat 148*b*. These seals 128*b*, 129*b*, 142*b*, 152*b* form a fluid-tight or nearly fluid-tight seal at the various locations to enable pressurized fluid to flow through the sprinkler 100*b* without being diverted to undesired pathways or locations.

The regulator spring 144*b* engages the piston 132*b* and the spring support 146*b* to bias the piston 132*b* away from the spring support 146*b*. The regulator spring 144*b* aids in the regulation of pressure of fluid passing through the sprinkler 100*b*, as will be explained below.

The piston seat 148*b* may comprise one or more entry openings 115*b* and a floor 150*b* comprising a proximal region 151*b*. As noted above, the proximal region 151*b* may comprise that portion of the floor 150*b* that is closest to the proximal end 136*b* of the piston 132*b*. In various embodiments, the proximal region 151*b* may comprise the entirety of the floor 150*b* or only a portion of the floor 150*b*. Fluid entering the sprinkler 100*b* may pass through the one or more entry openings 115*b*.

The variable pressure regulator 108*b* may comprise an adjustment mechanism 137*b* to alter the pressure of fluid flowing through the sprinkler 100*b*. In the second embodiment illustrated in these figures (FIGS. 3A-6B), the adjustment mechanism 137*b* may comprise a threaded adjustment mechanism. In the illustrated second embodiment, the adjustment mechanism 137*b* may comprise a first set of threads 138*b* on the piston body 133*b* and a second set of threads 139*b* on the piston extender 134*b*. The first set of threads 138*b* and the second set of threads 139*b* may be mutually engaged such that rotational movement of the piston extender 134*b* relative to the spring support 146*b* alters a distance intermediate the proximal end 136*b* of the piston 132*b* and the proximal region 151*b* of the floor 150*b* when the sprinkler 100*b* is in a resting state. (This distance may be referred to as a resting axial distance 166*b*, 167*b*, which is illustrated in FIGS. 6A-6B.) Accordingly, the length of the piston 132*b* along the axial dimension 119*a* may be altered employing the adjustment mechanism 137*b*. As noted, the adjustment mechanism 137*b* illustrated in the second embodiment is a threaded adjustment mechanism. In alternative embodiments, for example, a snap-fit adjustment mechanism may be employed.

The first set of threads 138*b* and the second set of threads 139*b* may be outwardly or inwardly projecting so long as the threads 138*b*, 139*b* mutually engage. Thus, the first set of threads 138*b* and the second set of threads 139*b* may be outwardly or inwardly projecting.

The piston extender 134*b* may include a keying shape 140*b* to engage with a tool, which may comprise, for example, a screwdriver having a standard head or Phillips head, or an Allen wrench having a hexagonal-shaped head. In various embodiments, the keying shape 140*b* may be accessed either from a top or a bottom of the sprinkler 100*b* to engage and rotate the piston extender to alter the resting axial distance 166*b*, 167*b*.

Referring now specifically to FIGS. 6A-B, altering a length of the piston 132*b* along the axial dimension 119*a* may change the pressure of the pressurized fluid exiting the sprinkler 100*b* when the sprinkler 100*b* and variable pressure regulator 108*b* are in an operating state. For example, as the piston extender 134*b* is extended from the piston body 133*b*, entry openings 115*b* in the piston seat 148*b* may be at least partially obstructed, resulting in a reduction in pressure during operation (i.e., the pressure of the equilibrium state is reduced during operation of the sprinkler 100*b*). As the piston extender 134*b* is retracted into the piston body 133*b*, the entry openings 115*b* in the piston seat 148*b* are less obstructed, thereby increasing the pressure of fluid exiting the sprinkler 100*b*. Thus, employing the keying shape 140*b*, the piston extender 134*b* may be rotated to alter pressure of fluid exiting the sprinkler 100*b* in an operating state.

The regulator spring 144*b* applies a force in a downstream direction 109*a* to the piston 132*b* along the axial dimension 119*a* (i.e., the regulator spring 144*b* pushes the piston 132*b* away from the spring support 146*b*). In an operating state (with a pressurized fluid passing through the sprinkler 100*b* and variable pressure regulator 108*b*), a nozzle reduces the outflow of the fluid from the sprinkler 100*b* and creates a pressurized chamber downstream of the piston 132*b*. Pressure resulting from this pressurized chamber, if sufficient, may cause the piston 132*b* to move axially upstream (i.e., toward the spring support 146*b*) until an equilibrium state is reached in response to the counterbalancing axial force applied by the regulator spring 144*b*. Altering a length of the piston 132*b* may reduce, increase, or alter fluid flowing through entry openings 115*b* in the piston seat 148*b* to increase, restrict, or alter the movement of fluid through the entry openings 115*b* in the piston seat 148*b*, thereby causing an equilibrium to be reached at a lower or higher pressurized state. Thus, a variable pressure regulator 108*b*, which may comprise the pressure regulator housing 112*b* and the pressure regulator assembly 113*b*, may operate to alter the pressure of fluid exiting the sprinkler 100*b*. In various embodiments, the variable pressure regulator 108*b* may be designed to alter pressure between approximately 30 psi and 40 psi. (As used herein, "approximately" means plus or minus 5 psi.)

Referring still specifically to FIGS. 6A-B, an enlarged view of a portion of the sprinkler 100*b* is illustrated in two user-controlled positions in a resting state. More specifically, FIG. 6A illustrates the piston extender 134*b* in position A with a resting axial distance A 166*b*, while FIG. 6B illustrates the piston extender 134*b* in position B with a resting axial distance B 167*b*. As illustrated, in an operating state, fluid flows through the entry openings 115*b* of the piston seat 148*b* through the central passageway 131*b* (defined by the variable pressure regulator 108*b*) and exits the one or more exit openings 117*b* at a distal end 135*b* of the piston 132*b*.

As indicated in FIG. 6A, in an operating state with the piston extender 134*b* in position A, the pressurized fluid may flow through the pressure regulator housing 112*b* of the sprinkler 100*b* without pressure reduction or with less restriction than when the piston extender 134*b* is in position B. In FIG. 6B, the piston extender is illustrated in position B. As can be observed, the piston extender 134*b* extends the length of the piston 132*b*, causing the resting axial distance 167*b* between the proximal region 151*b* of the floor 150*b* and the proximal end 136*b* of the piston 132*b* to decrease, resulting in a reduction in pressure during operation (i.e., the pressure of the equilibrium state is reduced during operation of the sprinkler 100*b*). The full extent of the variation of the position of the piston extender 134*b* relative to the piston 132*b* and also the length of the piston 132*b* may be altered within the scope of the disclosed subject matter (i.e., beyond the variation illustrated in FIGS. 6A-6B). In other words, the resting axial distance A 166*b* and resting axial distance B 167*b* shown in FIGS. 6A-6B are merely illustrative.

It should be noted that the second embodiment shown in FIGS. 3A-6B is merely illustrative. Those skilled in the art will appreciate that many features of the disclosed embodiment may be varied within the scope of the claimed and disclosed subject matter. For example, the shape of the piston 132*b* may be varied which may alter how and the extent to which the piston 132*b* responds to upstream pressure.

Third Embodiment (FIGS. 7A-10B)

Figure 7A:
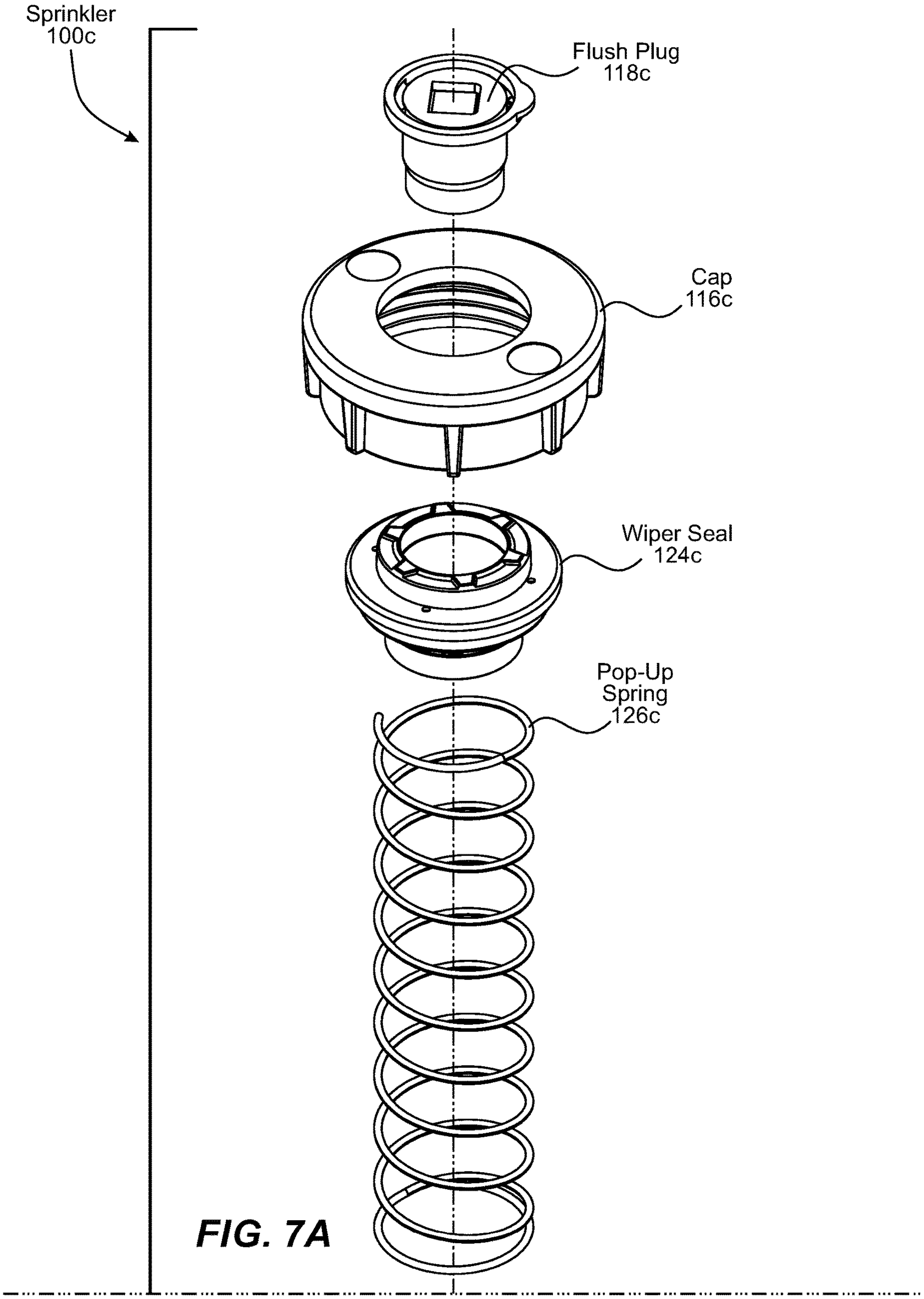
FIGS. 7A-C comprise a perspective, exploded view of a third embodiment of a variable pressure regulator within a sprinkler.
Figure 7B:
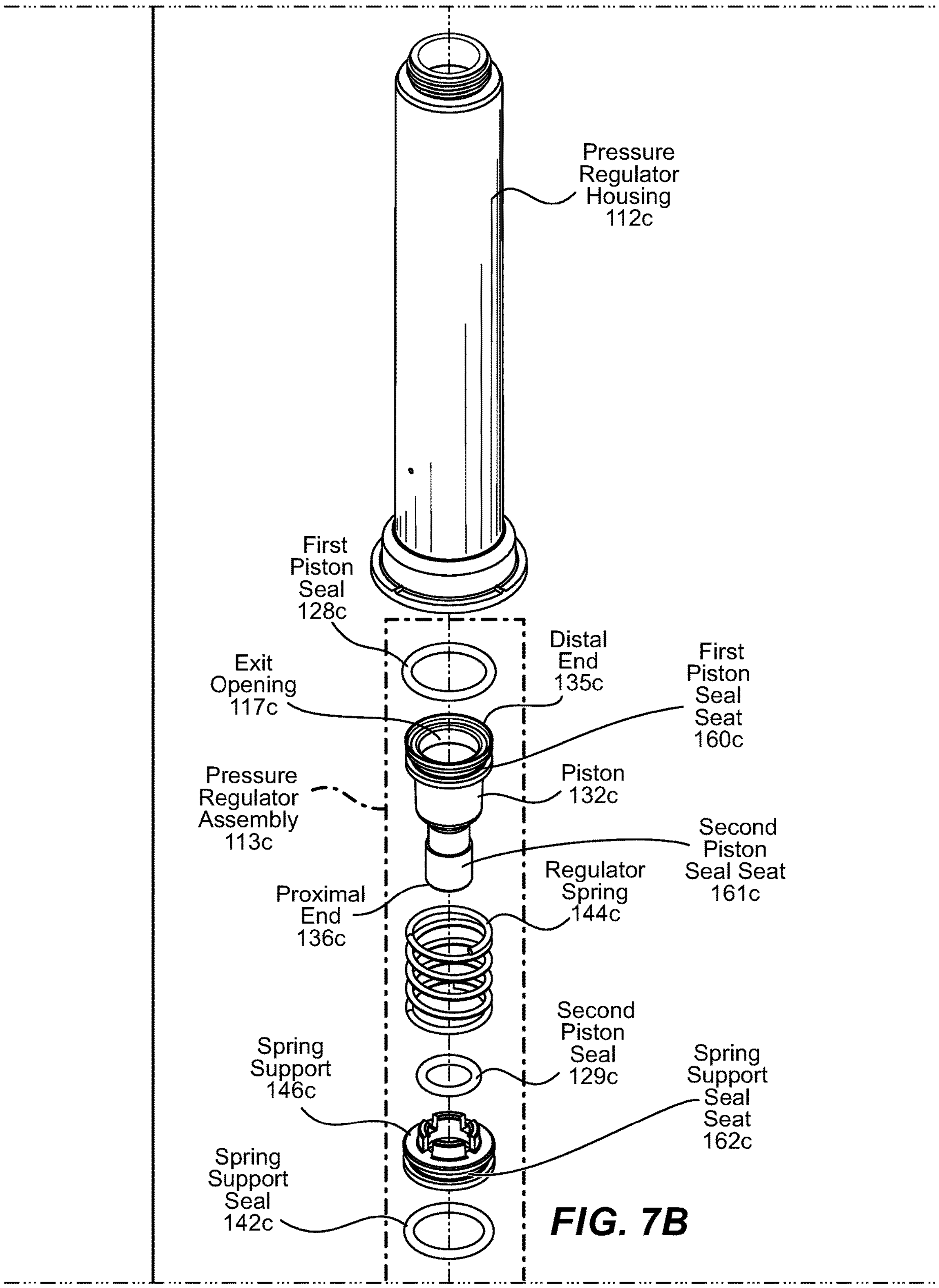
Figure 7C:
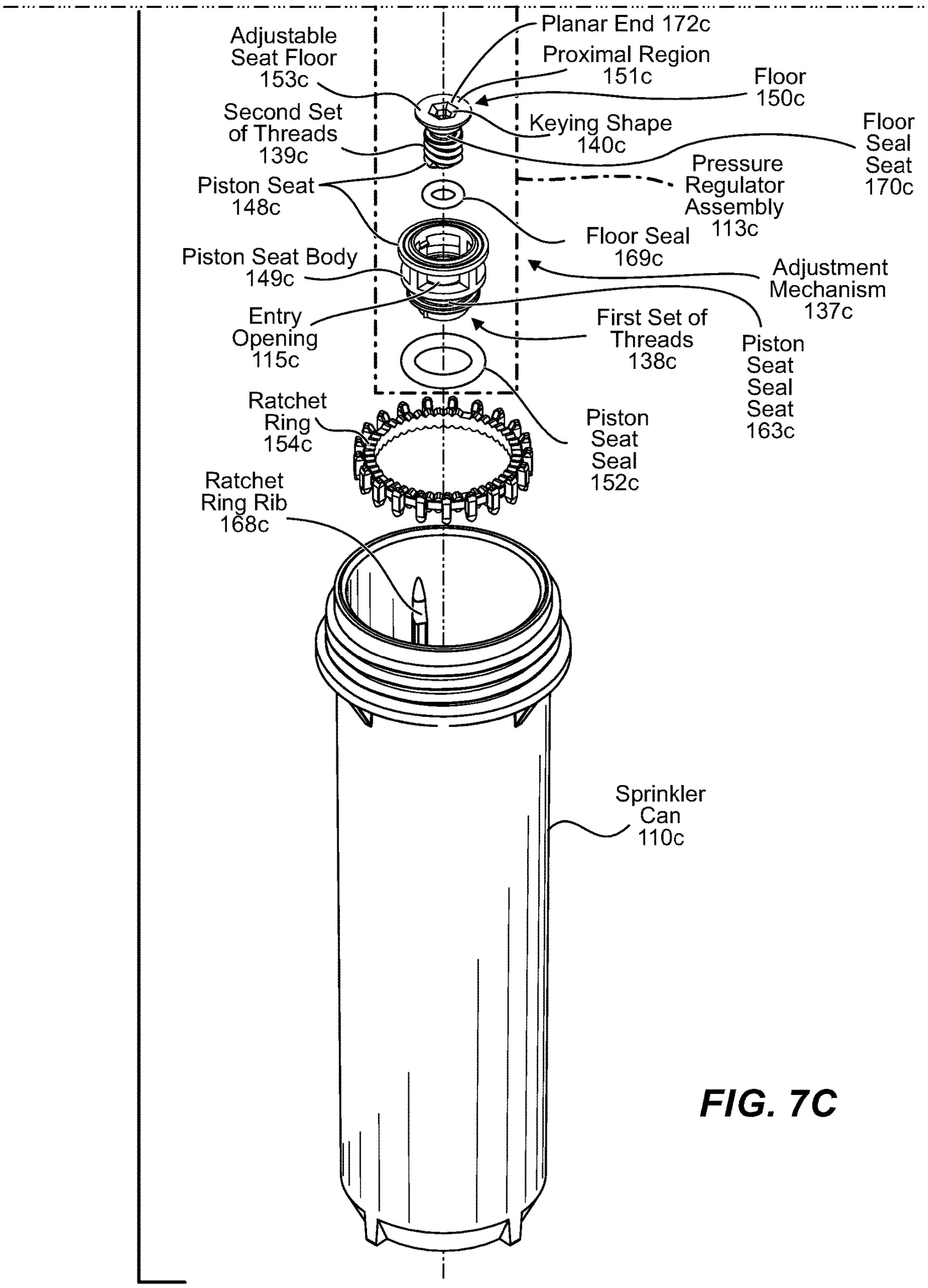
Figure 8A:
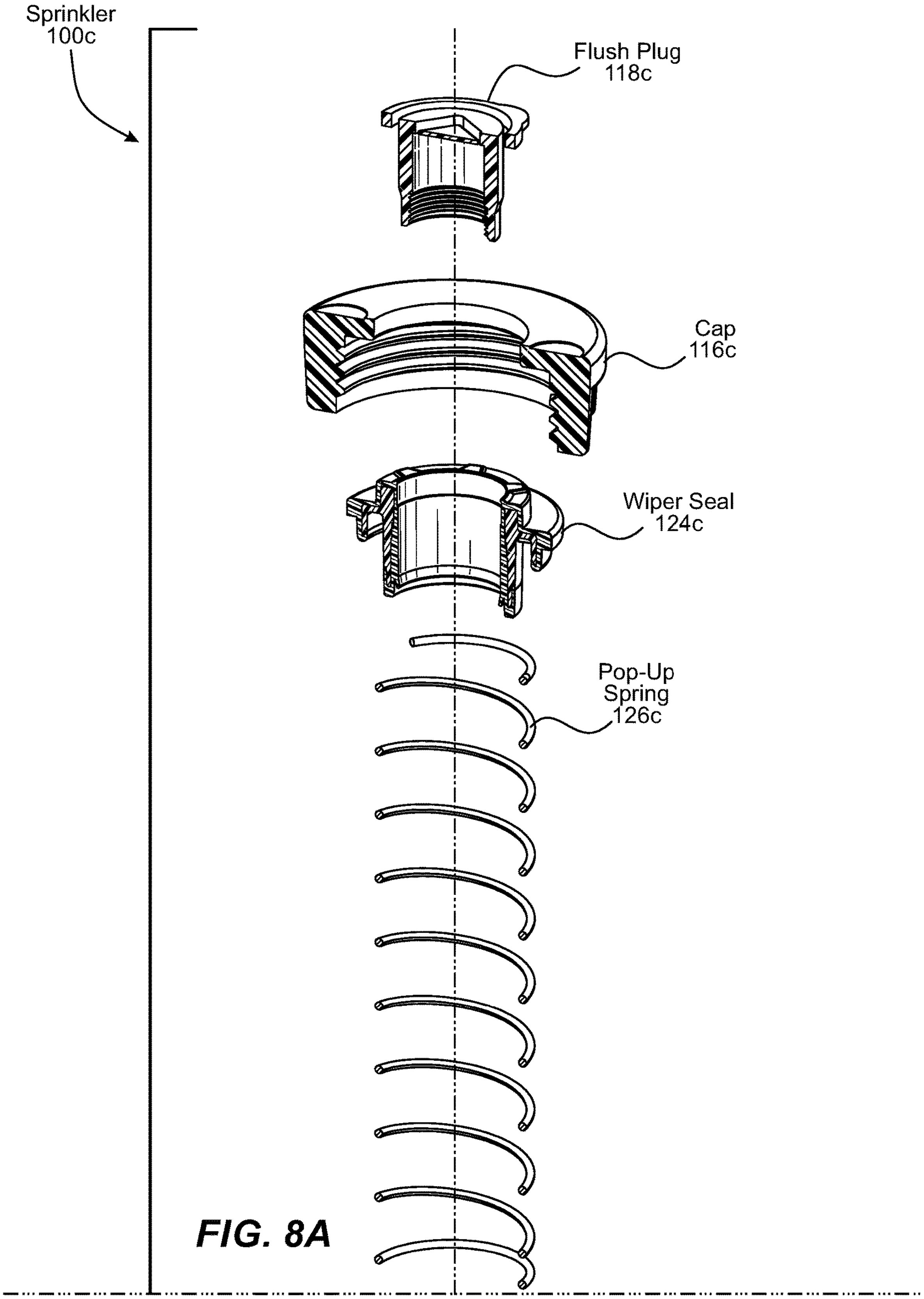
FIGS. 8A-C comprise a perspective, exploded cross-sectional view of the third embodiment of the variable pressure regulator within the sprinkler.
Figure 8B:
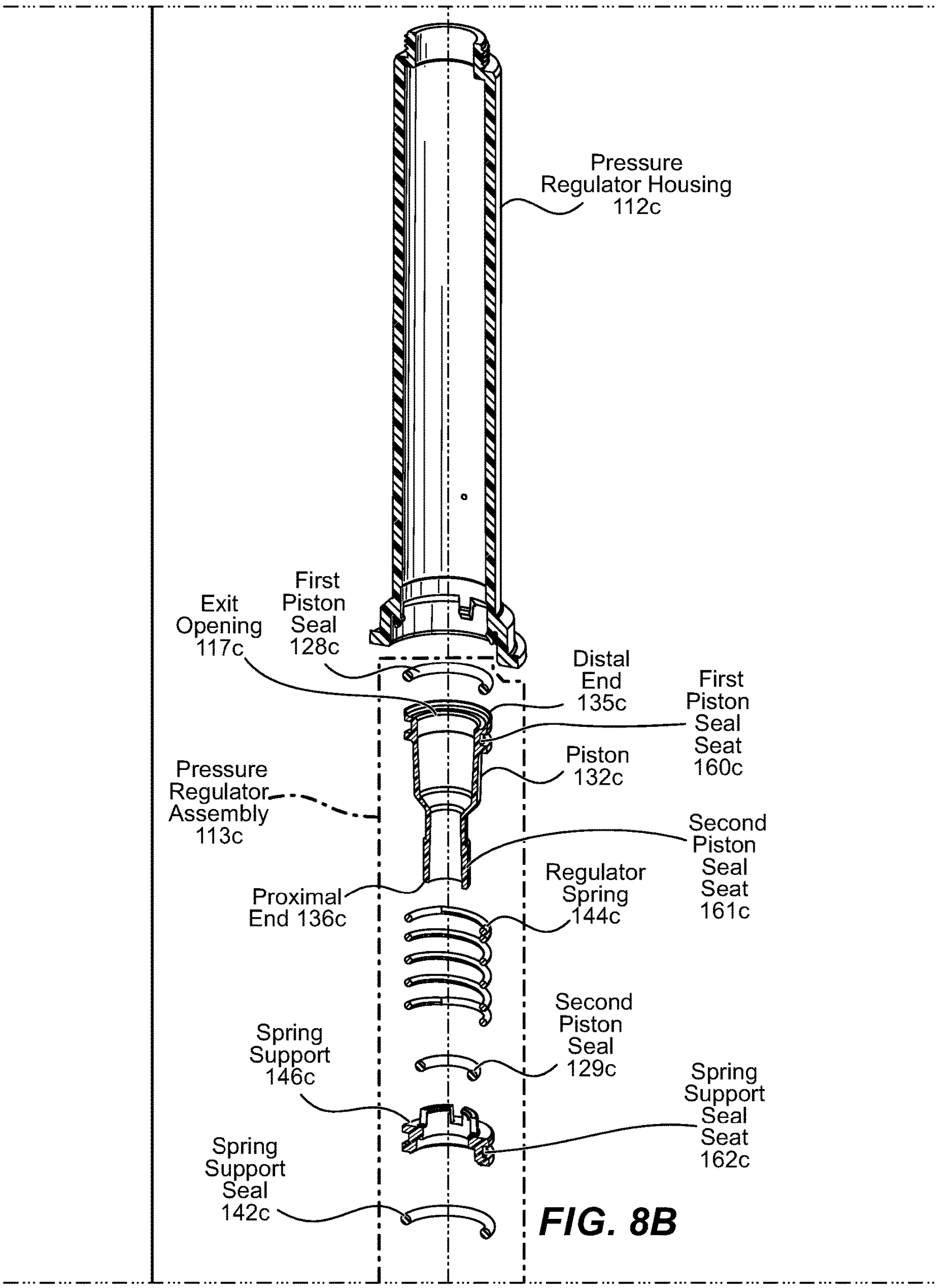
Figure 8C:
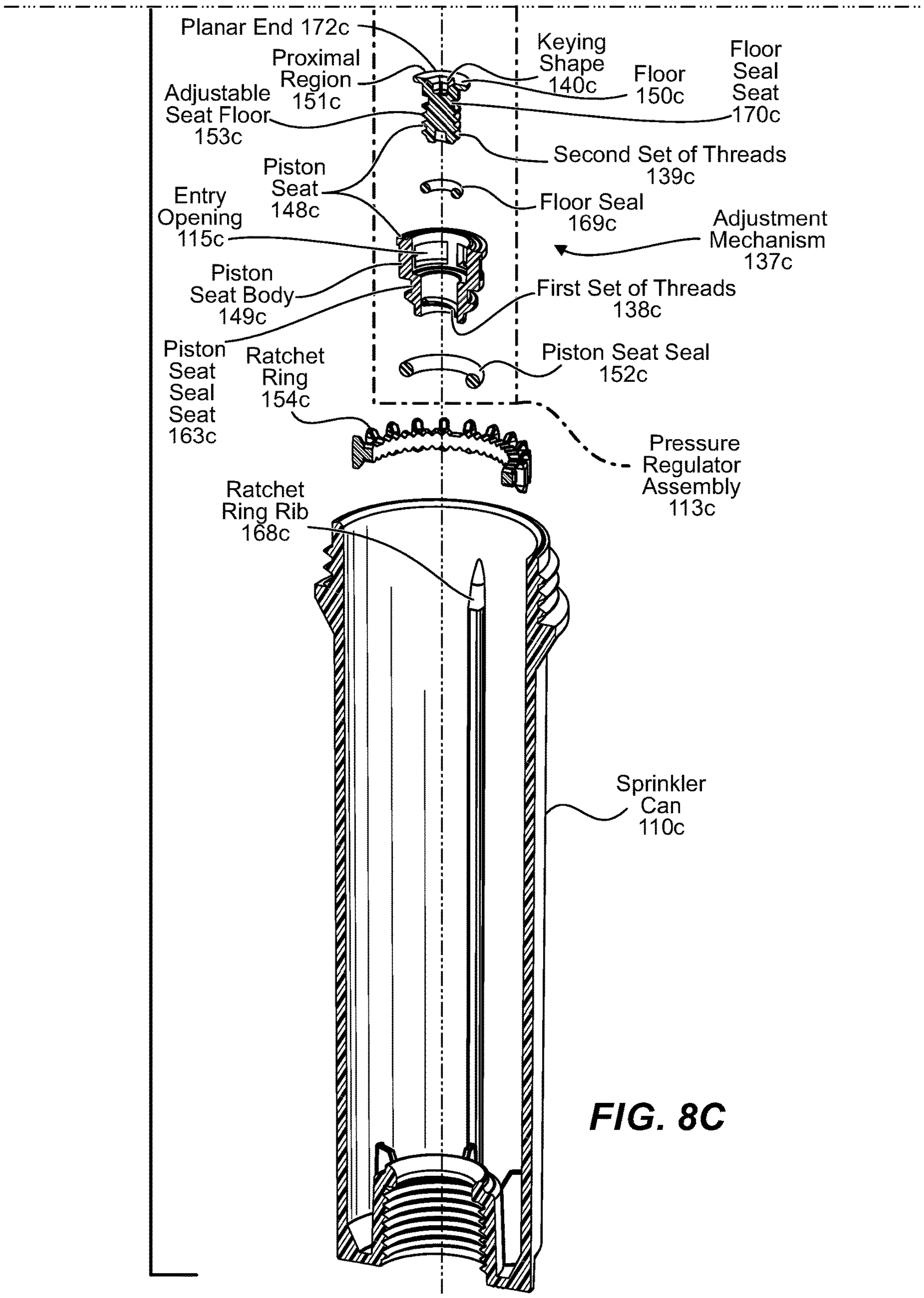
Figure 9A:
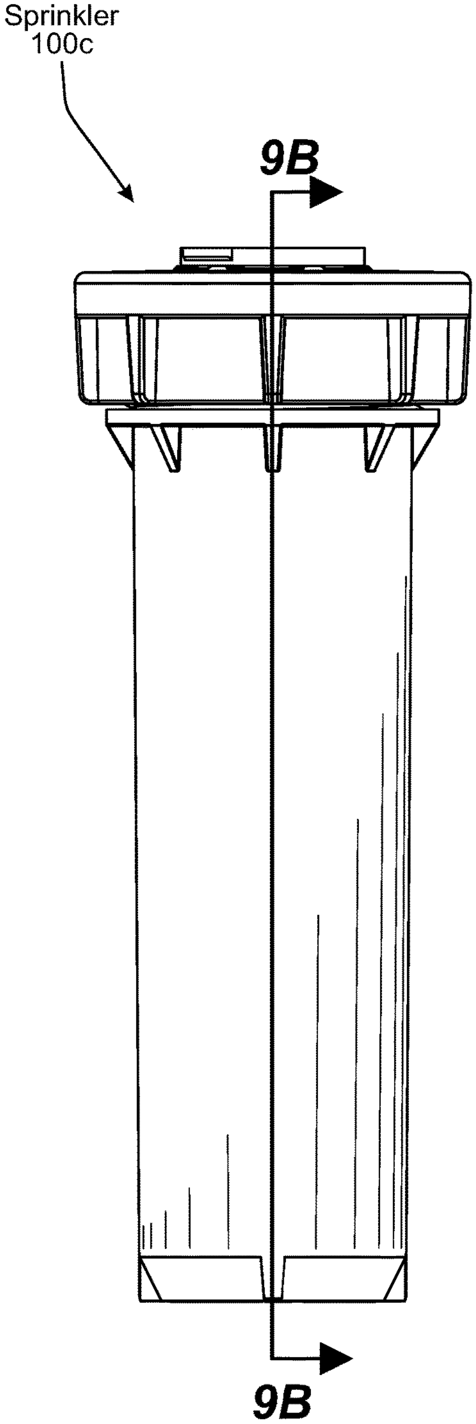
FIG. 9A is a side elevational view of the third embodiment of the variable pressure regulator within the sprinkler.
Figure 9B:
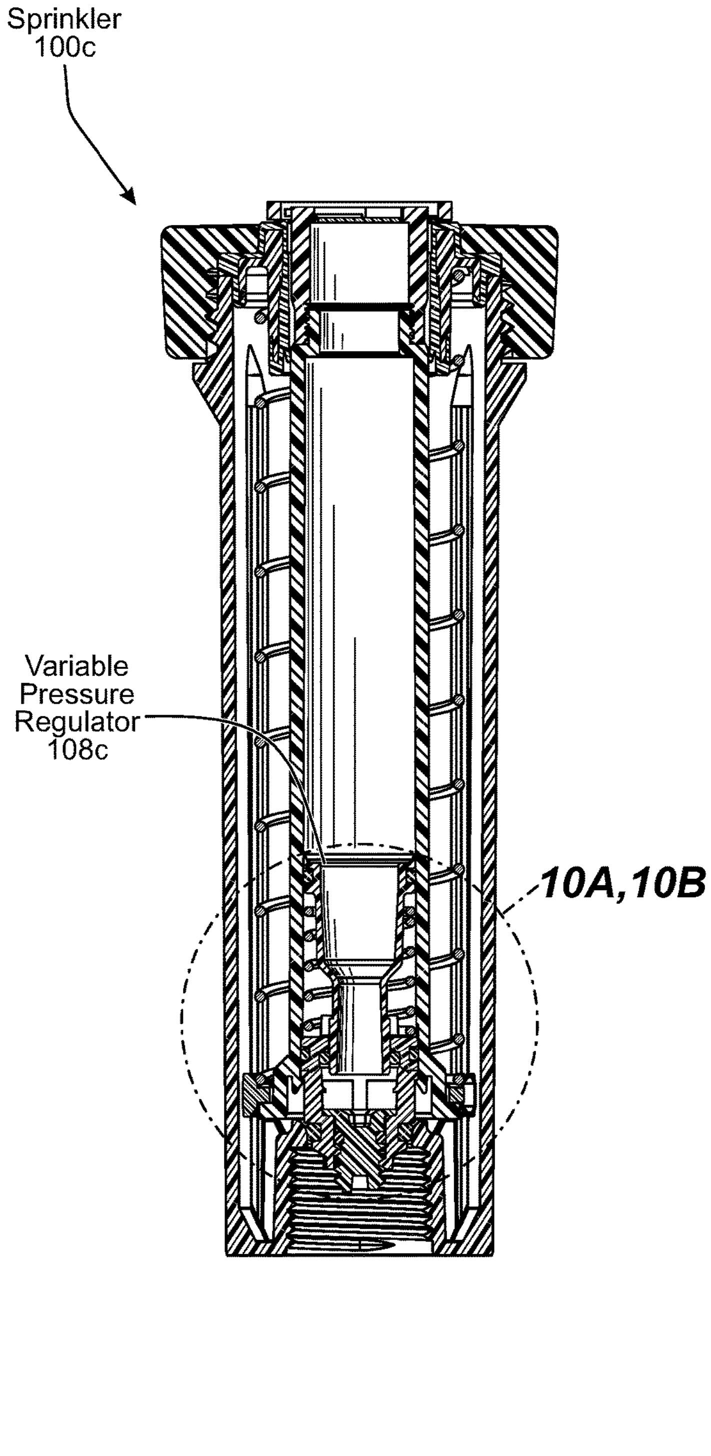
FIG. 9B is a cross-sectional side elevational view of the third embodiment of the variable pressure regulator within the sprinkler taken across the line 9B-9B in FIG. 9A.
Figure 10A:
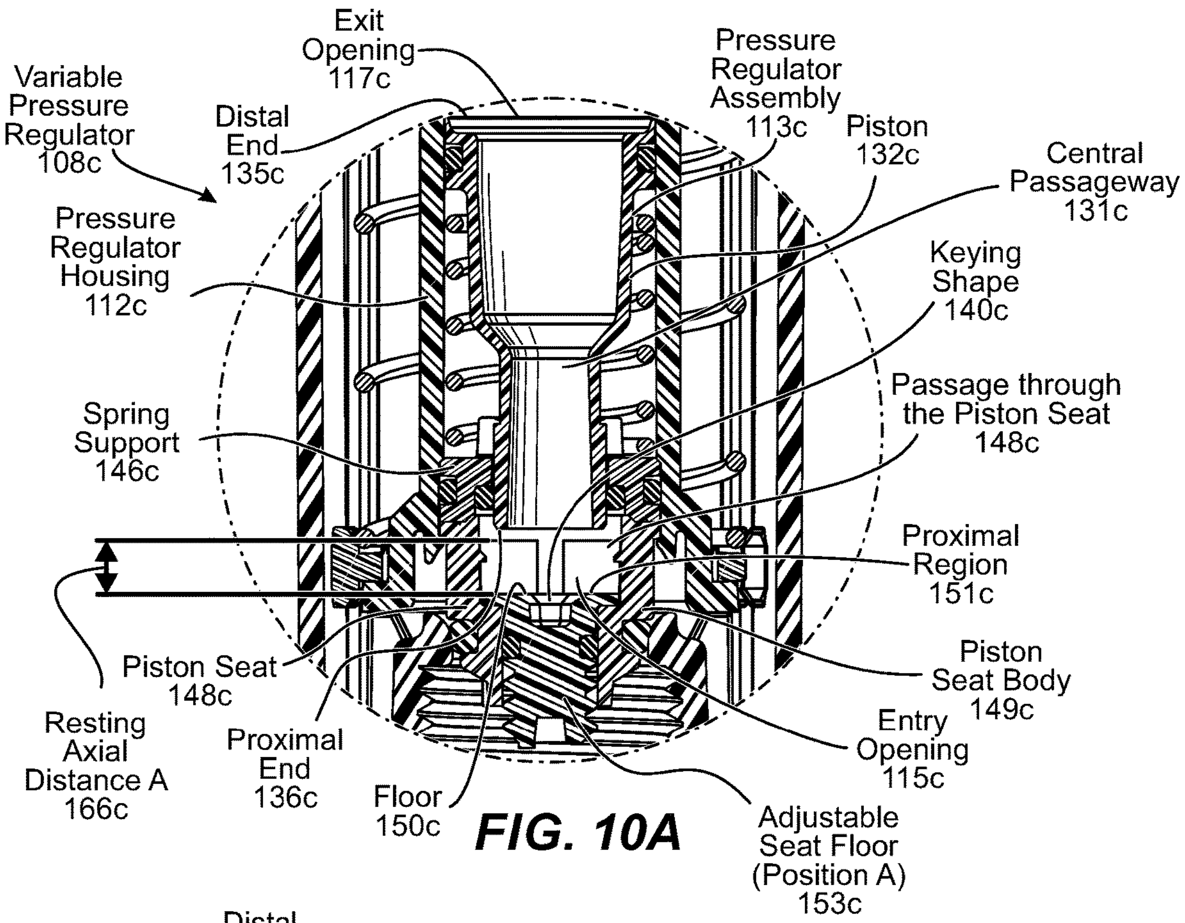
FIGS. 10A-B comprise side elevational cross-sectional views of the region 10A, 10B of FIG. 9B of the third embodiment of the variable pressure regulator within the sprinkler in different user-specified positions and in a resting state.
Figure 10B:
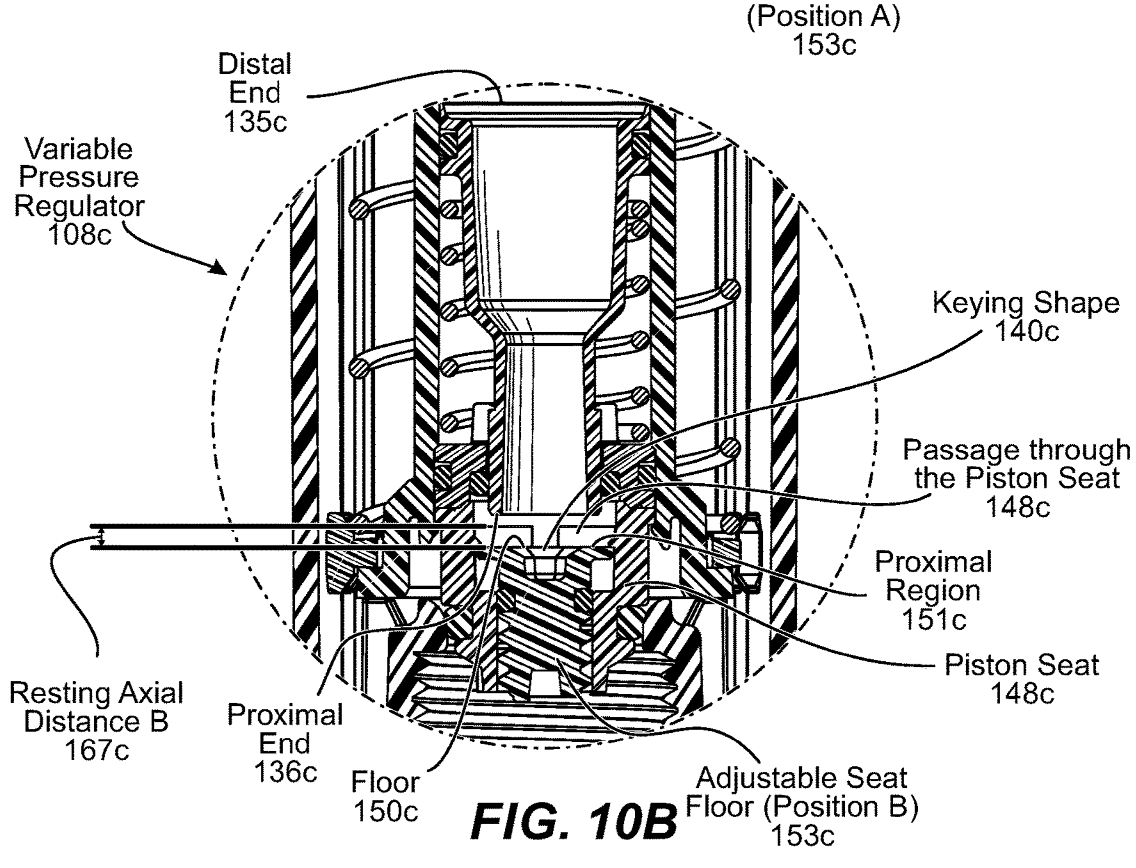

FIGS. 7A-10B illustrate a third embodiment of a variable pressure regulator 108*c* employed within a sprinkler 100*c*. These figures will be addressed collectively such that components may be labeled with reference numerals in one or more of the figures but not necessarily in all of these figures. Accordingly, some aspects of FIGS. 7A-10B may be described concurrently, while reference to specific figures may be explicitly indicated. FIGS. 7A-C comprise a perspective, exploded view of a third embodiment of a variable pressure regulator 108*c* within a sprinkler 100*c*. FIGS. 8A-C comprise a perspective, exploded cross-sectional view of the third embodiment of the variable pressure regulator 108*c* within the sprinkler 100*c*. FIG. 9A is a side elevational view of the third embodiment of the variable pressure regulator 108*c* within the sprinkler 100*c*. FIG. 9B is a cross-sectional side elevational view of the third embodiment of the variable pressure regulator 108*c* within the sprinkler 100*c* taken across the line 9B-9B in FIG. 9A. FIGS. 10A-B comprise side elevational cross-sectional views of the region 10A, 10B of FIG. 9B of the third embodiment of the variable pressure regulator 108*c* within the sprinkler 100*c* in different user-specified positions and in a resting state.

This third embodiment of the variable pressure regulator 108*c* alters a position of a proximal region 151*c* of a floor 150*c* of a piston seat 148*c* (comprising a piston seat body 149*c* and an adjustable seat floor 153*c*) to regulate the pressure, as will be explained below.

Referring now generally to FIGS. 7A-10B, the sprinkler 100*c* may include a flush plug 118*c* (or a nozzle in place of the flush plug 118*c* with at least one example of a nozzle illustrated in subsequent figures), a cap 116*c*, a wiper seal 124*c*, a pop-up spring 126*c*, a pressure regulator housing 112*c*, a regulator spring 144*c*, a first piston seal 128*c*, a second piston seal 129*c*, a piston seat seal 152*c*, a piston 132*c*, a spring support seal 142*c*, a spring support 146*c*, a piston seat 148*c* comprising a piston seat body 149*c* and an adjustable seat floor 153*c*, a ratchet ring 154*c*, a sprinkler can 110*c* and/or a floor seal 169*c*.

The wiper seal 124*c* may engage with and form a seal with the pressure regulator housing 112*c*. The cap 116*c* engages the sprinkler can 110*c* and retains components within the enclosure formed thereby. The wiper seal 124*c* may include an opening through which the pressure regulator housing 112*c* may extend to varying degrees in an operating state (i.e., a state in which pressurized fluid is being supplied to the sprinkler 100*c*).

The pop-up spring 126*c* may be situated between the wiper seal 124*c* and a lip at the bottom of the pressure regulator housing 112*c*. In an operating state, the pop-up spring 126*c* may be compressed to allow the pressure regulator housing 112*c* to extend through the wiper seal 124*c* and cap 116*c*. In a resting state (e.g., when pressurized fluid is not provided to the sprinkler 100*c*), the pop-up spring 126*c* may expand causing the pressure regulator housing 112*c* to withdraw into the sprinkler can 110*c*. Thus, the pop-up spring 126*c* biases the pressure regulator housing 112*c* toward the retracted position 121*c* (which position is illustrated in FIG. 2A in connection with the first embodiment).

The pressure regulator housing 112*c* may comprise a pipe or channel to conduct pressurized fluid through the sprinkler 100*c* and house the pressure regulator assembly 113*c*. The pressure regulator housing 112*c* may include threads on a top portion of the pressure regulator housing 112*c* to allow engagement with a flush plug 118*c* or nozzle. As indicated above, when pressurized fluid is supplied to the sprinkler 100*c*, the pressurized fluid may force the pressure regulator housing 112*c* to extend from the sprinkler can 110*c*. The pressurized fluid may be dispersed from a nozzle secured to the top of the pressure regulator housing 112*c*.

The ratchet ring 154*c* may selectively engage with one or more ratchet ring ribs 168*c* in the interior of the sprinkler can 110*c*. The ratchet ring 154*c* may enable removal and rotation of the pressure regulator housing 112*c* relative to the sprinkler can 110*c*, such that the pressure regulator housing 112*c* may be rotated to and retained at a desired position relative to the sprinkler can 110*c*.

The sprinkler 100*c* may comprise a pressure regulator assembly 113*c* disposed within the pressure regulator housing 112*c*. The pressure regulator assembly 113*c* may comprise a regulator spring 144*c*, a first piston seal 128*c*, a second piston seal 129*c*, a piston seat seal 152*c*, a piston 132*c*, a spring support seal 142*c*, a spring support 146*c*, a piston seat 148*c* comprising a piston seat body 149*c* and an adjustable seat floor 153*c*, and/or a floor seal 169*c*. The pressure regulator assembly 113*c* may be disposed entirely or partially within the pressure regulator housing 112*c*.

The piston 132*c* may comprise a distal end 135*c* and a proximal end 136*c* with the proximal end 136*c* being closer to a proximal region 151*c* of the floor 150*c* of the piston seat 148*c* than the distal end 135*c* along the axial dimension 119*a* of the sprinkler 100*c* when the sprinkler 100*c* is assembled. (As noted above, the axial dimension 119*a* is the dimension along which fluid generally flows through the sprinkler 100*c*.) The proximal region 151*c* of the floor 150*c* may comprise that region of the floor 150*c* closest to the proximal end 136*c* of the piston 132*c* along the axial dimension 119*a*.

The pressure regulator assembly 113*c* may comprise a number of seals, namely, a first piston seal 128*c*, a second piston seal 129*c*, a spring support seal 142*c*, a piston seat seal 152*c*, and a floor seal 169*c*. When assembled, the first piston seal 128*c* may be positioned within a first piston seal seat 160*c* of the piston 132*c*; the second piston seal 129*c* may be situated within the second piston seal seat 161*c* of the piston 132*c*; the spring support seal 142*c* may be situated within the spring support seal seat 162*c* of the spring support 146*c*; the piston seat seal 152*c* may be situated within the piston seat seal seat 163*c* of the piston seat 148*c*; and a floor seal 169*c* may be positioned within the floor seal seat 170*c*. These seals 128*c*, 129*c*, 142*c*, 152*c*, 169*c* form a fluid-tight or nearly fluid-tight seal at the various locations to enable pressurized fluid to flow through the sprinkler 100*c* without being diverted to undesired pathways or locations.

The regulator spring 144*c* engages the piston 132*c* and the spring support 146*c* to bias the piston 132*c* away from the spring support 146*c*. The regulator spring 144*c* aids in the regulation of pressure of fluid passing through the sprinkler 100*c*, as will be explained below.

The piston seat 148*c* may comprise one or more entry openings 115*c* and a floor 150*c* comprising a proximal region 151*c*. As illustrated, the proximal region 151*c* may comprise a planar end 172*c*. As noted above, the proximal region 151*c* may comprise that portion of the floor 150*c* that is closest to the proximal end 136*c* of the piston 132*c*. In various embodiments, the proximal region 151*c* may comprise the entirety of the floor 150*c* or only a portion of the floor 150*c*. Fluid entering the sprinkler 100*c* may pass through the one or more entry openings 115*c*. In this third embodiment of the variable pressure regulator 108*c*, the piston seat 148*c* may comprise a piston seat body 149*c* and an adjustable seat floor 153*c*. This configuration of the piston seat 148*c* enables pressure regulation in this third embodiment of the variable pressure regulator 108*c*.

The variable pressure regulator 108*c* may comprise an adjustment mechanism 137*c* to alter the pressure of fluid flowing through the sprinkler 100*c*. In the embodiment illustrated in these figures (FIGS. 7A-10B), the adjustment mechanism 137*c* may comprise a threaded adjustment mechanism. In the illustrated embodiment, the adjustment mechanism 137*c* may comprise a first set of threads 138*c* on the piston seat body 149*c* and a second set of threads 139*c* on the adjustable seat floor 153*c*. The first set of threads 138*c* and the second set of threads 139*c* may be mutually engaged such that rotational movement of the adjustable seat floor 153*c* alters a distance intermediate the proximal end 136*c* of the piston 132*c* and the proximal region 151*c* of the floor

150*c* when the sprinkler 100*c* is in a resting state. (This distance may be referred to as a resting axial distance 166*c*, 167*c*, which is illustrated in FIGS. 10A-10B.) Accordingly, the position of the proximal region 151*c* of the floor 150*c* along the axial dimension 119*a* may be altered employing the adjustment mechanism 137*c*. As noted, the adjustment mechanism 137*c* illustrated in this third embodiment is a threaded adjustment mechanism. In alternative embodiments, for example, a snap-fit adjustment mechanism may be employed, as will be explained below.

The first set of threads 138*c* and the second set of threads 139*c* may be outwardly or inwardly projecting so long as the threads 138*c*, 139*c* mutually engage. Thus, the first set of threads 138*c* and the second set of threads 139*c* may be outwardly or inwardly projecting.

The adjustable seat floor 153*c* may include a keying shape 140*c* to engage with a tool, which may comprise, for example, a screwdriver having a standard head or Phillips head, or an Allen wrench having a hexagonal-shaped head. In various embodiments, the keying shape 140*c* may be accessed either from a top or a bottom of the sprinkler 100*c* to engage and rotate the adjustable seat floor 153*c* to alter the resting axial distance 166*c*, 167*c*. As illustrated, the keying shape 140*c* in the third embodiment of the variable pressure regulator 108*c* is accessible only from a top of the sprinkler 100*c* when the sprinkler 100*c* is assembled. In various alternative embodiments, a second keying shape may be positioned (additionally or alternatively) on the opposite end of the adjustable seat floor 153*c* to enable access from a bottom of the sprinkler 100*c*.

Referring now specifically to FIGS. 10A-10B, altering a position of the adjustable seat floor 153*c* along the axial dimension 119*a* may change the pressure of the pressurized fluid exiting the sprinkler 100*c* when the sprinkler 100*c* is in an operating state. For example, as the adjustable seat floor 153*c* is extended from the piston seat body 149*c*, entry openings 115*c* in the piston seat 148*c* may be at least partially obstructed, resulting in a reduction in pressure during operation (i.e., the pressure of the equilibrium state is reduced during operation of the sprinkler 100*c*). As the adjustable seat floor 153*c* is retracted into the piston seat body 149*c*, the entry openings 115*c* in the piston seat 148*c* are less obstructed, thereby increasing the pressure of fluid exiting the sprinkler 100*c*. Thus, employing the keying shape 140*c*, the adjustable seat floor 153*c* may be rotated to alter pressure of fluid exiting the sprinkler 100*c* in an operating state.

The regulator spring 144*c* applies a force in a downstream direction 109*a* to the piston 132*c* along the axial dimension 119*a* (i.e., the regulator spring 144*c* pushes the piston 132*c* away from the spring support 146*c*). In an operating state (with a pressurized fluid passing through the sprinkler 100*c*), a nozzle reduces the outflow of the fluid from the sprinkler 100*c* and creates a pressurized chamber downstream of the piston 132*c*. Pressure resulting from this pressurized chamber, if sufficient, may cause the piston 132*c* to move axially upstream (i.e., toward the spring support 146*c*) until an equilibrium state is reached in response to the counterbalancing axial force applied by the regulator spring 144*c*. Altering a position of the adjustable seat floor 153*c* along the axial dimension 119*a* may reduce, increase, or alter fluid flowing through entry openings 115*c* in the piston seat 148*c* to increase, restrict, or alter the movement of fluid through the entry openings 115*c* in the piston seat 148*c*, thereby causing an equilibrium to be reached at a lower or higher pressurized state. Thus, a variable pressure regulator 108*c*, which may comprise the pressure regulator housing 112*c* and the pressure regulator assembly 113*c*, may operate to alter the pressure of fluid exiting the sprinkler 100*c*. In various embodiments, the variable pressure regulator 108*c* may be designed to alter pressure between approximately 30 psi and 40 psi. (As used herein, "approximately" means plus or minus 5 psi.)

Referring still specifically to FIGS. 10A-10B, an enlarged view of a portion of the sprinkler 100*c* is illustrated in two user-controlled positions in a resting state. More specifically, FIG. 10A illustrates the adjustable seat floor 153*c* in position A with a resting axial distance A 166*c*, while FIG. 10B illustrates the adjustable seat floor 153*c* in position B with a resting axial distance B 167*c*. As illustrated, in an operating state, fluid flows through the entry openings 115*c* of the piston seat 148*c* through the central passageway 131*c* (defined by the variable pressure regulator 108*c*) and exits the one or more exit openings 117*c* at a distal end 135*c* of the piston 132*c*.

As indicated in FIG. 10A, in an operating state with the adjustable seat floor 153*c* in position A, the pressurized fluid may flow through the pressure regulator housing 112*c* of the sprinkler 100*c* without pressure reduction or with less restriction than when the adjustable seat floor 153*c* is in position B. In FIG. 10B, the adjustable seat floor 153*c* is illustrated in position B. As can be observed, the adjustable seat floor 153*c* extends into the central passageway 131*c* and toward the proximal end 136*c* of the piston 132*c*, causing the resting axial distance 167*c* between the proximal region 151*c* of the floor 150*c* and the proximal end 136*c* of the piston 132*c* to decrease, resulting in a reduction in pressure during operation (i.e., the pressure of the equilibrium state is reduced during operation of the sprinkler 100*c*). The full extent of the variation of the position of the adjustable seat floor 153*c* relative to the piston 132*c* may be altered within the scope of the disclosed subject matter (i.e., beyond the variation illustrated in FIGS. 10A-10B). In other words, the resting axial distance A 166*c* and resting axial distance B 167*c* shown in FIGS. 10A-10B are merely illustrative.

It should be noted that the third embodiment shown in FIGS. 7A-10B is merely illustrative. Those skilled in the art will appreciate that many features of the disclosed embodiment may be varied within the scope of the claimed and disclosed subject matter. For example, the shape of the piston 132*c* may be varied which may alter how and the extent to which the piston 132*c* responds to upstream pressure.

Fourth Embodiment (FIGS. 11A-14B)

Figure 11A:
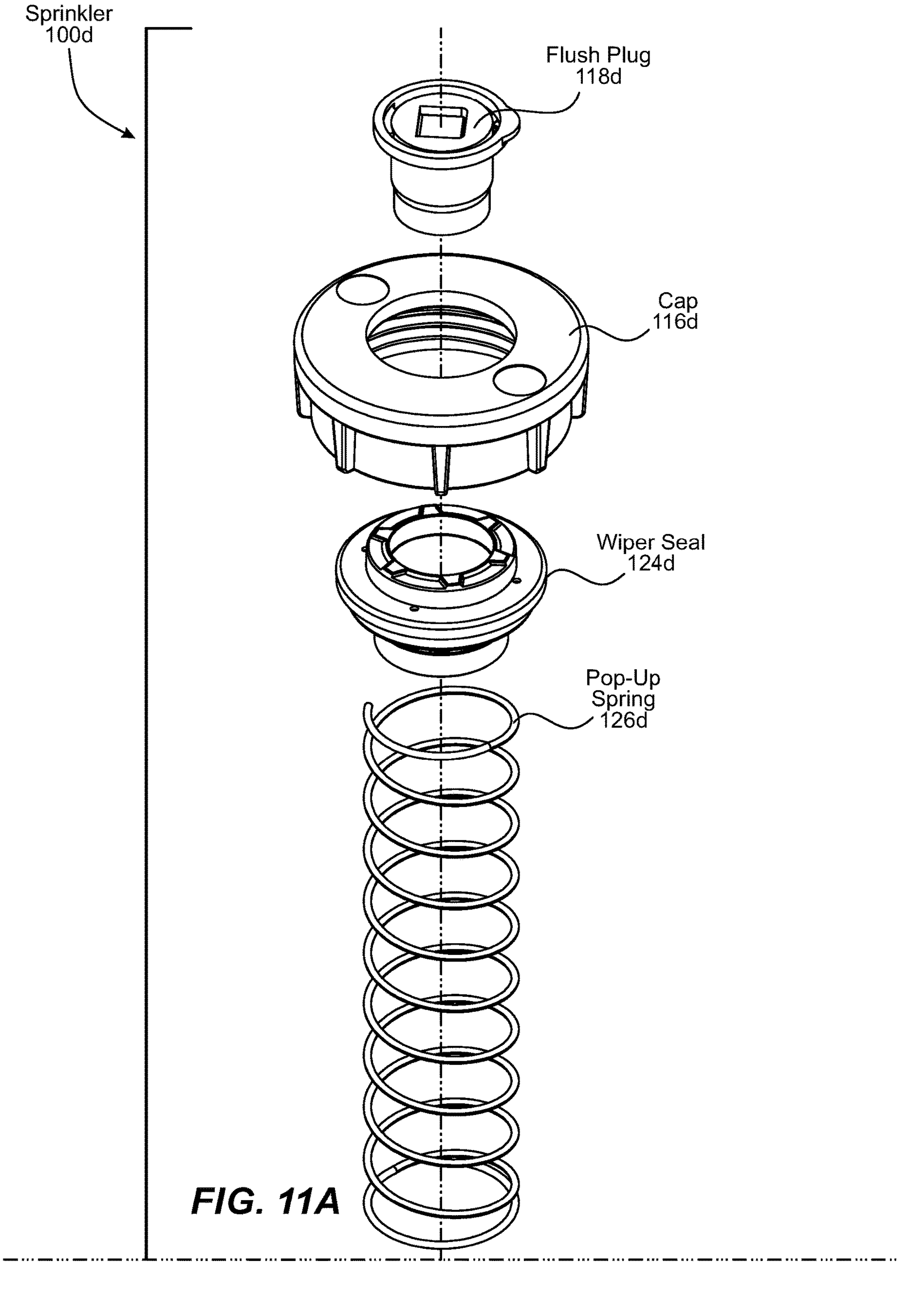
FIGS. 11A-C comprise a perspective, exploded view of a fourth embodiment of a variable pressure regulator within a sprinkler.
Figure 11B:
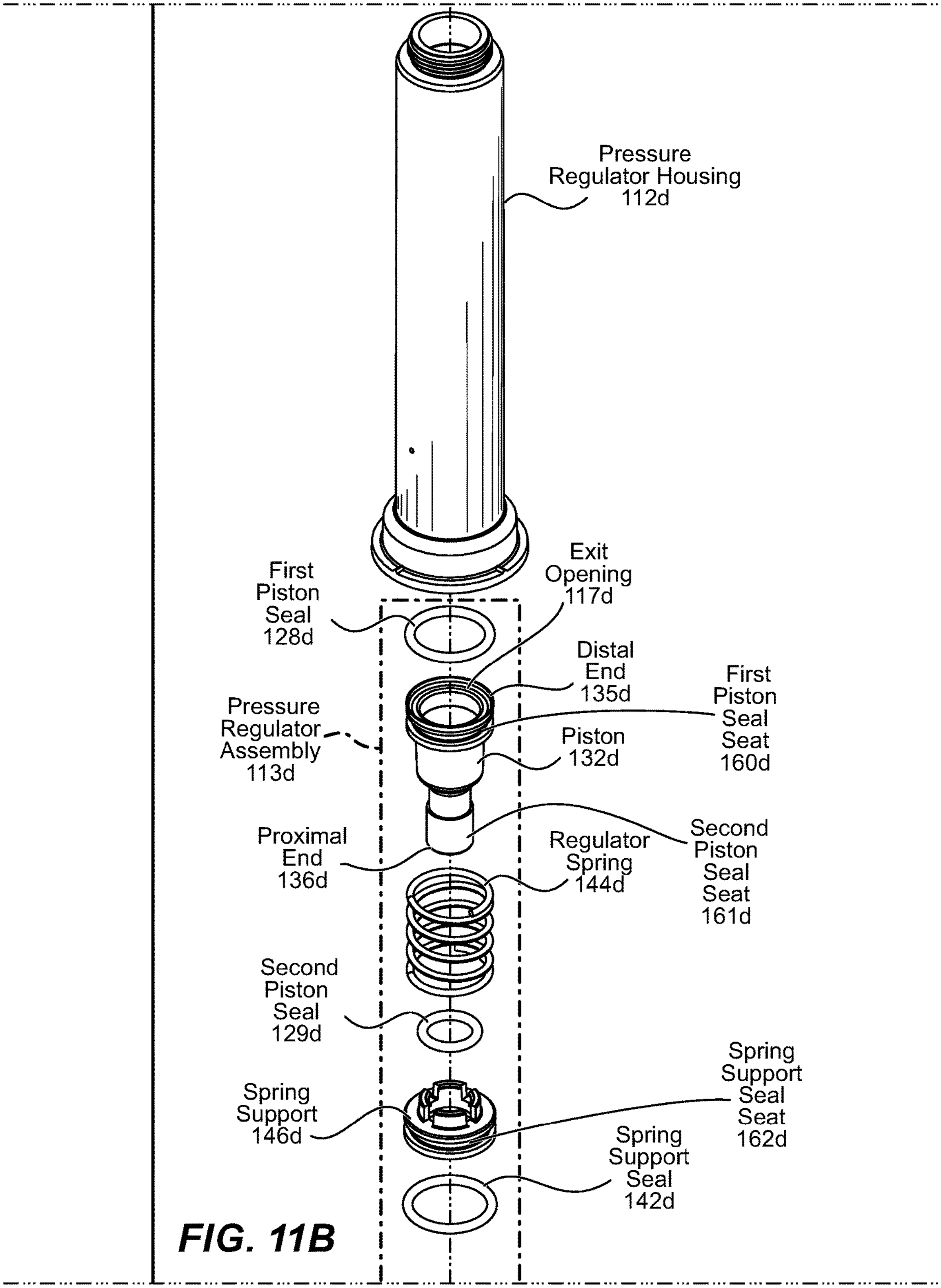
Figure 11C:
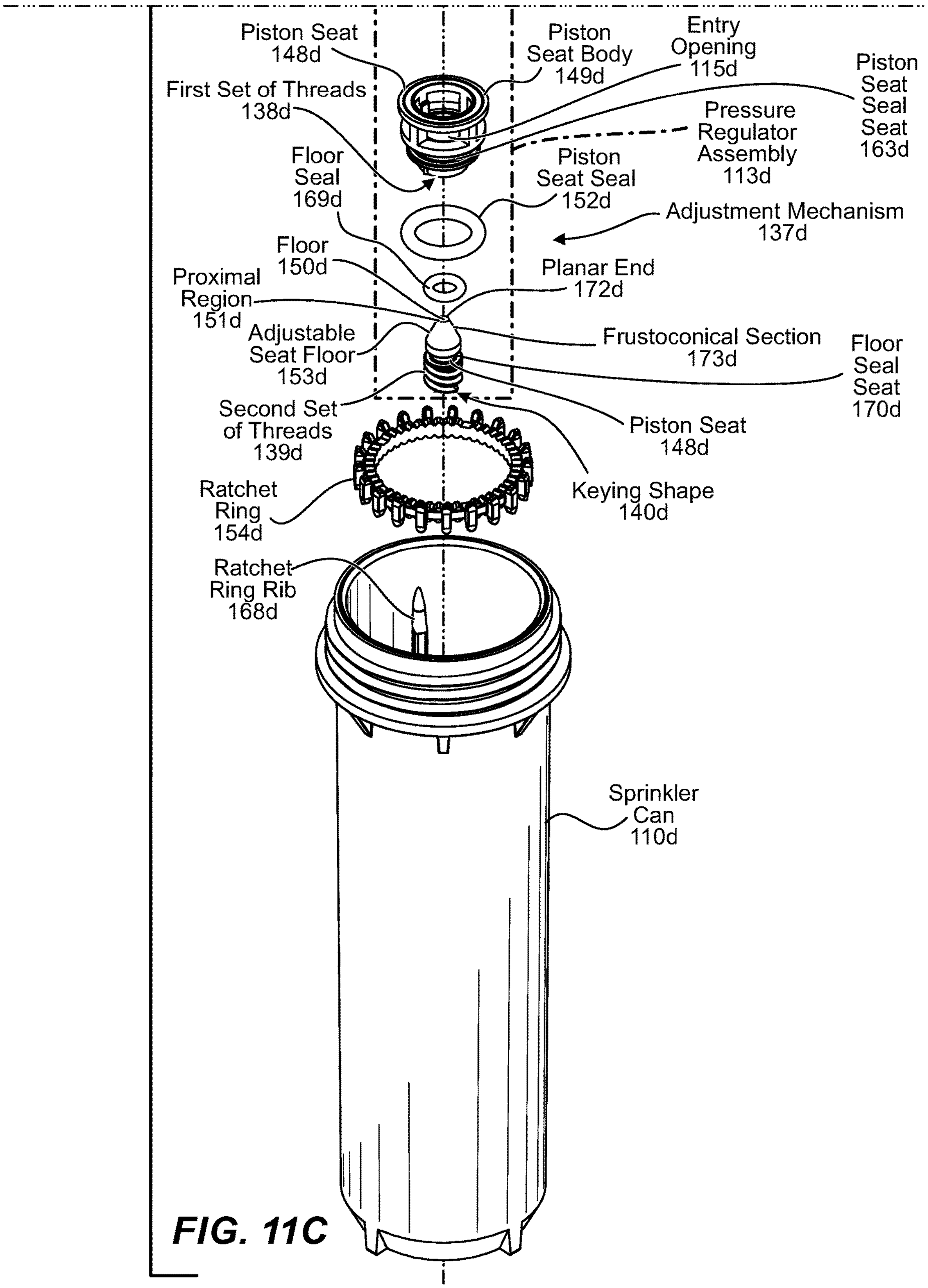
Figure 12A:
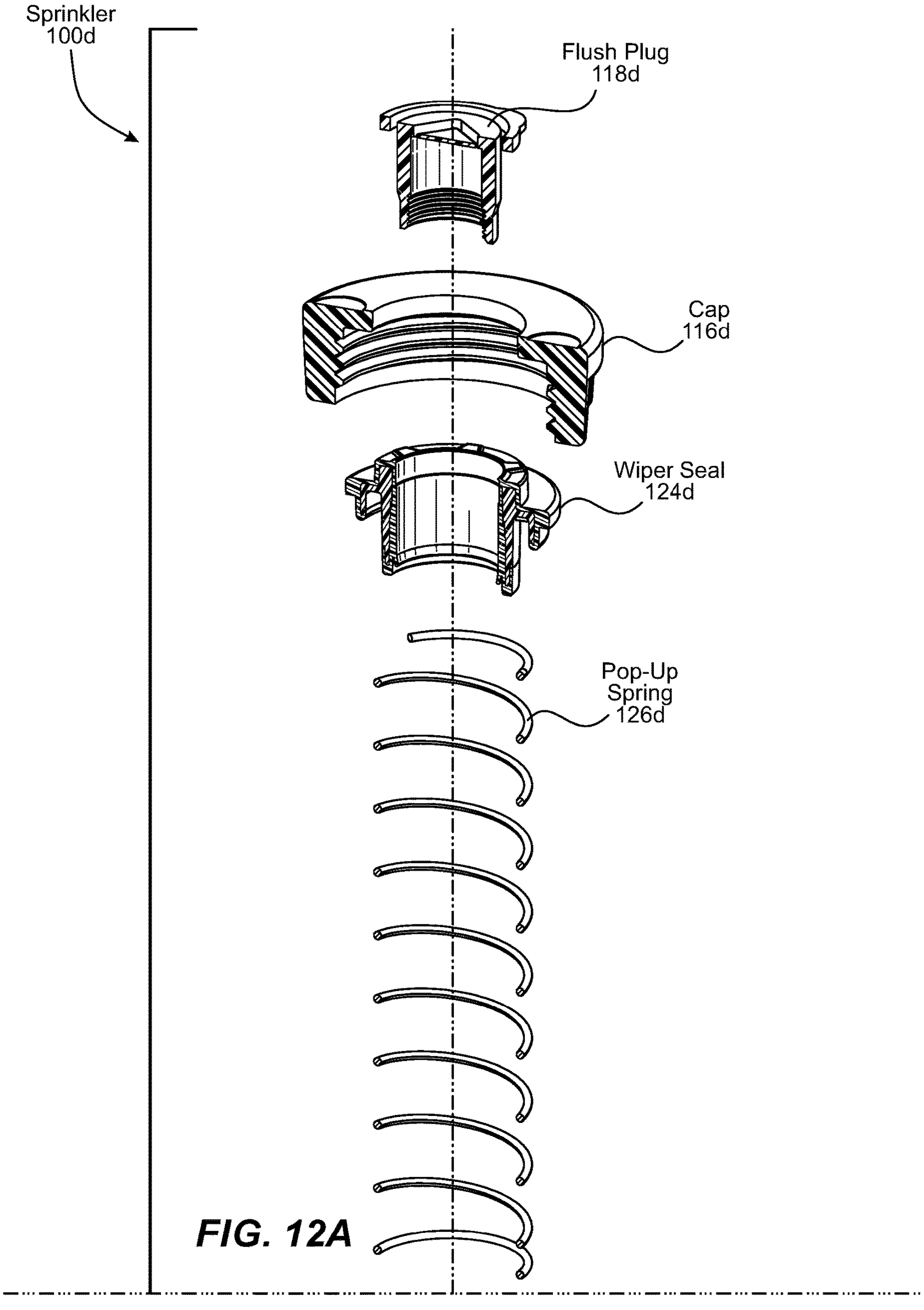
FIGS. 12A-C comprise a perspective, exploded cross-sectional view of the fourth embodiment of the variable pressure regulator within the sprinkler.
Figure 12B:
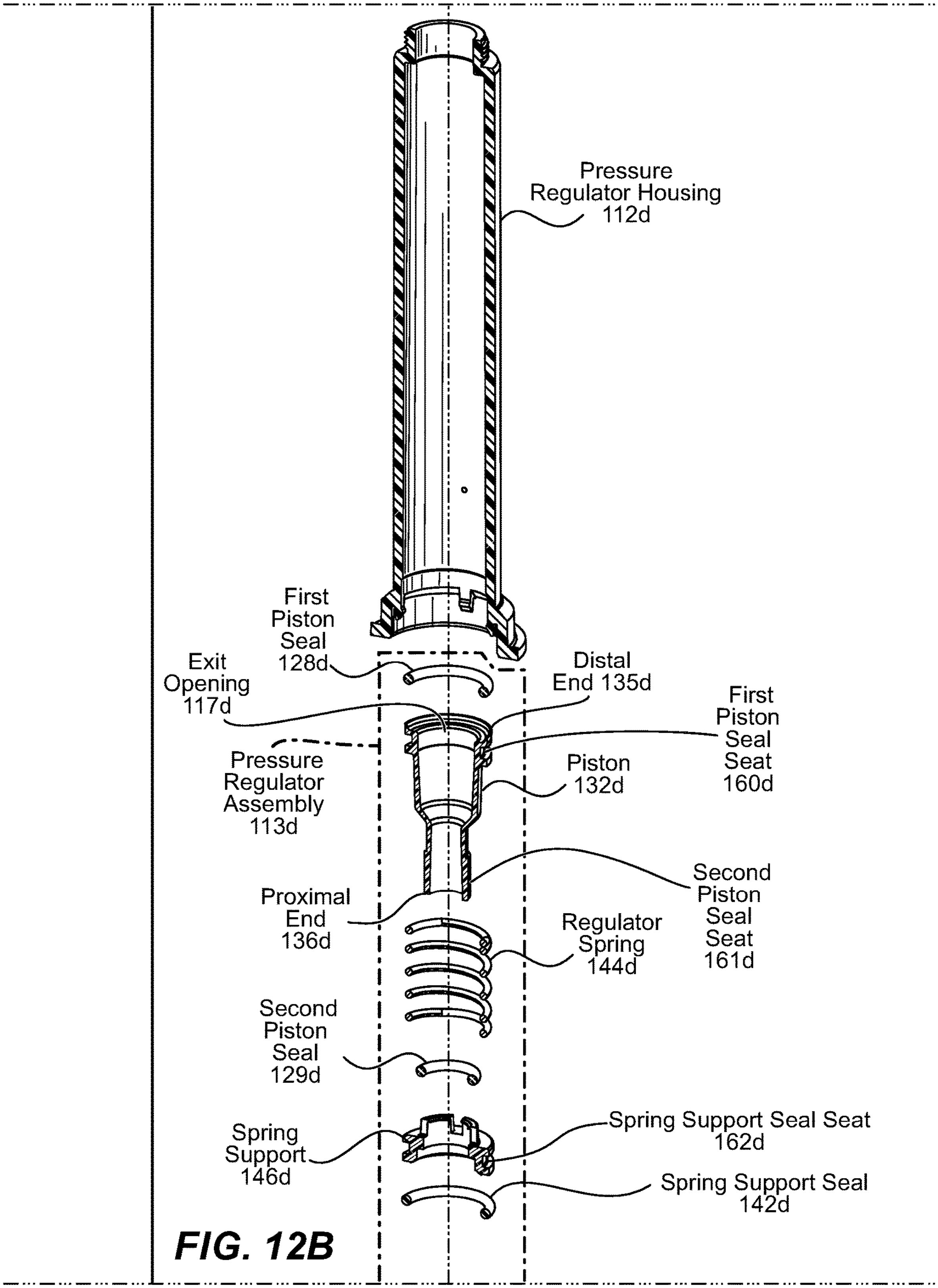
Figure 12C:
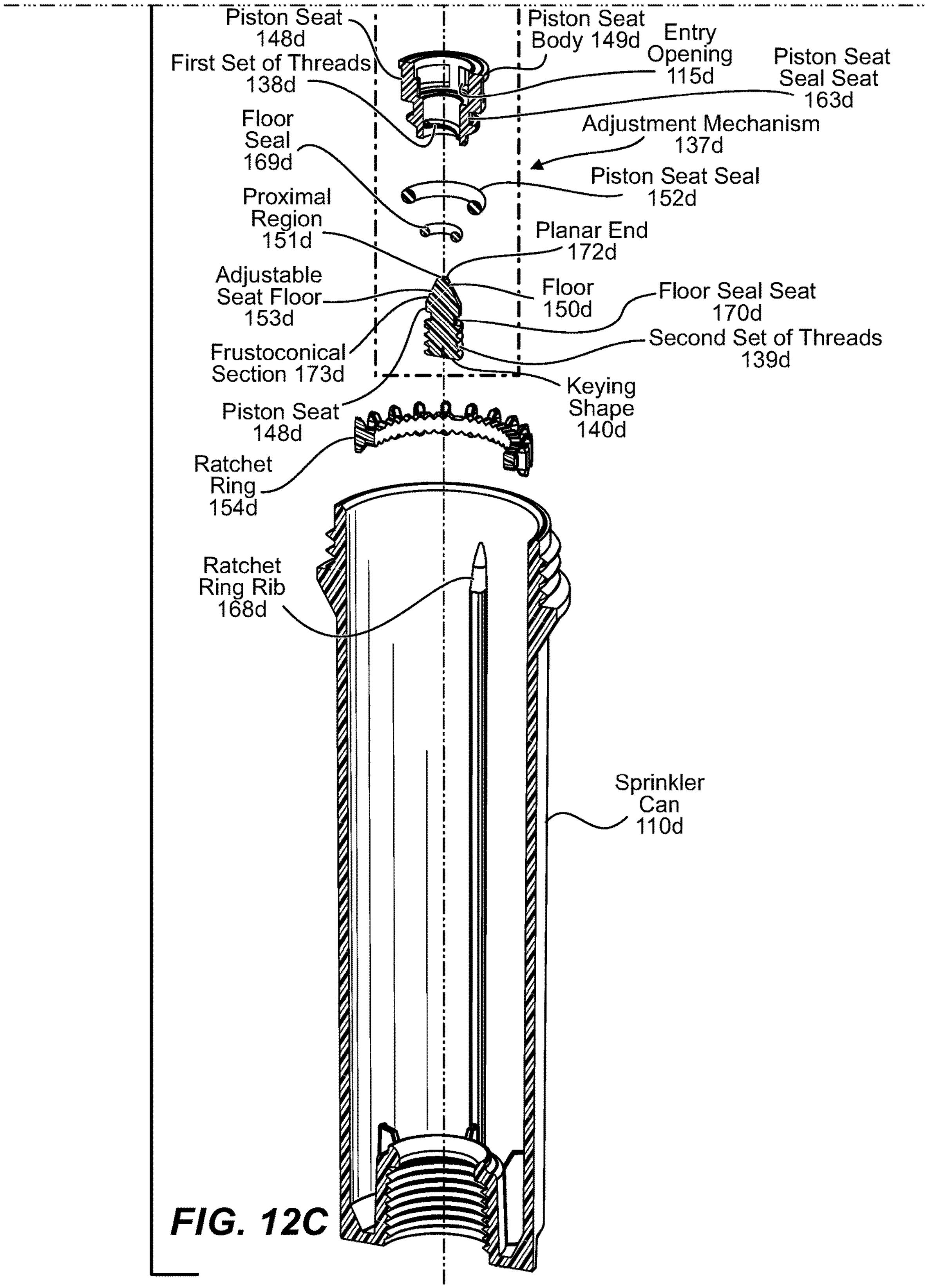
Figure 13A:
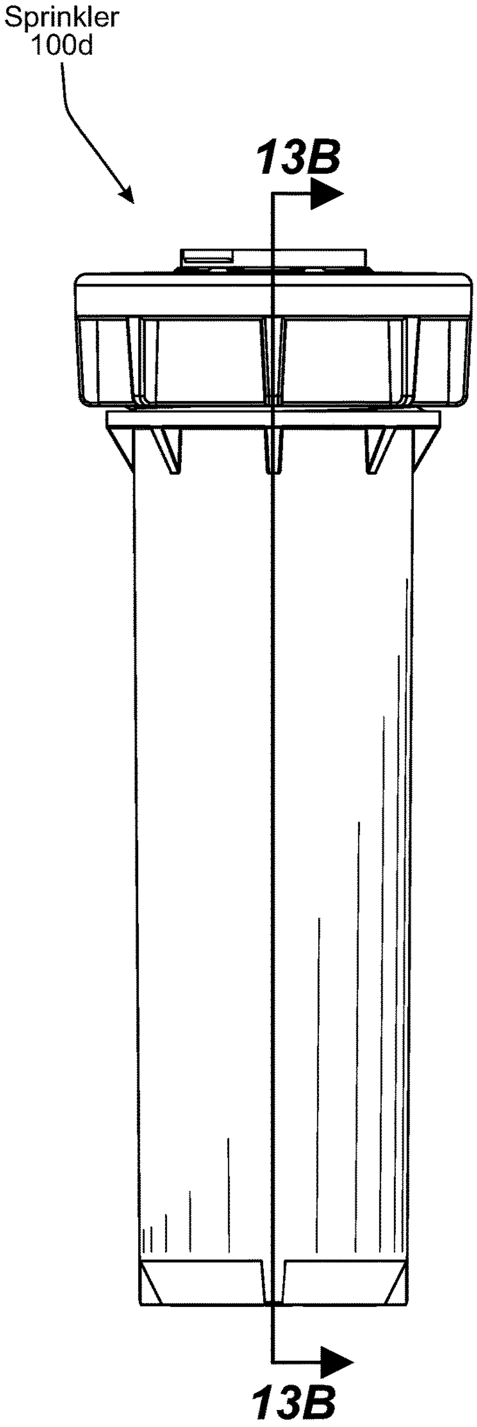
FIG. 13A is a side elevational view of the fourth embodiment of the variable pressure regulator within the sprinkler.
Figure 13B:
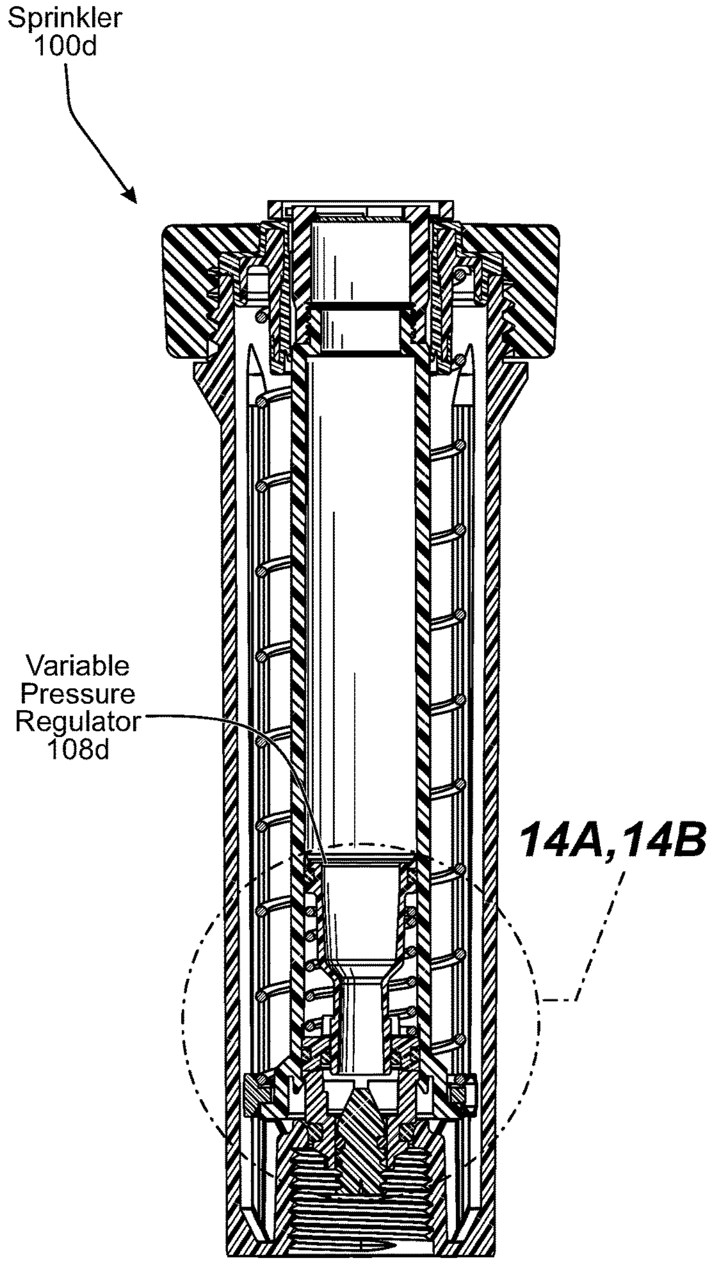
FIG. 13B is a cross-sectional side elevational view of the fourth embodiment of the variable pressure regulator within the sprinkler taken across the line 13B-13B in FIG. 13A.

FIGS. 11A-14B illustrate a fourth embodiment of a variable pressure regulator 108*d* employed within a sprinkler 100*d*. These figures will be addressed collectively such that components may be labeled with reference numerals in one or more of the figures but not necessarily in all of these figures. Accordingly, some aspects of FIGS. 11A-14B may be described concurrently, while reference to specific figures may be explicitly indicated. FIGS. 11A-C comprise a perspective, exploded view of a fourth embodiment of a variable pressure regulator 108*d* within a sprinkler 100*d*. FIGS. 12A-C comprise a perspective, exploded cross-sectional view of the fourth embodiment of the variable pressure regulator 108*d* within the sprinkler 100*d*. FIG. 13A is a side elevational view of the fourth embodiment of the variable pressure regulator 108*d* within the sprinkler 100*d*. FIG. 13B is a cross-sectional side elevational view of the fourth embodiment of the variable pressure regulator 108*d* within the sprinkler 100*d* taken across the line 13B-13B in FIG.

Figure 14A:
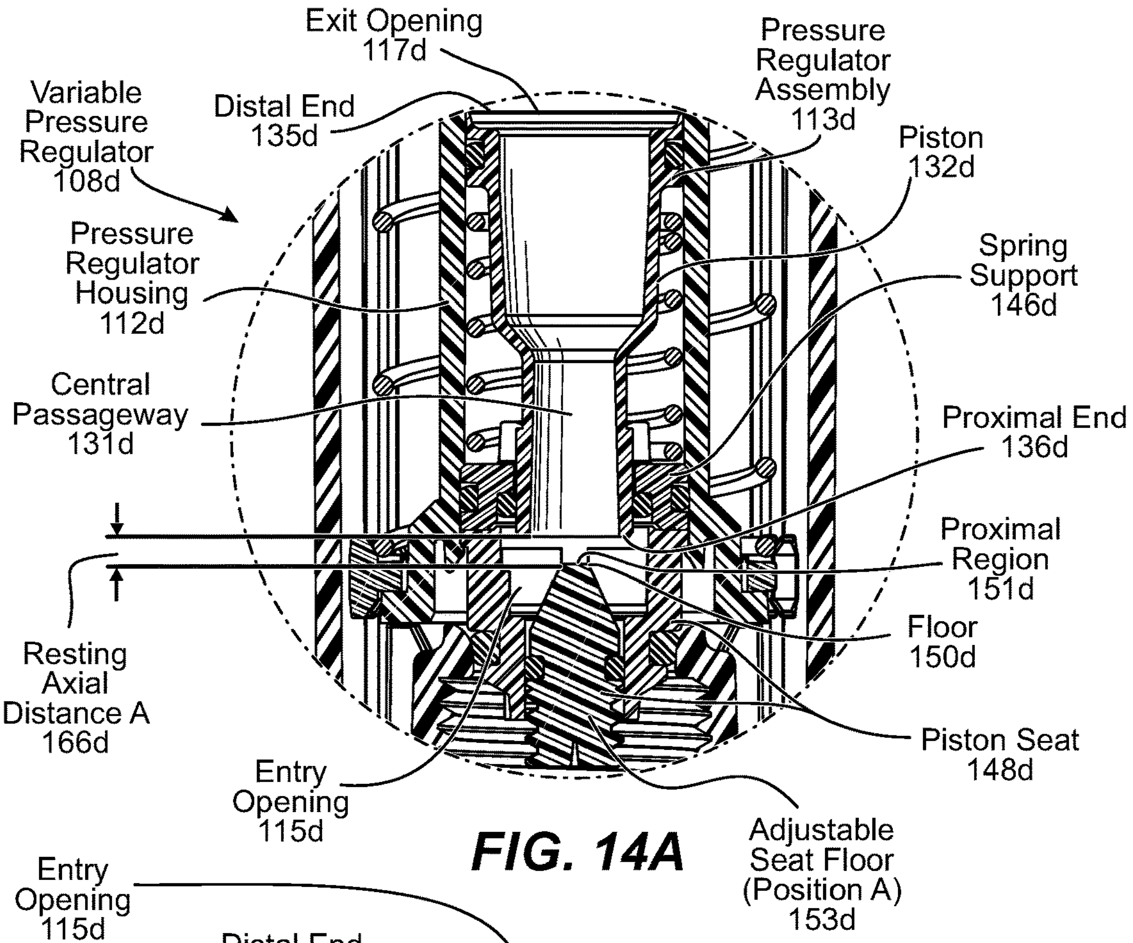
FIGS. 14A-B comprise side elevational cross-sectional views of the region 14A, 14B of FIG. 13B of the fourth embodiment of the variable pressure regulator within the sprinkler in different user-specified positions and in a resting state.
Figure 14B:
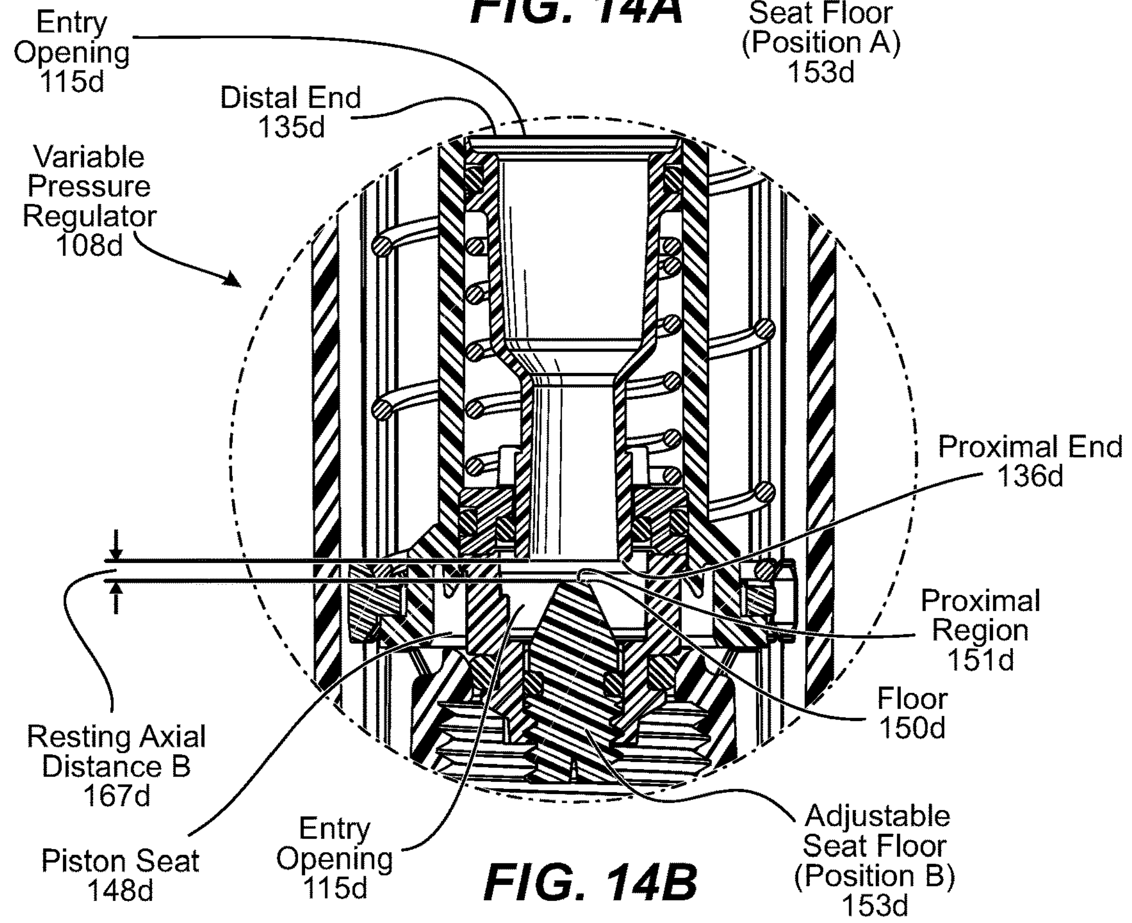

13A. FIGS. 14A-B comprise side elevational cross-sectional views of the region 14A, 14B of FIG. 13B of the fourth embodiment of the variable pressure regulator 108*d* within the sprinkler 100*d* in different user-specified positions and in a resting state.

This fourth embodiment of the variable pressure regulator 108*d* alters a position of a proximal region 151*d* of a floor 150*d* of a piston seat 148*d* (comprising a piston seat body 149*d* and an adjustable seat floor 153*d*) to regulate the pressure, as will be explained below. This fourth embodiment of the variable includes an adjustable seat floor 153*d* in contrast to the adjustable seat floor 153*c* of the third embodiment. The adjustable seat floor 153*d* may comprise a planar end 172*d* and a frustoconical section 173*d*.

Referring now generally to FIGS. 11A-14B, the sprinkler 100*d* may include a flush plug 118*d* (or a nozzle in place of the flush plug 118*d* with at least one example of a nozzle illustrated in subsequent figures), a cap 116*d*, a wiper seal 124*d*, a pop-up spring 126*d*, a pressure regulator housing 112*d*, a regulator spring 144*d*, a first piston seal 128*d*, a second piston seal 129*d*, a piston seat seal 152*d*, a piston 132*d*, a spring support seal 142*d*, a spring support 146*d*, a piston seat 148*d* comprising a piston seat body 149*d* and an adjustable seat floor 153*d*, a ratchet ring 154*d*, a sprinkler can 110*d* and/or a floor seal 169*d*.

The wiper seal 124*d* may engage with and form a seal with the pressure regulator housing 112*d*. The cap 116*d* engages the sprinkler can 110*d* and retains components within the enclosure formed thereby. The wiper seal 124*d* may include an opening through which the pressure regulator housing 112*d* may extend to varying degrees in an operating state (i.e., a state in which pressurized fluid is being supplied to the sprinkler 100*d*).

The pop-up spring 126*d* may be situated between the wiper seal 124*d* and a lip at the bottom of the pressure regulator housing 112*d*. In an operating state, the pop-up spring 126*d* may be compressed to allow the pressure regulator housing 112*d* to extend through the wiper seal 124*d* and cap 116*d*. In a resting state (e.g., when pressurized fluid is not provided to the sprinkler 100*d*), the pop-up spring 126*d* may expand causing the pressure regulator housing 112*d* to withdraw into the sprinkler can 110*d*. Thus, the pop-up spring 126*d* biases the pressure regulator housing 112*d* toward the retracted position 121*d* (which position is illustrated in FIG. 2A in connection with the first embodiment).

The pressure regulator housing 112*d* may comprise a pipe or channel to conduct pressurized fluid through the sprinkler 100*d* and house the pressure regulator assembly 113*d*. The pressure regulator housing 112*d* may include threads on a top portion of the pressure regulator housing 112*d* to allow engagement with a flush plug 118*d* or nozzle. As indicated above, when pressurized fluid is supplied to the sprinkler 100*d*, the pressurized fluid may force the pressure regulator housing 112*d* to extend from the sprinkler can 110*d*. The pressurized fluid may be dispersed from a nozzle secured to the top of the pressure regulator housing 112*d*.

The ratchet ring 154*d* may selectively engage with one or more ratchet ring ribs 168*d* in the interior of the sprinkler can 110*d*. The ratchet ring 154*d* may enable removal and rotation of the pressure regulator housing 112*d* relative to the sprinkler can 110*d*, such that the pressure regulator housing 112*d* may be rotated to and retained at a desired position relative to the sprinkler can 110*d*.

The sprinkler 100*d* may comprise a pressure regulator assembly 113*d* disposed within the pressure regulator housing 112*d*. The pressure regulator assembly 113*d* may comprise a regulator spring 144*d*, a first piston seal 128*d*, a second piston seal 129*d*, a piston seat seal 152*d*, a piston 132*d*, a spring support seal 142*d*, a spring support 146*d*, a piston seat 148*d* comprising a piston seat body 149*d* and an adjustable seat floor 153*d*, and/or a floor seal 169*d*. The pressure regulator assembly 113*d* may be disposed entirely or partially within the pressure regulator housing 112*d*.

The piston 132*d* may comprise a distal end 135*d* and a proximal end 136*d* with the proximal end 136*d* being closer to a proximal region 151*d* of the floor 150*d* of the piston seat 148*d* than the distal end 135*d* along the axial dimension 119*a* of the sprinkler 100*d* when the sprinkler 100*d* is assembled. (As noted above, the axial dimension 119*a* is the dimension along which fluid generally flows through the sprinkler 100*d*.) The proximal region 151*d* of the floor 150*d* may comprise that region of the floor 150*d* closest to the proximal end 136*d* of the piston 132*d* along the axial dimension 119*a*.

The pressure regulator assembly 113*d* may comprise a number of seals, namely, a first piston seal 128*d*, a second piston seal 129*d*, a spring support seal 142*d*, a piston seat seal 152*d*, and a floor seal 169*d*. When assembled, the first piston seal 128*d* may be positioned within a first piston seal seat 160*d* of the piston 132*d*; the second piston seal 129*d* may be situated within the second piston seal seat 161*d* of the piston 132*d*; the spring support seal 142*d* may be situated within the spring support seal seat 162*d* of the spring support 146*d*; the piston seat seal 152*d* may be situated within the piston seat seal seat 163*d* of the piston seat 148*d*; and a floor seal 169*d* may be positioned within the floor seal seat 170*d*. These seals 128*d*, 129*d*, 142*d*, 152*d*, 169*d* form a fluid-tight or nearly fluid-tight seal at the various locations to enable pressurized fluid to flow through the sprinkler 100*d* without being diverted to undesired pathways or locations.

The regulator spring 144*d* engages the piston 132*d* and the spring support 146*d* to bias the piston 132*d* away from the spring support 146*d*. The regulator spring 144*d* aids in the regulation of pressure of fluid passing through the sprinkler 100*d*, as will be explained below.

The piston seat 148*d* may comprise one or more entry openings 115*d* and a floor 150*d* comprising a proximal region 151*d*. As illustrated, the proximal region 151*d* may comprise a planar end 172*d*. As noted above, the proximal region 151*d* may comprise that portion of the floor 150*d* that is closest to the proximal end 136*d* of the piston 132*d*. In various embodiments, the proximal region 151*d* may comprise the entirety of the floor 150*d* or only a portion of the floor 150*d*. Fluid entering the sprinkler 100*d* may pass through the one or more entry openings 115*d*. In this fourth embodiment of the variable pressure regulator 108*d*, the piston seat 148*d* may comprise a piston seat body 149*d* and an adjustable seat floor 153*d*. This configuration of the piston seat 148*d* enables pressure regulation in this fourth embodiment of the variable pressure regulator 108*d*.

The variable pressure regulator 108*d* may comprise an adjustment mechanism 137*d* to alter the pressure of fluid flowing through the sprinkler 100*d*. In the fourth embodiment illustrated in these figures (FIGS. 11A-14B), the adjustment mechanism 137*d* may comprise a threaded adjustment mechanism. In the illustrated fourth embodiment, the adjustment mechanism 137*d* may comprise a first set of threads 138*d* on the piston seat body 149*d* and a second set of threads 139*d* on the adjustable seat floor 153*d*. The first set of threads 138*d* and the second set of threads 139*d* may be mutually engaged such that rotational movement of the adjustable seat floor 153*d* alters a distance intermediate the proximal end 136*d* of the piston 132*d* and the proximal region 151*d* of the floor 150*d* when the sprinkler 100*d* is in a resting state. (This distance may be referred to as a resting axial distance 166*d*, 167*d*, which is illustrated in FIGS. 14A-14B.) Accordingly, the position of the proximal region 151*d* of the floor 150*d* along the axial dimension 119*a* may be altered employing the adjustment mechanism 137*d*. As noted, the adjustment mechanism 137*d* illustrated in this fourth embodiment is a threaded adjustment mechanism. In alternative embodiments, for example, a snap-fit adjustment mechanism may be employed, as will be explained below.

The first set of threads 138*d* and the second set of threads 139*d* may be outwardly or inwardly projecting so long as the threads 138*d*, 139*d* mutually engage. Thus, the first set of threads 138*d* and the second set of threads 139*d* may be outwardly or inwardly projecting.

The adjustable seat floor 153*d* may include a keying shape 140*d* to engage with a tool, which may comprise, for example, a screwdriver having a standard head or Phillips head, or an Allen wrench having a hexagonal-shaped head. In various embodiments, the keying shape 140*d* may be accessed either from a top or a bottom of the sprinkler 100*d* to engage and rotate the adjustable seat floor 153*d* to alter the resting axial distance 166*d*, 167*d*. As illustrated, the keying shape 140*d* in the fourth embodiment of the variable pressure regulator 108*d* is accessible only from a bottom of the sprinkler 100*d* when the sprinkler 100*d* is assembled. In various alternative embodiments, a second keying shape may be positioned (additionally or alternatively) on the opposite end of the adjustable seat floor 153*d* to enable access from a top of the sprinkler 100*d*.

Referring now specifically to FIGS. 14A-14B, altering a position of the adjustable seat floor 153*d* along the axial dimension 119*a* may change the pressure of the pressurized fluid exiting the sprinkler 100*d* when the sprinkler 100*d* is in an operating state. For example, as the adjustable seat floor 153*d* is extended from the piston seat body 149*d*, entry openings 115*d* in the piston seat 148*d* may be at least partially obstructed, resulting in a reduction in pressure during operation (i.e., the pressure of the equilibrium state is reduced during operation of the sprinkler 100*d*). As the adjustable seat floor 153*d* is retracted into the piston seat body 149*d*, the entry openings 115*d* in the piston seat 148*d* are less obstructed, thereby increasing the pressure of fluid exiting the sprinkler 100*d*. Thus, employing the keying shape 140*d*, the adjustable seat floor 153*d* may be rotated to alter pressure of fluid exiting the sprinkler 100*d* in an operating state.

The regulator spring 144*d* applies a force in a downstream direction 109*a* to the piston 132*d* along the axial dimension 119*a* (i.e., the regulator spring 144*d* pushes the piston 132*d* away from the spring support 146*d*). In an operating state (with a pressurized fluid passing through the sprinkler 100*d*), a nozzle reduces the outflow of the fluid from the sprinkler 100*d* and creates a pressurized chamber downstream of the piston 132*d*. Pressure resulting from this pressurized chamber, if sufficient, may cause the piston 132*d* to move axially upstream (i.e., toward the spring support 146*d*) until an equilibrium state is reached in response to the counterbalancing axial force applied by the regulator spring 144*d*. Altering a position of the adjustable seat floor 153*d* along the axial dimension 119*a* may reduce, increase, or alter fluid flowing through entry openings 115*d* in the piston seat 148*d* to increase, restrict, or alter the movement of fluid through the entry openings 115*d* in the piston seat 148*d*, thereby causing an equilibrium to be reached at a lower or higher pressurized state. Thus, a variable pressure regulator 108*d*, which may comprise the pressure regulator housing 112*d* and the pressure regulator assembly 113*d*, may operate to alter the pressure of fluid exiting the sprinkler 100*d*. In various embodiments, the variable pressure regulator 108*d* may be designed to alter pressure between approximately 30 psi and 40 psi. (As used herein, “approximately” means plus or minus 5 psi.)

Referring still specifically to FIGS. 14A-14B, an enlarged view of a portion of the sprinkler 100*d* is illustrated in two user-controlled positions in a resting state. More specifically, FIG. 14A illustrates the adjustable seat floor 153*d* in position A with a resting axial distance A 166*d*, while FIG. 14B illustrates the adjustable seat floor 153*d* in position B with a resting axial distance B 167*d*. As illustrated, in an operating state, fluid flows through the entry openings 115*d* of the piston seat 148*d* through the central passageway 131*d* (defined by the variable pressure regulator 108*d*) and exits the one or more exit openings 117*d* at a distal end 135*d* of the piston 132*d*.

As indicated in FIG. 14A, in an operating state with the adjustable seat floor 153*d* in position A, the pressurized fluid may flow through the pressure regulator housing 112*d* of the sprinkler 100*d* without pressure reduction or with less restriction than when the adjustable seat floor 153*d* is in position B. In FIG. 14B, the adjustable seat floor 153*d* is illustrated in position B. As can be observed, the adjustable seat floor 153*d* extends into the central passageway 131*d* and toward the proximal end 136*d* of the piston 132*d*, causing the resting axial distance 167*d* between the proximal region 151*d* of the floor 150*d* and the proximal end 136*d* of the piston 132*d* to decrease, resulting in a reduction in pressure during operation (i.e., the pressure of the equilibrium state is reduced during operation of the sprinkler 100*d*). The full extent of the variation of the position of the adjustable seat floor 153*d* relative to the piston 132*d* may be altered within the scope of the disclosed subject matter (i.e., beyond the variation illustrated in FIGS. 14A-14B). In other words, the resting axial distance A 166*d* and resting axial distance B 167*d* shown in FIGS. 14A-14B are merely illustrative.

It should be noted that the fourth embodiment shown in FIGS. 11A-14B is merely illustrative. Those skilled in the art will appreciate that many features of the disclosed embodiment may be varied within the scope of the claimed and disclosed subject matter. For example, the shape of the piston 132*d* may be varied which may alter how and the extent to which the piston 132*d* responds to upstream pressure.

Fifth Embodiment (FIGS. 15A-21B)

Figure 15A:
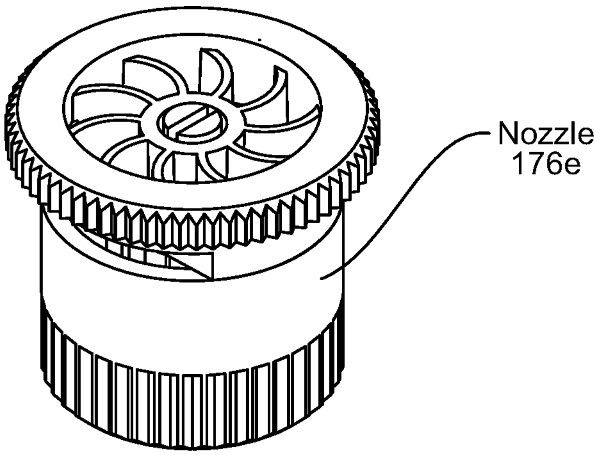
FIGS. 15A-B comprise various views of a nozzle.
Figure 15B:
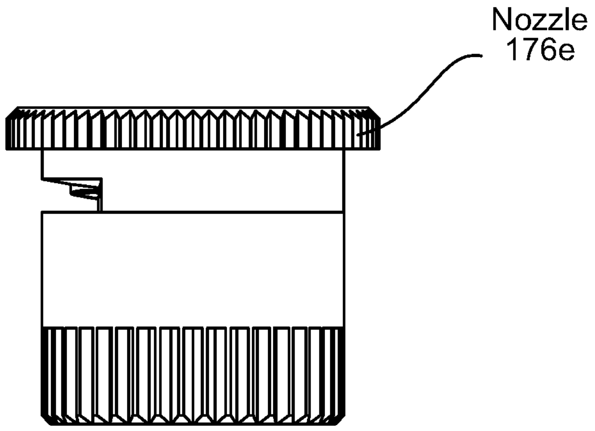
Figure 16:
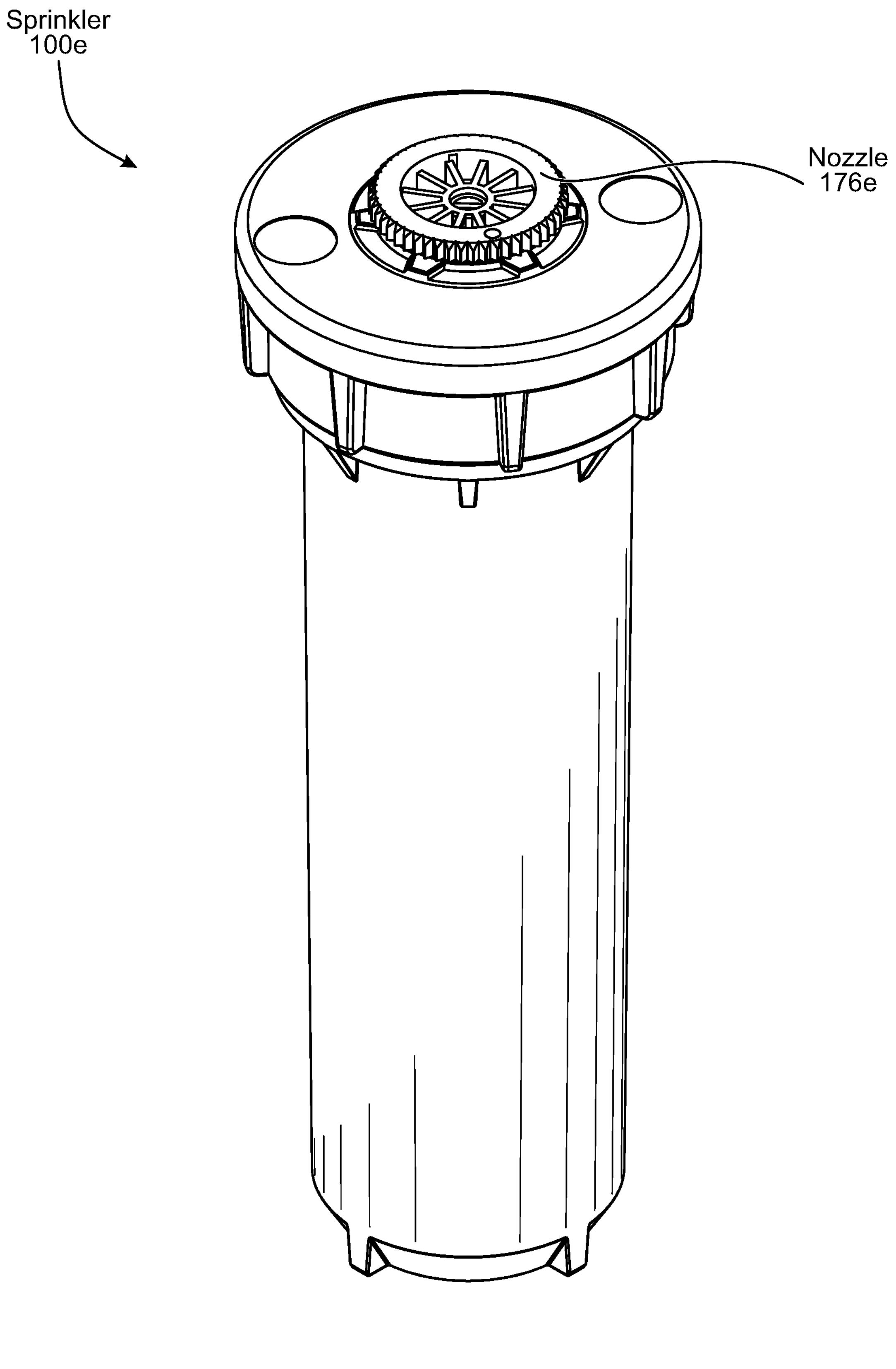
FIG. 16 is a perspective view of a sprinkler comprising a fifth embodiment of the variable pressure regulator comprising a nozzle.
Figure 17A:
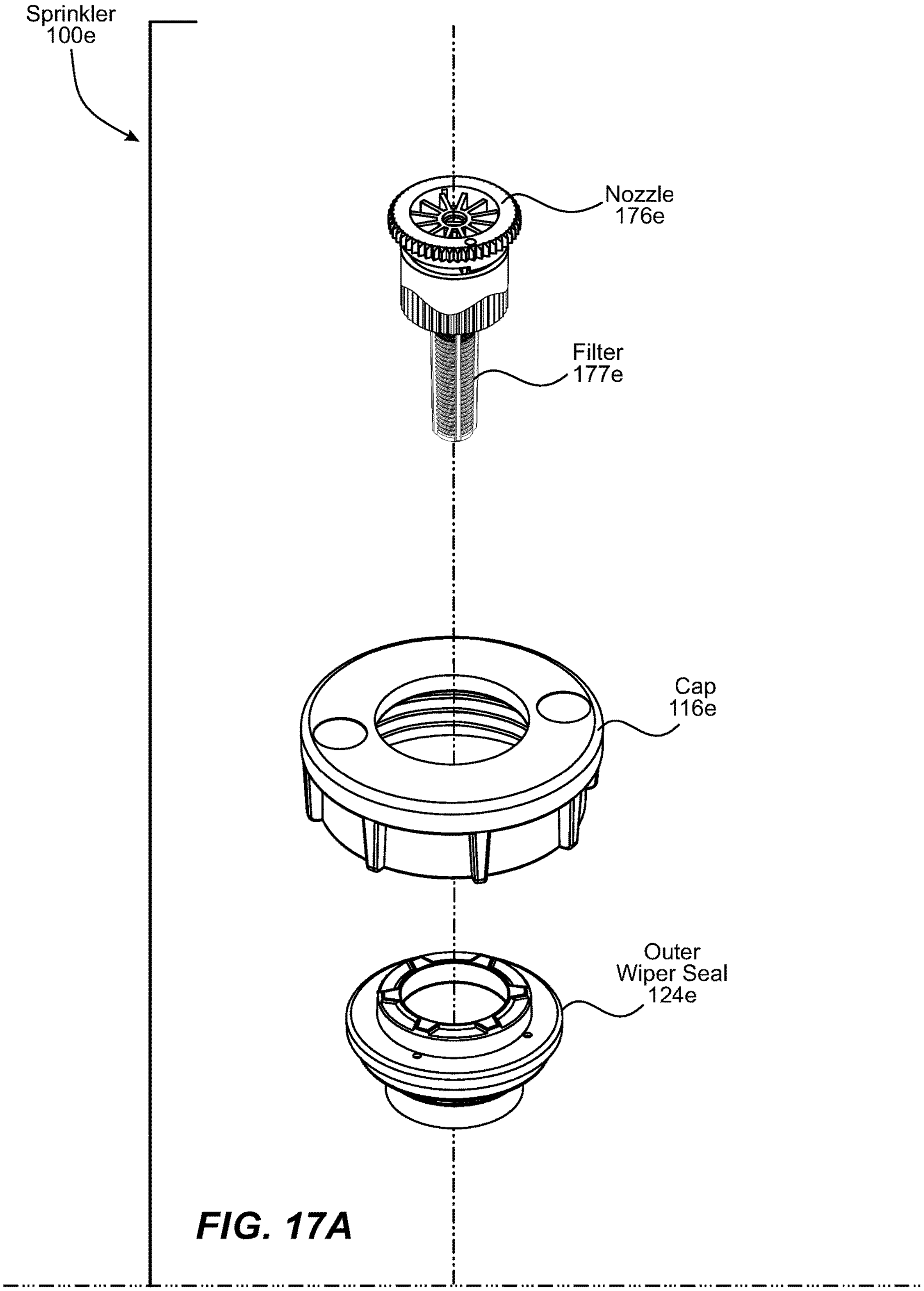
FIGS. 17A-D comprise a perspective, exploded view of a fifth embodiment of a variable pressure regulator within a sprinkler.
Figure 17B:
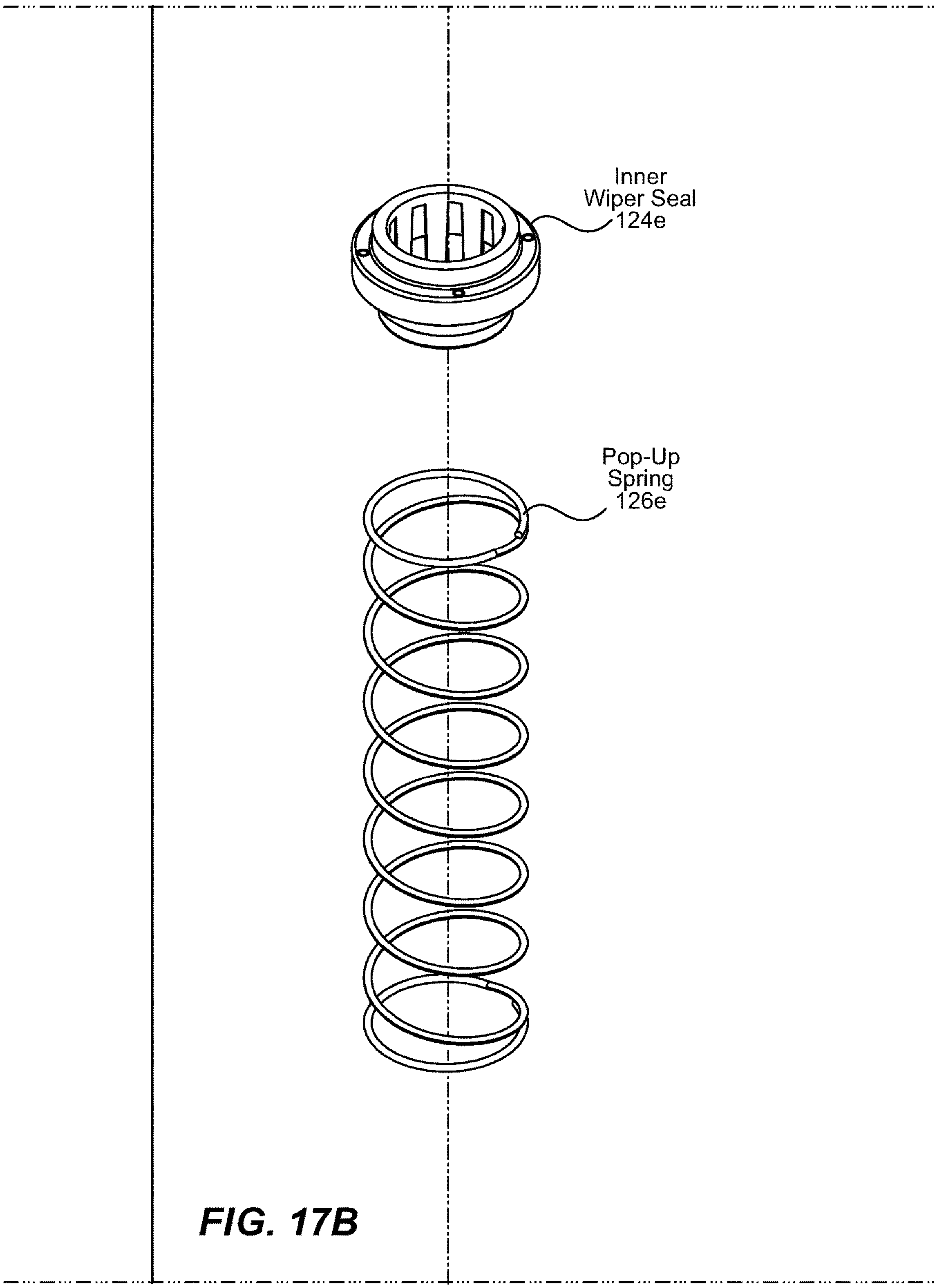
Figure 17C:
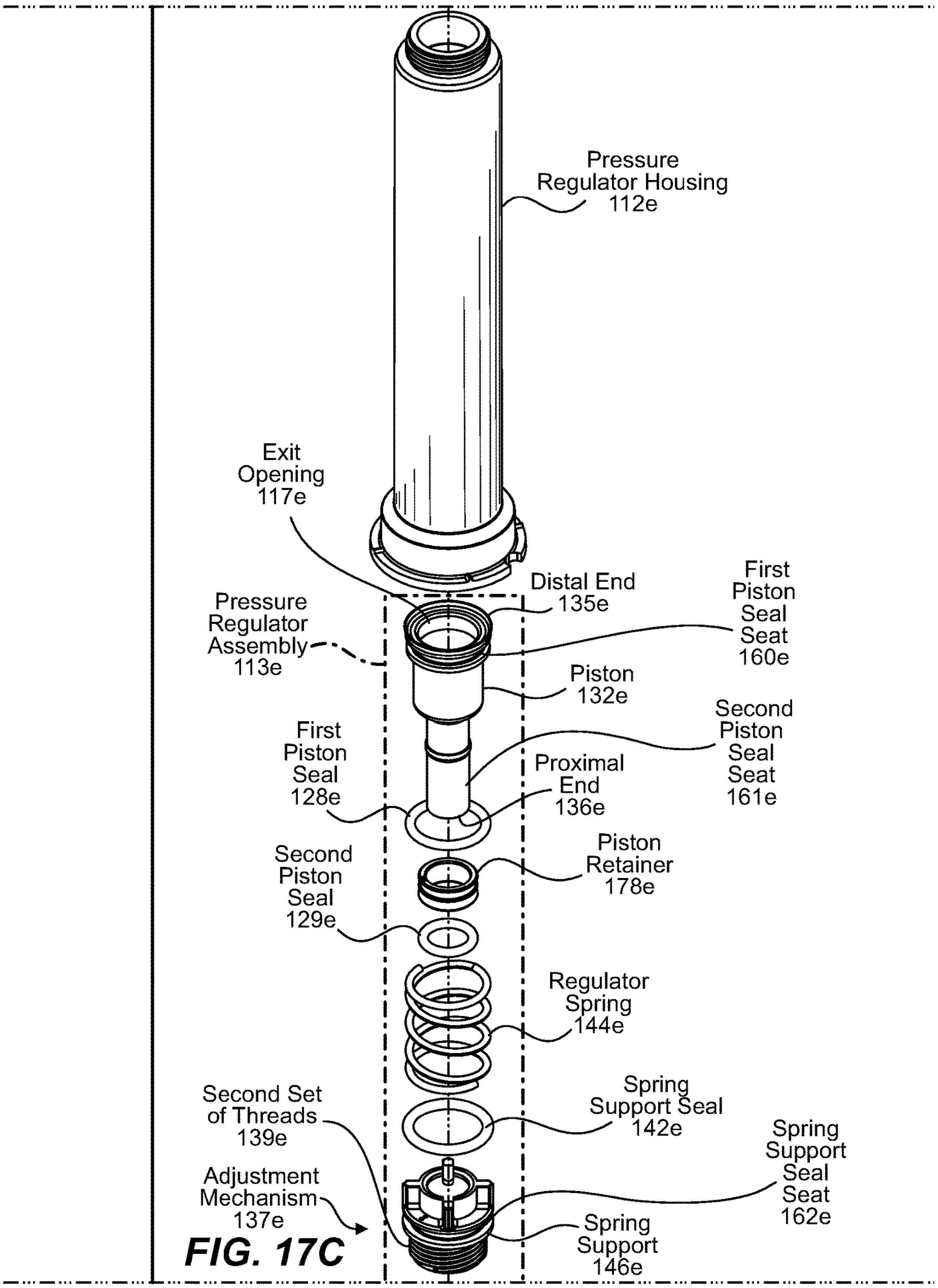
Figure 17D:
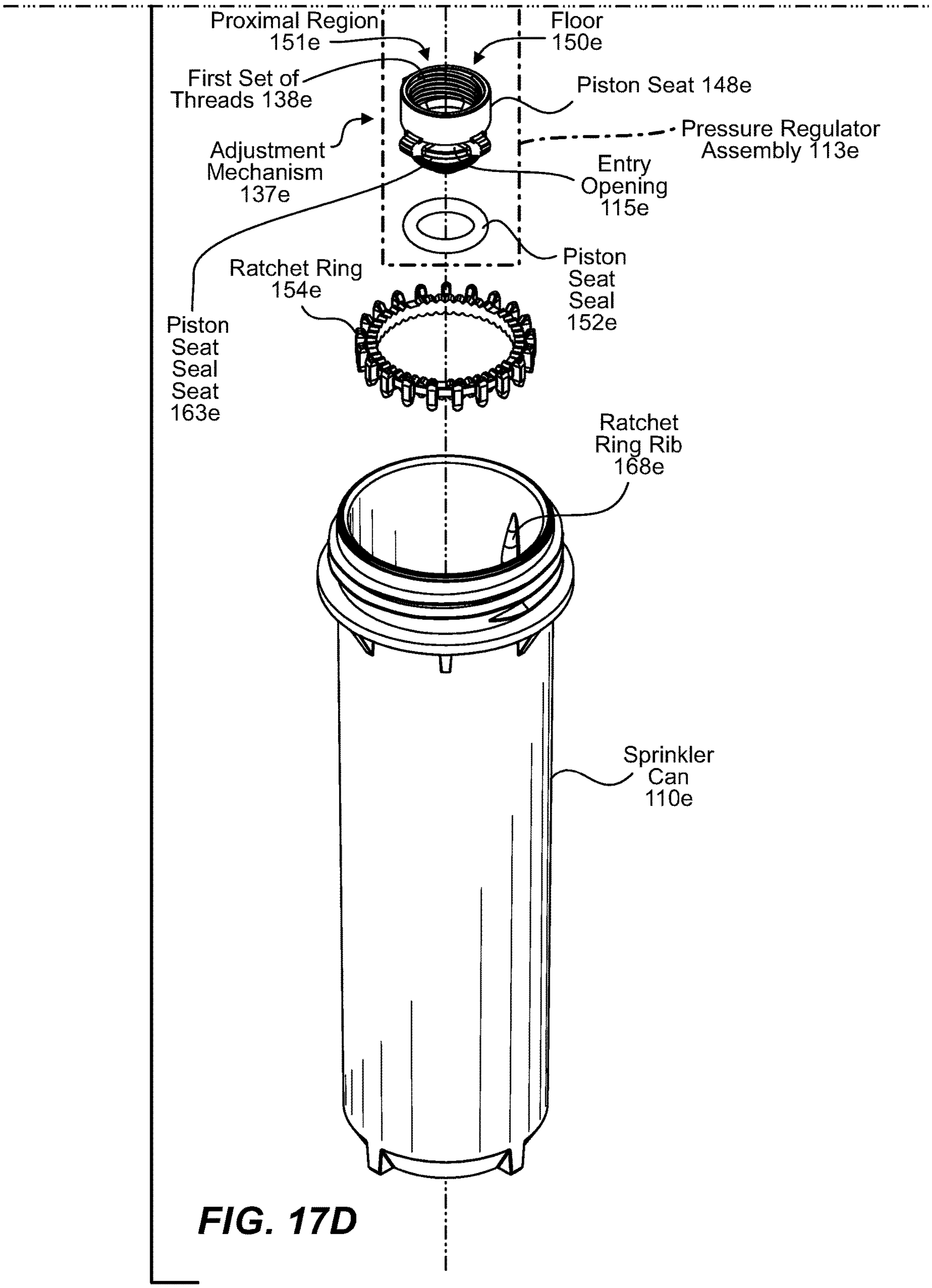
Figure 18A:
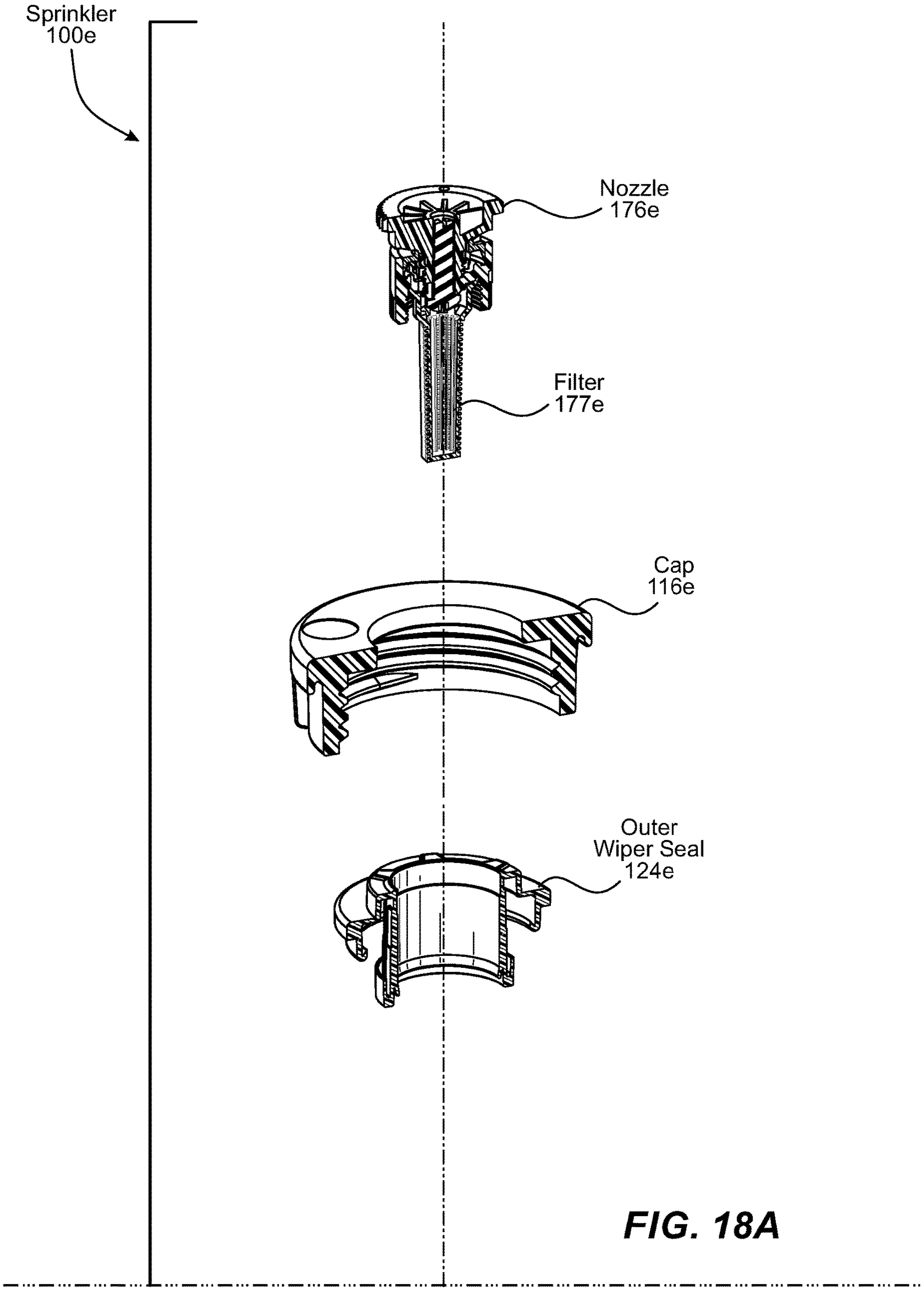
FIGS. 18A-D comprise a perspective, exploded cross-sectional view of the fifth embodiment of the variable pressure regulator within the sprinkler.
Figure 18B:
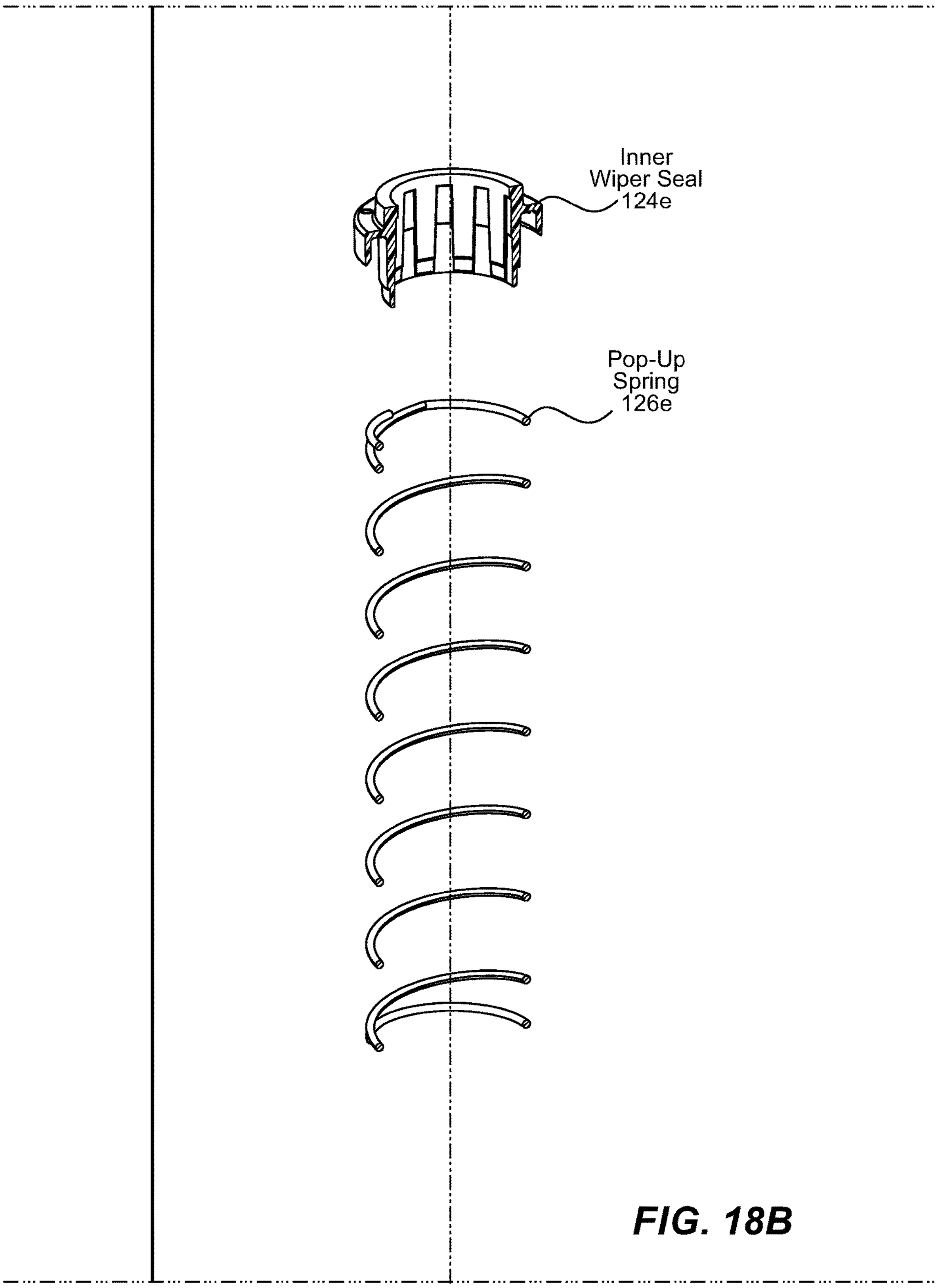
Figure 18C:
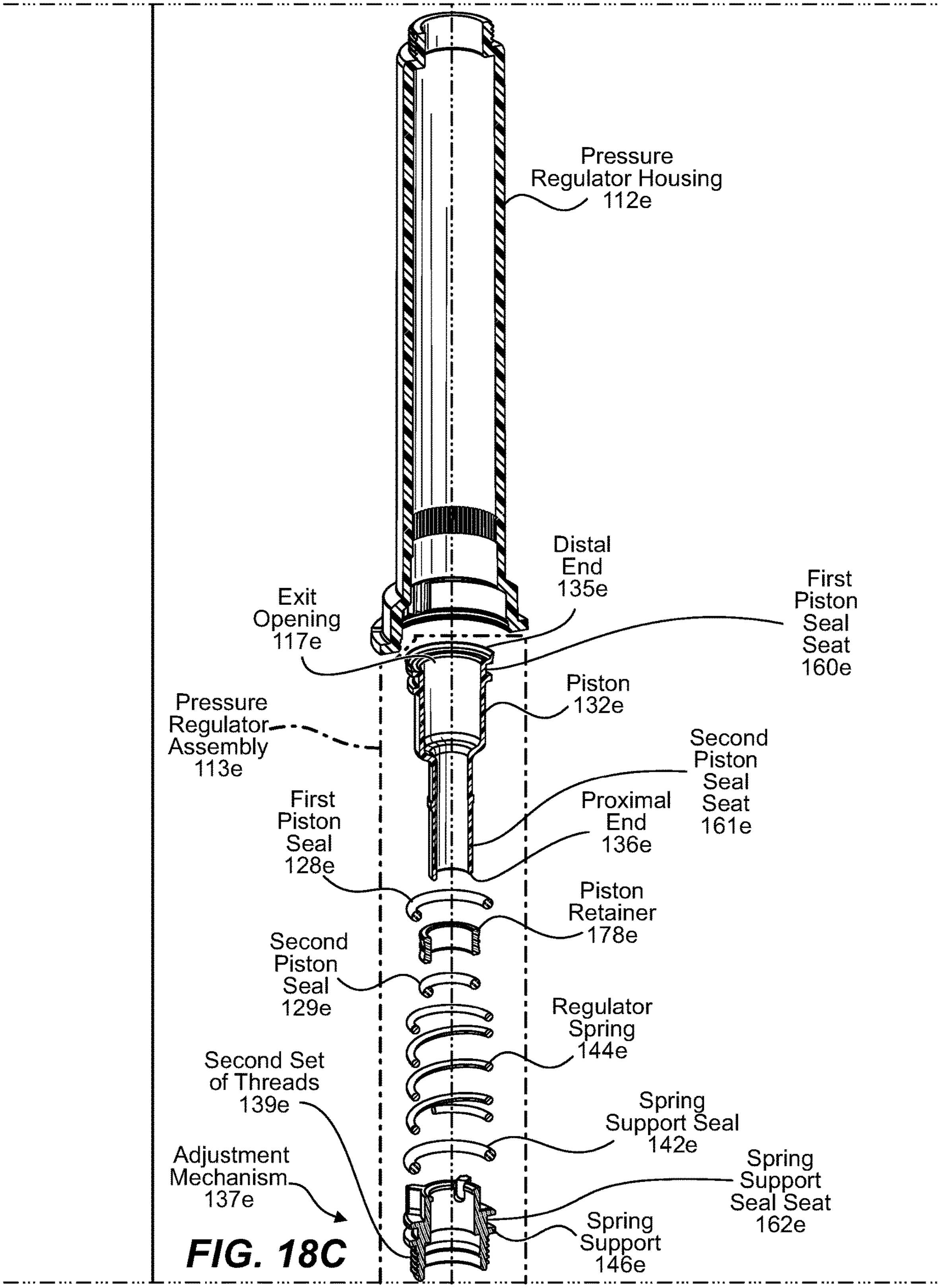
Figure 18D:
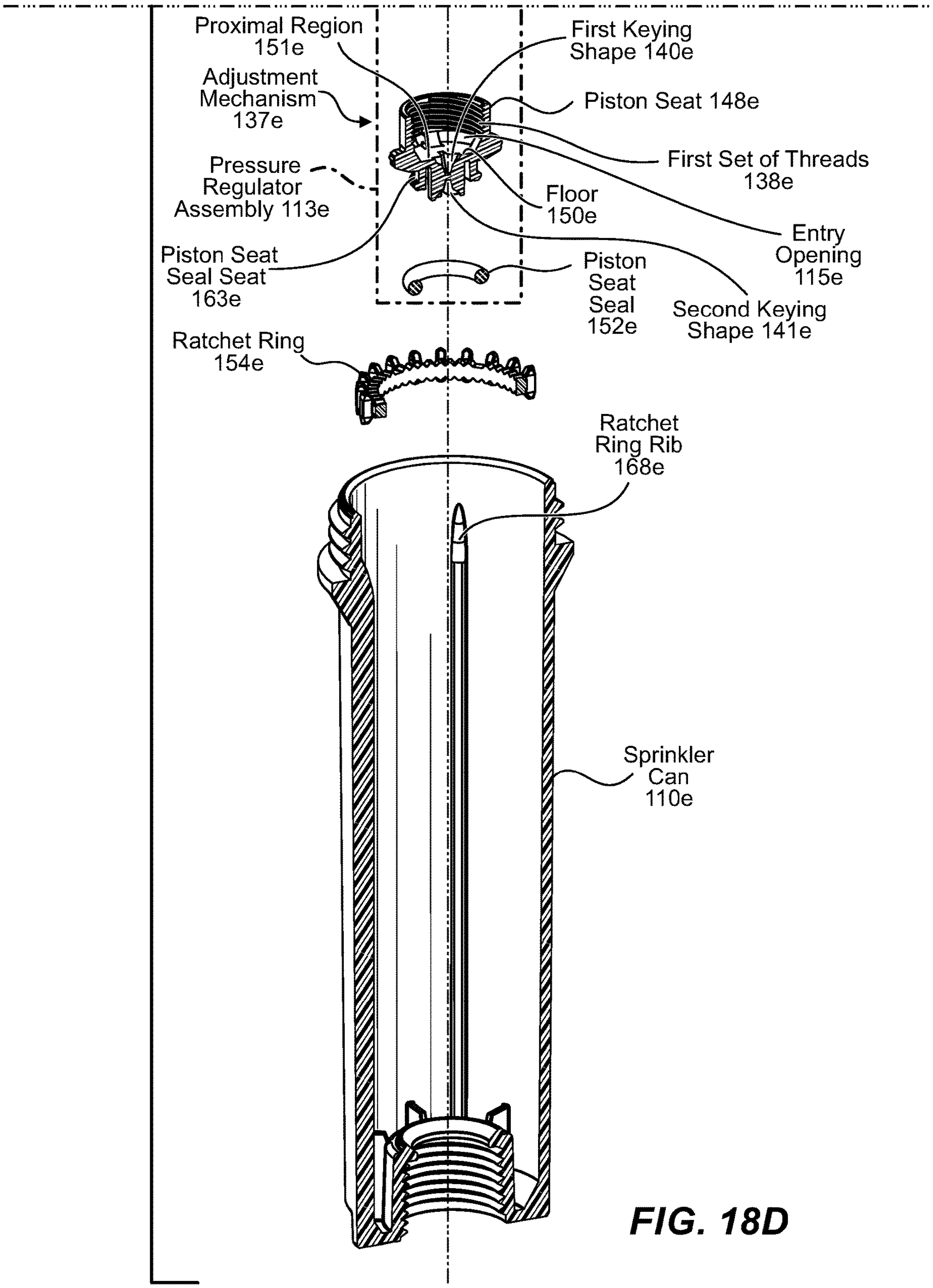

FIGS. 15A-21B illustrate a fifth embodiment of a variable pressure regulator 108*e* employed within a sprinkler 100*e*. These figures will be addressed collectively such that components may be labeled with reference numerals in one or more of the figures but not necessarily in all of these figures. Accordingly, some aspects of FIGS. 15A-21B may be described concurrently, while reference to specific figures may be explicitly indicated. FIGS. 15A-15B comprise various views of a nozzle 176*e*. FIG. 16 is a perspective view of a sprinkler comprising a fifth embodiment of the variable pressure regulator 108*e* comprising a nozzle 176*e*. FIGS. 17A-D comprise a perspective, exploded view of a fifth embodiment of a variable pressure regulator 108*e* within a sprinkler 100*e*. FIGS. 18A-D comprise a perspective, exploded cross-sectional view of the fifth embodiment of the variable pressure regulator 108*e* within the sprinkler 100*e*.

Figure 19A:
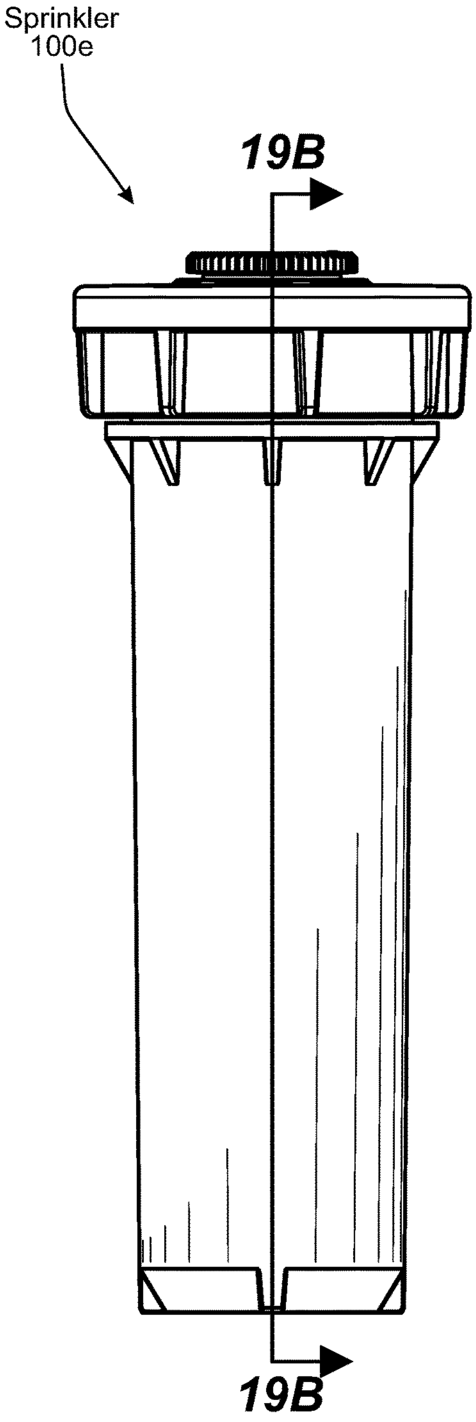
FIG. 19A is a side elevational view of the fifth embodiment of the variable pressure regulator within the sprinkler.
Figure 19B:
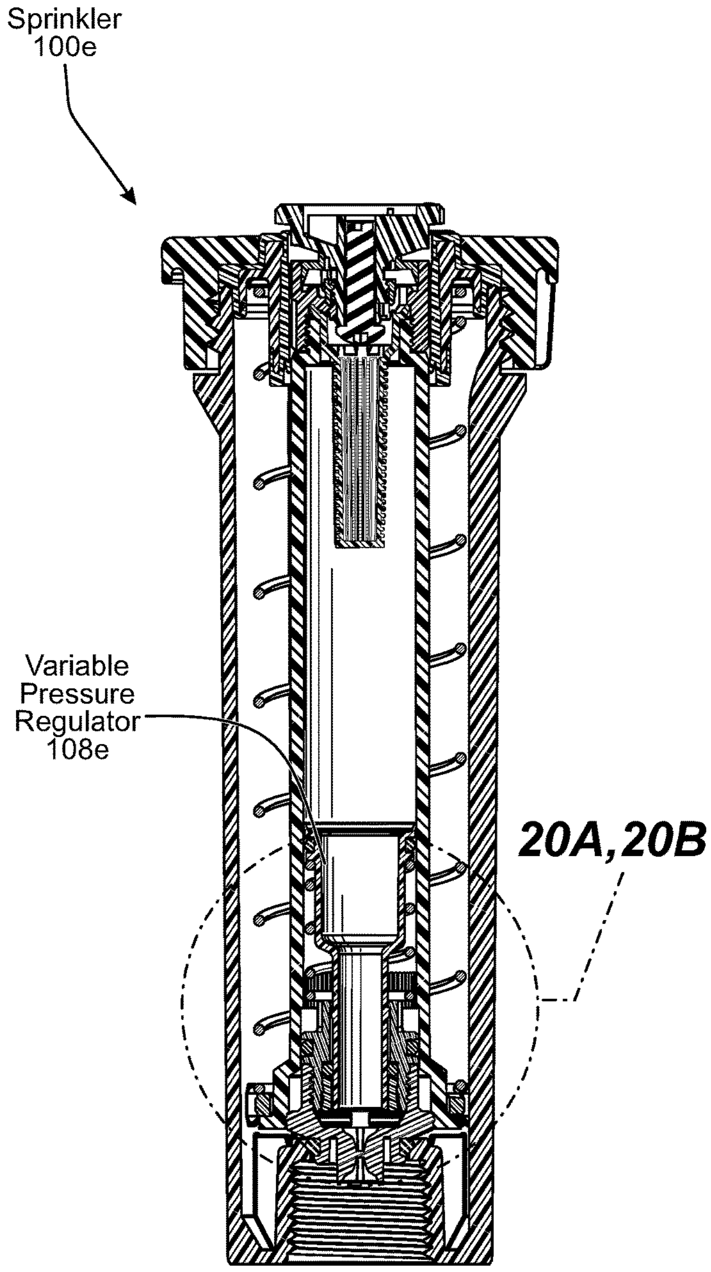
FIG. 19B is a cross-sectional side elevational view of the fifth embodiment of the variable pressure regulator within the sprinkler taken across the line 19B-19B in FIG. 19A.
Figure 20A:
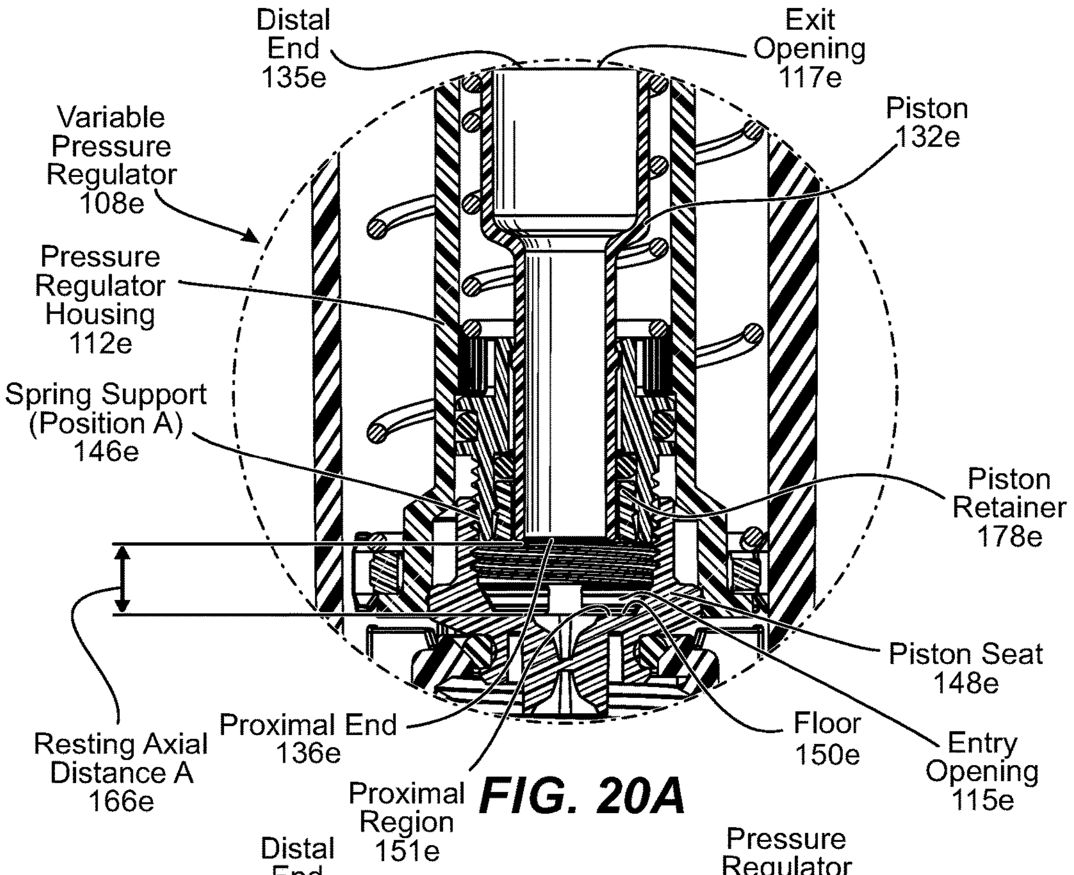
FIGS. 20A-B comprise side elevational cross-sectional views of the region 20A, 20B of FIG. 19B of the fifth embodiment of the variable pressure regulator within the sprinkler in different user-specified positions and in a resting state.
Figure 20B:
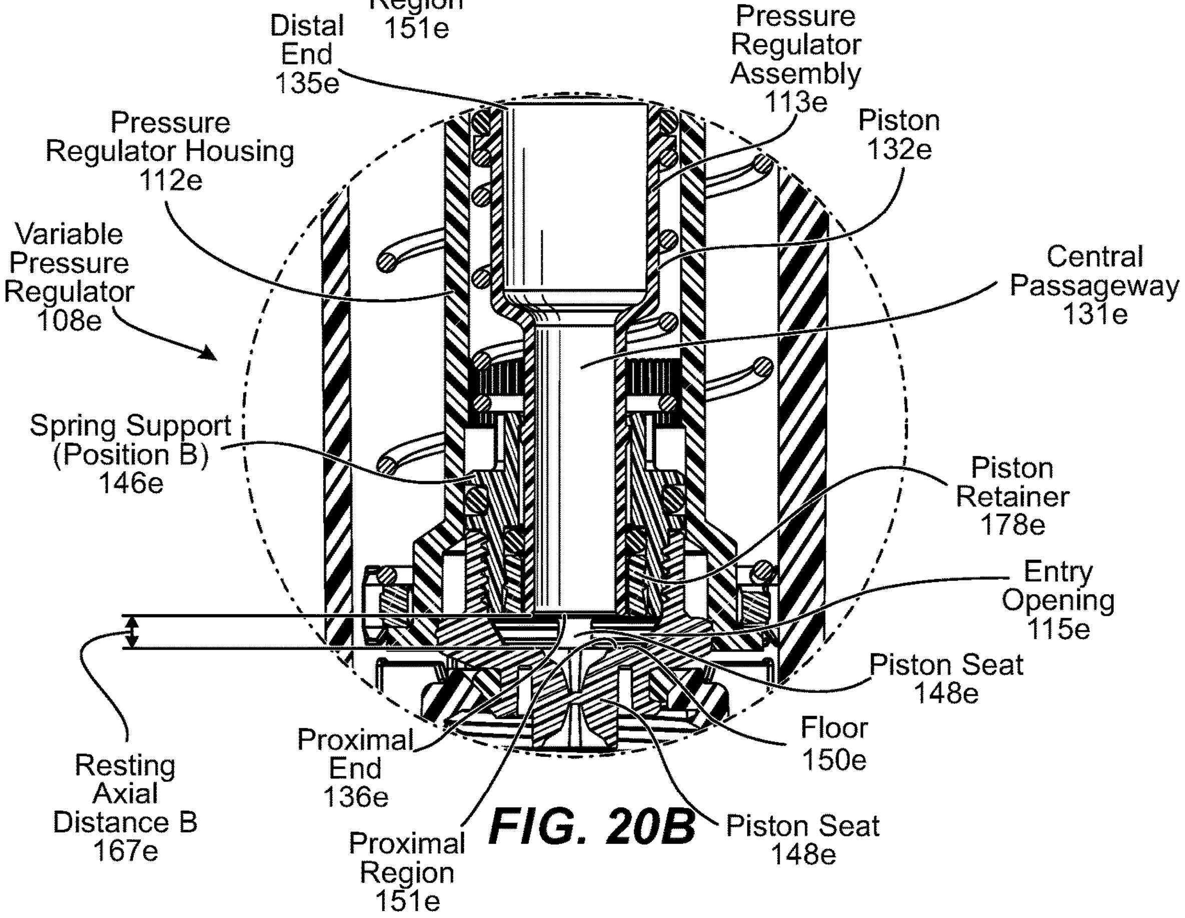

FIG. 19A is a side elevational view of the fifth embodiment of the variable pressure regulator 108*e* within the sprinkler 100*e*. FIG. 19B is a cross-sectional side elevational view of the fifth embodiment of the variable pressure regulator 108*e* within the sprinkler 100*e* taken across the line 19B-19B in FIG. 19A. FIGS. 20A-B comprise side elevational cross-sectional views of the region 20A, 21B of FIG. 19B of the fifth embodiment of the variable pressure regulator 108*e* within the sprinkler 100*e* in different user-specified positions and in a resting state.

FIGS. 15A-15B comprise a perspective and front view of a nozzle 176*e*. The nozzle 176*e* may be embodied in various forms and may, as illustrated, comprise a nozzle 176*e* of variable distribution radius (i.e., the angular extent of water emitted from the nozzle 176*e* may be altered). In alternative embodiments, the nozzle 176*e* may be of a fixed angular distribution or of a fixed or variable distribution distance. As indicated previously, the nozzle 176*e* may be secured to the various embodiments of the pressure regulator housing 112 disclosed herein. FIG. 16 is a perspective view of a sprinkler 100*e* including a nozzle 176*e*.

This fifth embodiment of the variable pressure regulator 108*e* alters a position of a proximal region 151*e* of a floor 150*e* of a piston seat 148*e* relative to a proximal end 136*e* of the piston 132*e* by altering a position of the spring support 146*e* relative to the piston seat 148*e* along the axial dimension 119*a* to regulate the pressure, as will be explained below.

Referring now generally to FIGS. 15A-21B, the sprinkler 100*e* may include a nozzle 176*e* with a filter 177*e*, a cap 116*e*, a wiper seal 124*e*, a pop-up spring 126*e*, a pressure regulator housing 112*e*, a regulator spring 144*e*, a first piston seal 128*e*, a second piston seal 129*e*, a piston seat seal 152*e*, a piston 132*e*, a spring support seal 142*e*, a spring support 146*e*, a piston seat 148*e*, a ratchet ring 154*e*, a sprinkler can 110*e* and/or a piston retainer 178*e*.

The wiper seal 124*e* may engage with and form a seal with the pressure regulator housing 112*e*. The cap 116*e* engages the sprinkler can 110*e* and retains components within the enclosure formed thereby. The wiper seal 124*e* may include an opening through which the pressure regulator housing 112*e* may extend to varying degrees in an operating state (i.e., a state in which pressurized fluid is being supplied to the sprinkler 100*e*).

The pop-up spring 126*e* may be situated between the wiper seal 124*e* and a lip at the bottom of the pressure regulator housing 112*e*. In an operating state, the pop-up spring 126*e* may be compressed to allow the pressure regulator housing 112*e* to extend through the wiper seal 124*e* and cap 116*e*. In a resting state (e.g., when pressurized fluid is not provided to the sprinkler 100*e*), the pop-up spring 126*e* may expand causing the pressure regulator housing 112*e* to withdraw into the sprinkler can 110*e*. Thus, the pop-up spring 126*e* biases the pressure regulator housing 112*e* toward the retracted position 121*e* (which position is illustrated in FIG. 2A in connection with the first embodiment).

The pressure regulator housing 112*e* may comprise a pipe or channel to conduct pressurized fluid through the sprinkler 100*e* and house the pressure regulator assembly 113*e*. The pressure regulator housing 112*e* may include threads on a top portion of the pressure regulator housing 112*e* to allow engagement with a flush plug or nozzle 176*e*. As indicated above, when pressurized fluid is supplied to the sprinkler 100*e*, the pressurized fluid may force the pressure regulator housing 112*e* to extend from the sprinkler can 110*e*. The pressurized fluid may be dispersed from a nozzle 176*e* secured to the top of the pressure regulator housing 112*e*.

The ratchet ring 154*e* may selectively engage with one or more ratchet ring ribs 168*e* in the interior of the sprinkler can 110*e*. The ratchet ring 154*e* may enable removal and rotation of the pressure regulator housing 112*e* relative to the sprinkler can 110*e*, such that the pressure regulator housing 112*e* may be rotated to and retained at a desired position relative to the sprinkler can 110*e*.

The sprinkler 100*e* may comprise a pressure regulator assembly 113*e* disposed within the pressure regulator housing 112*e*. The pressure regulator assembly 113*e* may comprise a pressure regulator housing 112*e*, a regulator spring 144*e*, a first piston seal 128*e*, a second piston seal 129*e*, a piston seat seal 152*e*, a piston 132*e*, a spring support seal 142*e*, a spring support 146*e*, a piston seat 148*e* and/or a piston retainer 178*e*. The pressure regulator assembly 113*e* may be disposed entirely or partially within the pressure regulator housing 112*e*.

The piston 132*e* may comprise a distal end 135*e* and a proximal end 136*e* with the proximal end 136*e* being closer to a proximal region 151*e* of the floor 150*e* of the piston seat 148*e* than the distal end 135*e* along the axial dimension 119*a* of the sprinkler 100*e* when the sprinkler 100*e* is assembled. (As noted above, the axial dimension 119*a* is the dimension along which fluid generally flows through the sprinkler 100*e*.) The proximal region 151*e* of the floor 150*e* may comprise that region of the floor 150*e* closest to the proximal end 136*e* of the piston 132*e* along the axial dimension 119*a*.

The pressure regulator assembly 113*e* may comprise a number of seals, namely, a first piston seal 128*e*, a second piston seal 129*e*, a spring support seal 142*e*, and/or a piston seat seal 152*e*. When assembled, the first piston seal 128*e* may be positioned within a first piston seal seat 160*e* of the piston 132*e*; the second piston seal 129*e* may be situated within the second piston seal seat 161*e* of the piston 132*e*; the spring support seal 142*e* may be situated within the spring support seal seat 162*e* of the spring support 146*e*; and the piston seat seal 152*e* may be situated within the piston seat seal seat 163*e* of the piston seat 148*e*. These seals 128*e*, 129*e*, 142*e*, 152*e* form a fluid-tight or nearly fluid-tight seal at the various locations to enable pressurized fluid to flow through the sprinkler 100*e* without being diverted to undesired pathways or locations.

The regulator spring 144*e* engages the piston 132*e* and the spring support 146*e* to bias the piston 132*e* away from the spring support 146*e*. The regulator spring 144*e* aids in the regulation of pressure of fluid passing through the sprinkler 100*e*, as will be explained below.

The piston seat 148*e* may comprise one or more entry openings 115*e* and a floor 150*e* comprising a proximal region 151*e*. As noted above, the proximal region 151*e* may comprise that portion of the floor 150*e* that is closest to the proximal end 136*e* of the piston 132*e*. In various embodiments, the proximal region 151*e* may comprise the entirety of the floor 150*e* or only a portion of the floor 150*e*. Fluid entering the sprinkler 100*e* may pass through the one or more entry openings 115*e*.

The variable pressure regulator 108*e* may comprise an adjustment mechanism 137*e* to alter the pressure of fluid flowing through the sprinkler 100*e*. In the embodiment illustrated in these figures (FIGS. 15A-21B), the adjustment mechanism 137*e* may comprise a threaded adjustment mechanism. In the illustrated embodiment, the adjustment mechanism 137*e* may comprise a first set of threads 138*e* on the piston seat 148*e* and a second set of threads 139*e* on the spring support 146*e*. The first set of threads 138*e* and the second set of threads 139*e* may be mutually engaged such that rotational movement of the piston seat 148*e* alters a distance intermediate the proximal end 136*e* of the piston 132*e* and the proximal region 151*e* of the floor 150*e* when the sprinkler 100*e* is in a resting state. (This distance may be referred to as a resting axial distance 166*e*, 167*e*, which is illustrated in FIGS. 20A-21B.) Accordingly, the position of the proximal region 151*e* of the floor 150*e* along the axial dimension 119*a* may be altered employing the adjustment mechanism 137*e*. As noted, the adjustment mechanism 137*e* illustrated this fifth embodiment is a threaded adjustment mechanism. In alternative embodiments, for example, a snap-fit adjustment mechanism may be employed, as will be explained below.

The first set of threads 138*e* and the second set of threads 139*e* may be outwardly or inwardly projecting so long as the threads 138*e*, 139*e* mutually engage. Thus, the first set of threads 138*e* and the second set of threads 139*e* may be outwardly or inwardly projecting.

Figure 21A:
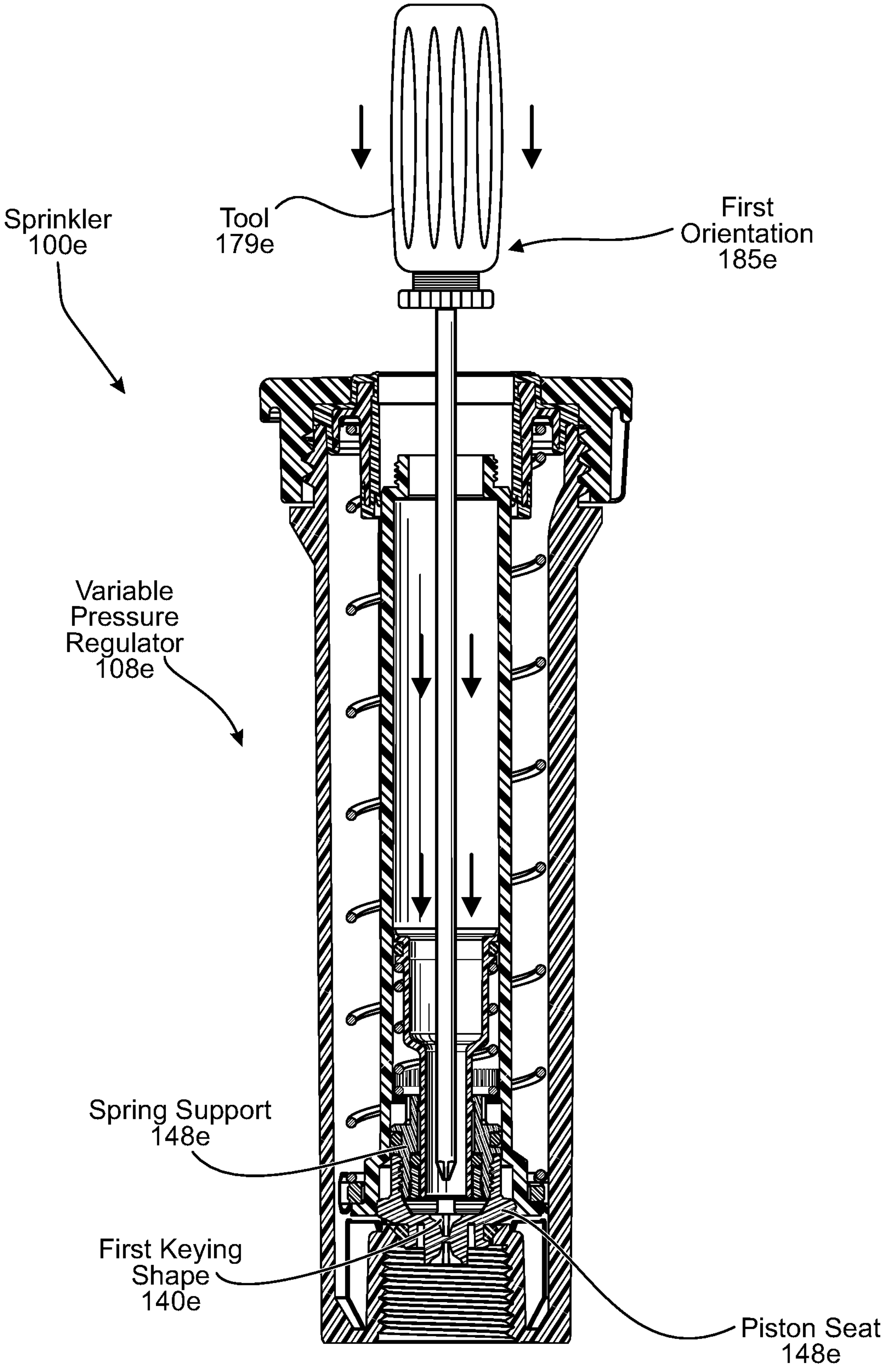
FIG. 21A is a cross-sectional side elevational view of the fifth embodiment of the variable pressure regulator within the sprinkler, shown with a tool accessing a first keying shape from above.
Figure 21B:
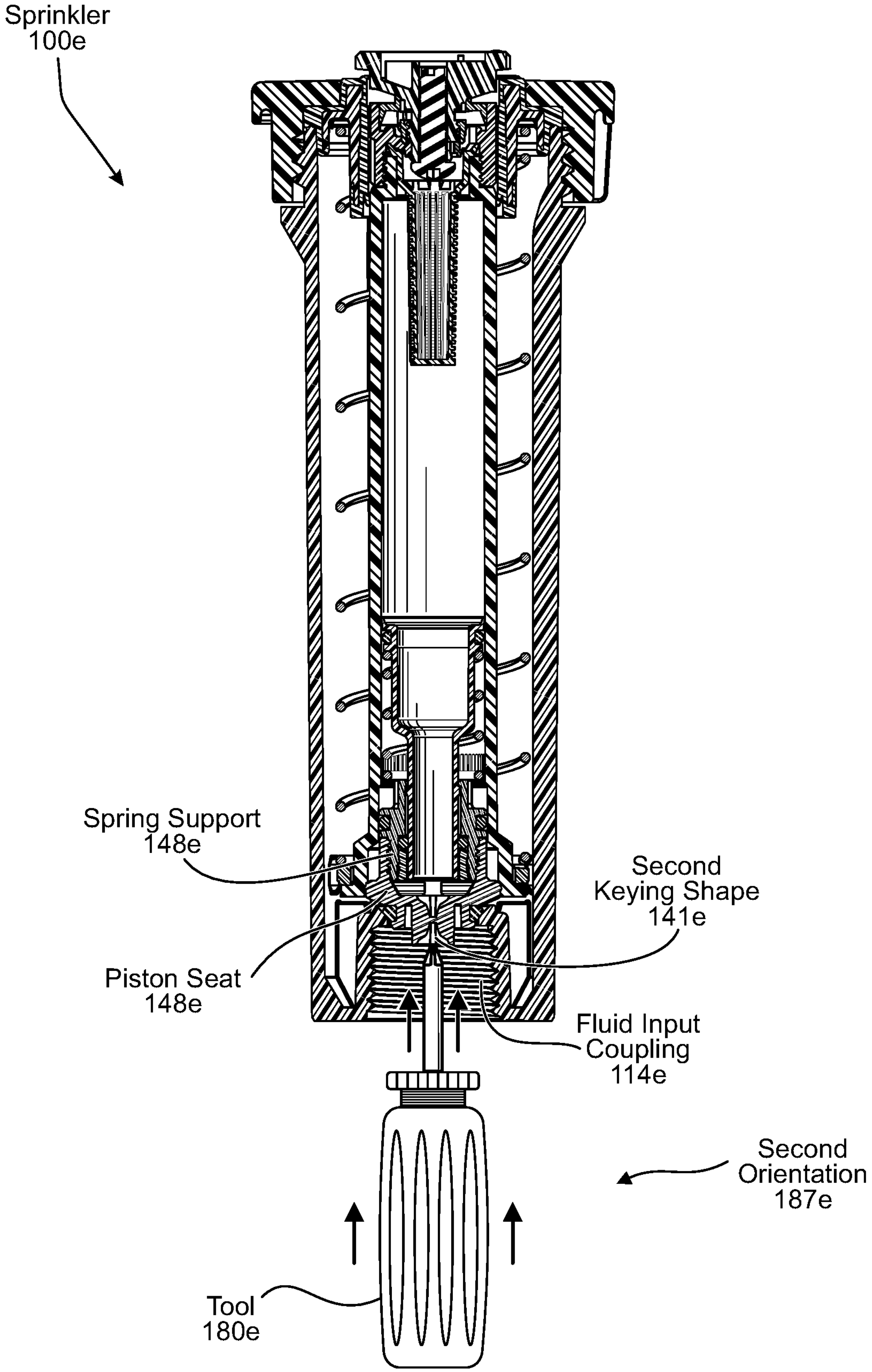
FIG. 21B is a cross-sectional side elevational view of the fifth embodiment of the variable pressure regulator within the sprinkler, shown with a tool accessing a second keying shape from below.

The piston seat 148*e* may include a first keying shape 140*e* and a second keying shape 141*e* to engage with a tool, which may comprise, for example, a screwdriver having a standard head or Phillips head, or an Allen wrench having a hexagonal-shaped head. In the fifth embodiment, as specifically illustrated in FIG. 21A, the first keying shape 140*e* may be accessed from a top of the sprinkler 100*e* (such as by removing the nozzle 176*e* and the filter 177*e*, as illustrated in FIG. 21A) to engage and rotate the piston seat 148*e* to change the position of the spring support 146*e* and alter the resting axial distance 166*e*, 167*e* using a tool 179*e* in a first orientation 185*e*. As specifically illustrated in FIG. 21B, the second keying shape 141*e* may be accessed from a bottom of the sprinkler 100*e* (such as through the fluid input coupling 114*e*, as illustrated in FIG. 21B) to engage and rotate the piston seat 148*e* to change the position of the spring support 146*e* and alter the resting axial distance 166*e*, 167*e* using a tool 180*e* in a second orientation 187*e* different than the first orientation 185*e*.

Referring once again collectively to FIGS. 15A-21B, the fifth embodiment may comprise a piston retainer 178*e*. The piston retainer 178*e* engages the spring support 146*e* (such as by a mating ridge and recess) and contacts the piston 132*e*. The piston retainer 178*e* together with the spring support 146*e* and piston 132*e* define an enclosure for the second piston seal 129*e*, as best seen in FIGS. 20A and 21B.

Referring now specifically to FIGS. 20A-20B, altering a position of spring support 146*e* along the axial dimension 119*a* (through rotation of the piston seat 148*e*) may change the pressure of the pressurized fluid exiting the sprinkler 100*e* when the sprinkler 100*e* is in an operating state. For example, as the spring support 146*e* is retracted toward the piston seat 148*e*, entry openings 115*e* in the piston seat 148*e* may be at least partially obstructed, resulting in a reduction in pressure during operation (i.e., the pressure of the equilibrium state is reduced during operation of the sprinkler 100*e*). As the spring support 146*e* is extended away from the piston seat, 148*e* the entry openings 115*e* in the piston seat 148*e* are less obstructed, thereby increasing the pressure of fluid exiting the sprinkler 100*e*. Thus, employing the first keying shape 140*e* and/or second keying shape 141*e*, the piston seat 148*e* may be rotated to alter pressure of fluid exiting the sprinkler 100*e* in an operating state.

The regulator spring 144*e* applies a force in a downstream direction 109*a* to the piston 132*e* along the axial dimension 119*a* (i.e., the regulator spring 144*e* pushes the piston 132*e* away from the spring support 146*e*). In an operating state (with a pressurized fluid passing through the sprinkler 100*e*), a nozzle 176*e* reduces the outflow of the fluid from the sprinkler 100*e* and creates a pressurized chamber downstream of the piston 132*e*. Pressure resulting from this pressurized chamber, if sufficient, may cause the piston 132*e* to move axially upstream (i.e., toward the spring support 146*e*) until an equilibrium state is reached in response to the counterbalancing axial force applied by the regulator spring 144*e*. Altering a position of the spring support 146*e* along the axial dimension 119*a* may reduce, increase, or alter fluid flowing through entry openings 115*e* in the piston seat 148*e* to increase, restrict, or alter the movement of fluid through the entry openings 115*e* in the piston seat 148*e*, thereby causing an equilibrium to be reached at a lower or higher pressurized state. Thus, a variable pressure regulator 108*e*, which may comprise the pressure regulator housing 112*e* and the pressure regulator assembly 113*e*, may operate to alter the pressure of fluid exiting the sprinkler 100*e*. In various embodiments, the variable pressure regulator 108*e* may be designed to alter pressure between approximately 30 psi and 40 psi. (As used herein, "approximately" means plus or minus 5 psi.)

Referring still specifically to FIGS. 20A-20B, an enlarged view of a portion of the sprinkler 100*e* is illustrated in two user-controlled positions in a resting state. More specifically, FIG. 20A illustrates the spring support 146*e* in position A with a resting axial distance A 166*e*, while FIG. 20B illustrates the spring support 146*e* in position B with a resting axial distance B 167*e*. As illustrated, in an operating state, fluid flows through the entry openings 115*e* of the piston seat 148*e* through the central passageway 131*e* (defined by the variable pressure regulator 108*e*) and exits the one or more exit openings 117*e* at a distal end 135*e* of the piston 132*e*.

As indicated in FIG. 20A, in an operating state with the spring support 146*e* in position A, the pressurized fluid may flow through the pressure regulator housing 112*e* of the sprinkler 100*e* without pressure reduction or with less restriction than when the spring support 146*e* is in position B. In FIG. 20B, the spring support 146*e* is illustrated in position B. As illustrated, the spring support 146*e* and proximal end 136*e* of the piston 132*e* extend into the central passageway 131*e* and toward the proximal region 151*e*, causing the resting axial distance 167*e* between the proximal region 151*e* of the floor 150*e* and the proximal end 136*e* of the piston 132*e* to decrease, resulting in a reduction in pressure during operation (i.e., the pressure of the equilibrium state is reduced during operation of the sprinkler 100*e*). The full extent of the variation of the position of the spring support 146*e* relative to the piston 132*e* may be altered within the scope of the disclosed subject matter (i.e., beyond the variation illustrated in FIGS. 20A-20B). In other words, the resting axial distance A 166*e* and resting axial distance B 167*e* shown in FIGS. 20A-20B are merely illustrative.

It should be noted that the fifth embodiment shown in FIGS. 15A-20B is merely illustrative. Those skilled in the art will appreciate that many features of the disclosed fifth embodiment may be varied within the scope of the claimed and disclosed subject matter. For example, the shape of the piston 132*e* may be varied which may alter how and the extent to which the piston 132*e* responds to upstream pressure.

Figure 22A:
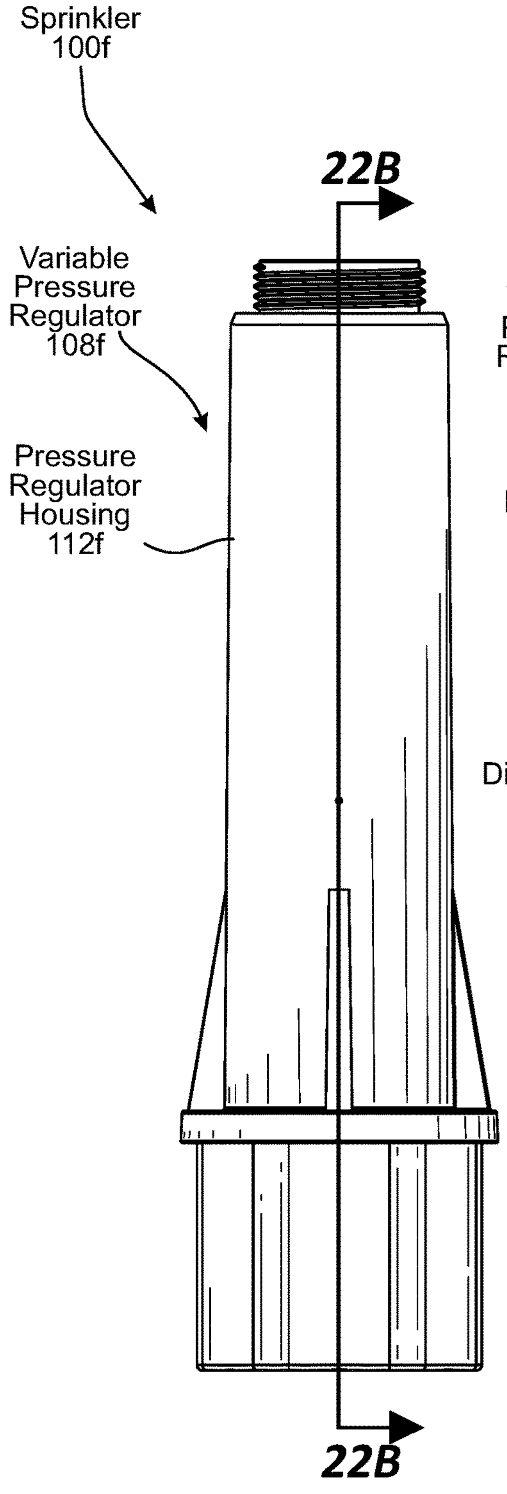
FIG. 22A is a side elevational view of a sixth embodiment of the variable pressure regulator with the outer housing of the sprinkler comprising the pressure regulator housing.
Figure 22B:
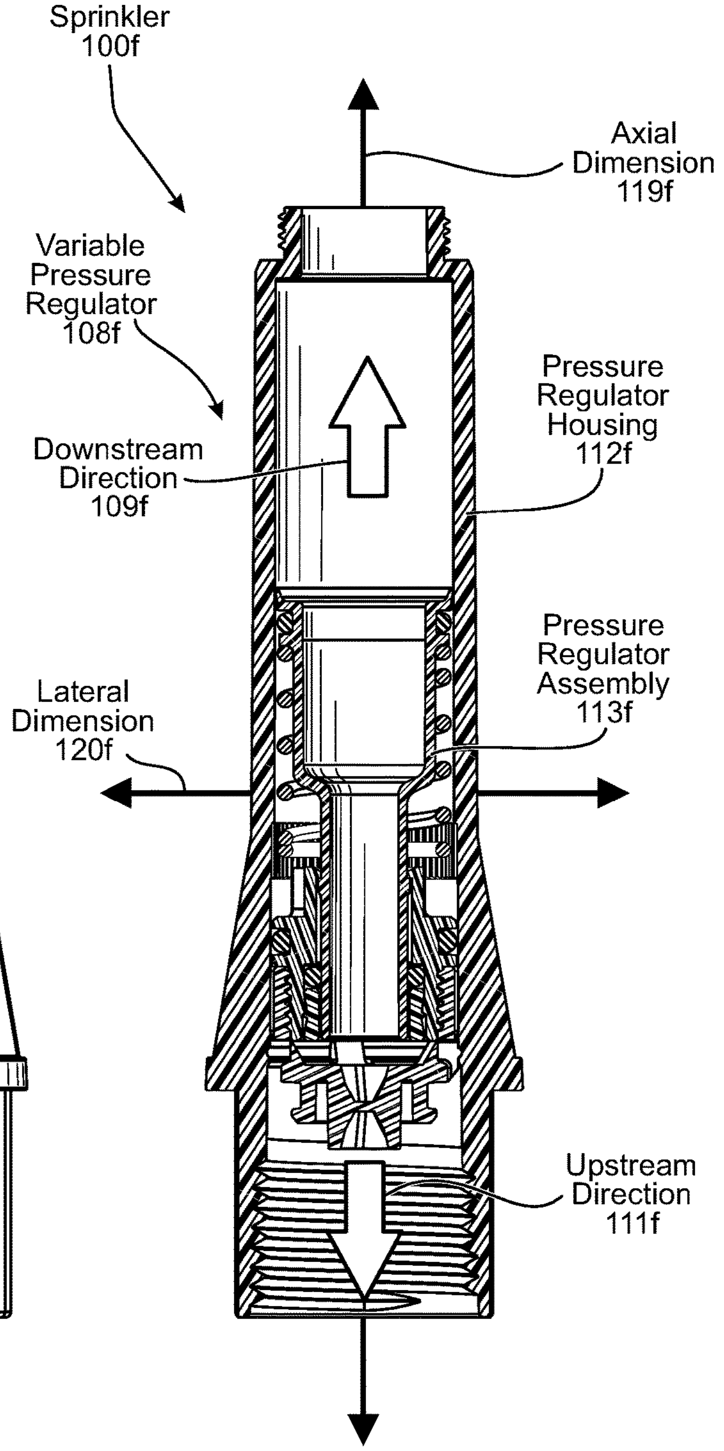
FIG. 22B is a side elevational cross-sectional view of the sixth embodiment of the variable pressure regulator taken across the line 22B-22B in FIG. 22A.

Sixth Embodiment (FIGS. 22A-22B)

A sixth embodiment of a variable pressure regulator 108*f* is illustrated in FIGS. 22A-22B. These figures will be addressed collectively such that components may be labeled with reference numerals in one or more of the figures but not necessarily in all of these figures. Accordingly, some aspects of FIGS. 22A-22B may be described concurrently, while reference to specific figures may be explicitly indicated.

FIG. 22A is a side elevational view of a sixth embodiment of the variable pressure regulator 108*f* with the outer housing of the sprinkler 100*f* comprising the pressure regulator housing 112*f*. FIG. 22B is a side elevational cross-sectional view of the sixth embodiment of the variable pressure regulator 108*f* taken across the line 22B-22B in FIG. 22A.

In the illustrated embodiment, the pressure regulator assembly 113*f* may be identical in design to the pressure regulator assembly 113*e* of the fifth embodiment, although it should be noted that the pressure regulator assemblies 113 of any of the embodiments disclosed herein may be utilized. The variable pressure regulator 108*f* is distinguishable from the fifth embodiment in that the outer housing of the sprinkler 100*f* also comprises the pressure regulator housing 112*f* A nozzle or flush plug may be secured to a top of the sprinkler 100*f*. The sprinkler 100*f* may, for example, comprise what is frequently referred to in the industry as a shrub sprinkler or a shrub sprinkler head.

The illustrated variable pressure regulator 108*f* comprises an axial dimension 119*f* and a lateral dimension 120*f* The variable pressure regulator may also comprise a downstream direction 109*f* and an upstream direction 111*f*. The downstream direction 109*f* is the direction through which fluid generally flows through the sprinkler 100*f* when in operation with the understanding that in limited circumstances and positions within the sprinkler 100*f* fluid passing through the sprinkler 100*f* may travel in other directions besides the downstream direction 109*f* along the axial dimension 119*f*. Yet, on the whole, fluid generally travels through the sprinkler 100*f* along the axial dimension 119*f* in a downstream direction 109*f*. The lateral dimension 120*f* is perpendicular or substantially perpendicular to the axial dimension 119*f*.

Figure 23A:
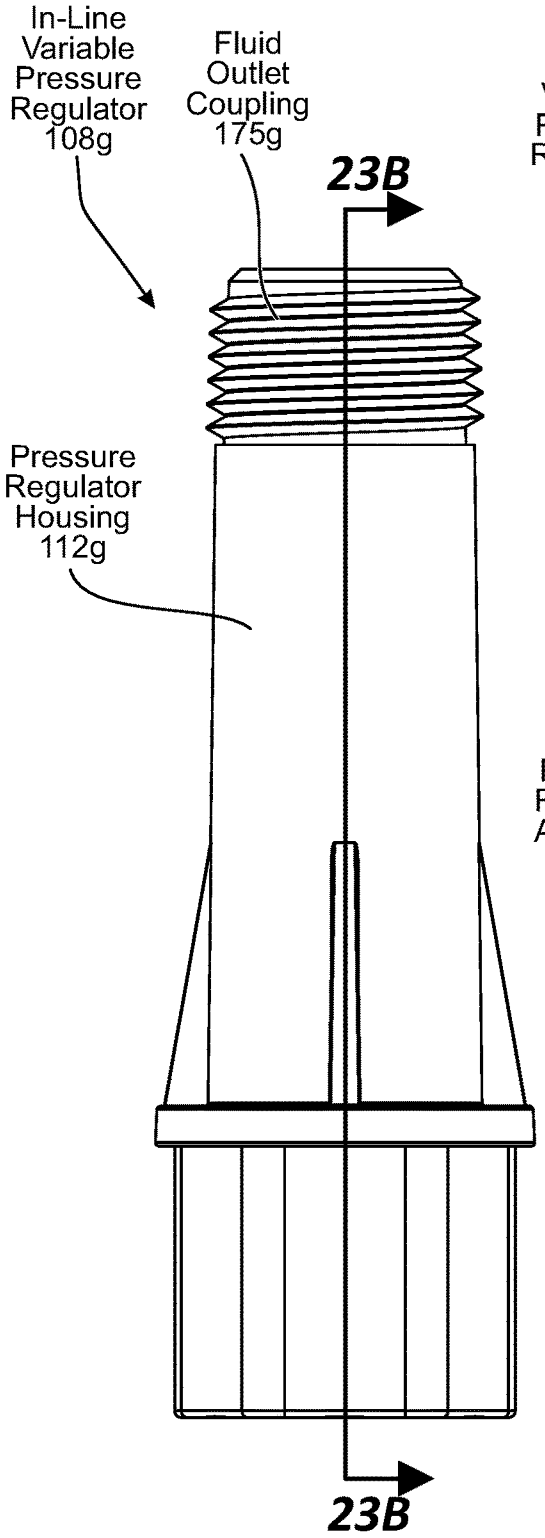
FIG. 23A is a side elevational view of a sixth embodiment of the variable pressure regulator (which comprises an in-line variable pressure regulator).
Figure 23B:
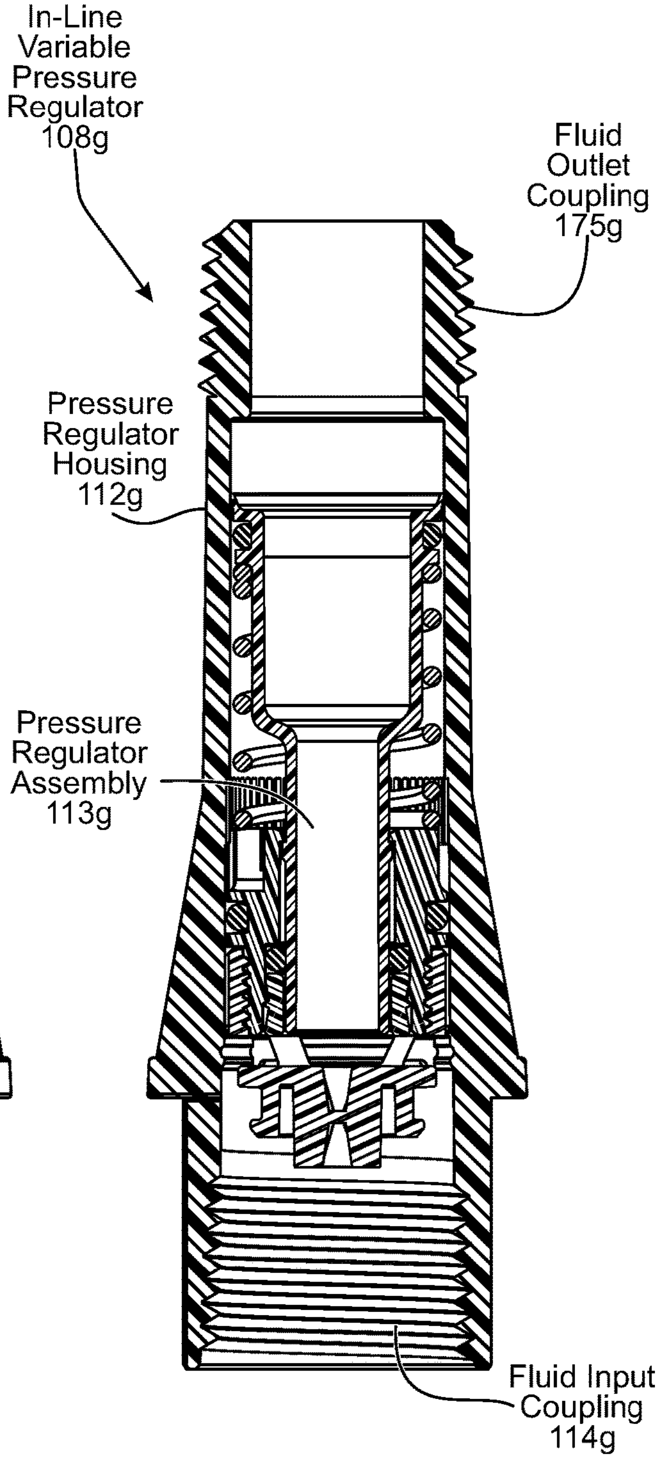
FIG. 23B is a side elevational cross-sectional view of the in-line variable pressure regulator taken across the line 23B-23B in FIG. 23A.

Seventh Embodiment (FIGS. 23A-23B)

A seventh embodiment of a variable pressure regulator 108*g* is illustrated in FIGS. 23A-23B. These figures will be addressed collectively such that components may be labeled with reference numerals in one or more of the figures but not necessarily in all of these figures. Accordingly, some aspects of FIGS. 23A-23B may be described concurrently, while reference to specific figures may be explicitly indicated.

FIG. 23A is a side elevational view of a seventh embodiment of the variable pressure regulator 108*g* (which comprises an in-line variable pressure regulator 108*g*). FIG. 23B is a side elevational cross-sectional view of the in-line variable pressure regulator 108*g* taken across the line 23B-23B in FIG. 23A.

As illustrated, the in-line pressure regulator 108*g* comprises a pressure regulator housing 112*g* that includes a fluid inlet coupling 114*g* and a fluid outlet coupling 175*g*. In the illustrated embodiment, the pressure regulator assembly 113*g* may be identical in design to the pressure regulator assembly 113*e* of the fifth embodiment, although it should be noted that the pressure regulator assemblies 113 of any of the embodiments disclosed herein may be utilized.

Eighth Embodiment (FIGS. 24A-27B)

Figure 24A:
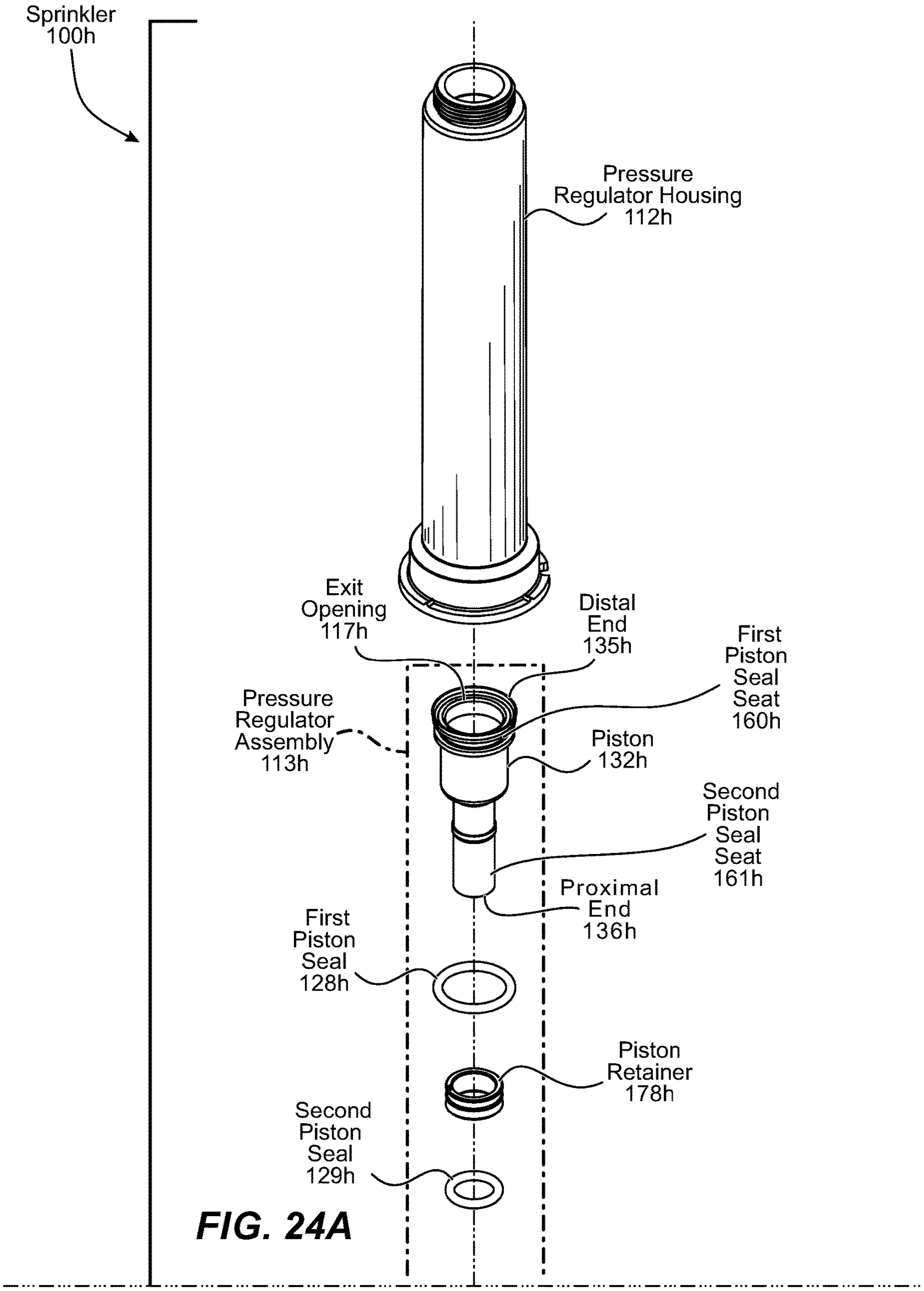
FIGS. 24A-B comprise a perspective, exploded view of an eighth embodiment of a variable pressure regulator with the outer housing of the sprinkler comprising the pressure regulator housing.
Figure 24B:
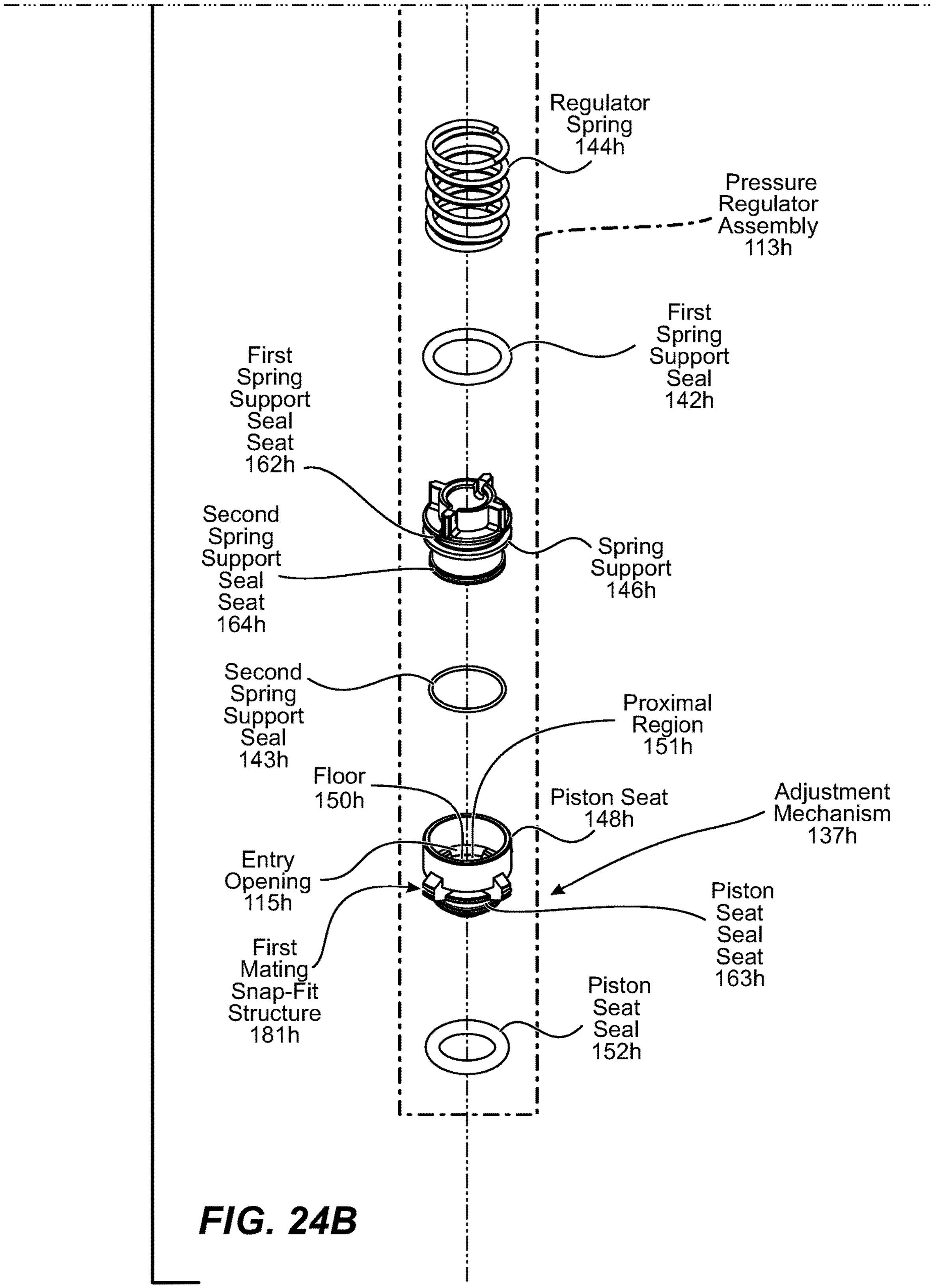
Figure 25A:
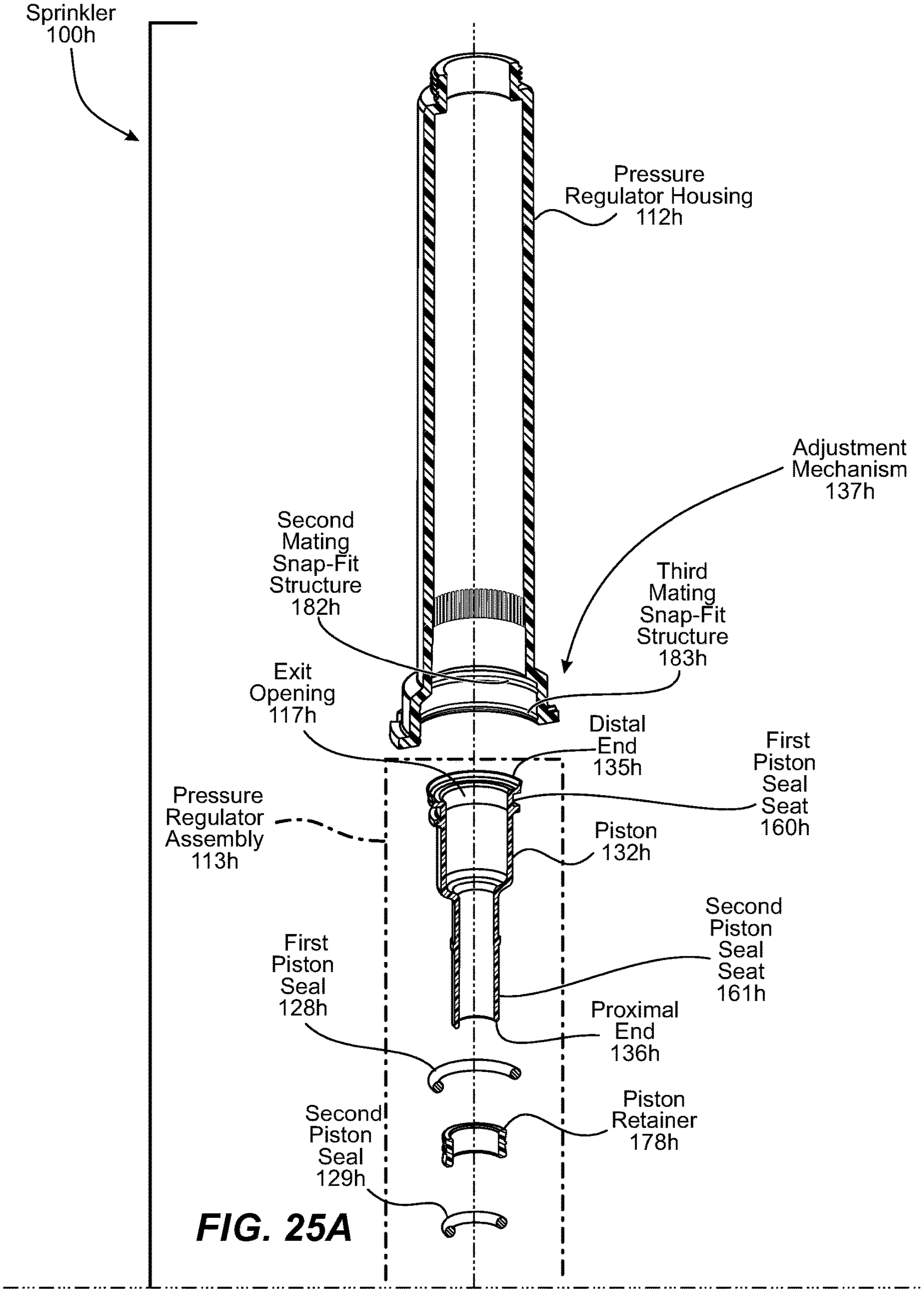
FIGS. 25A-B comprise a perspective, exploded cross-sectional view of the eighth embodiment of the variable pressure regulator.
Figure 25B:
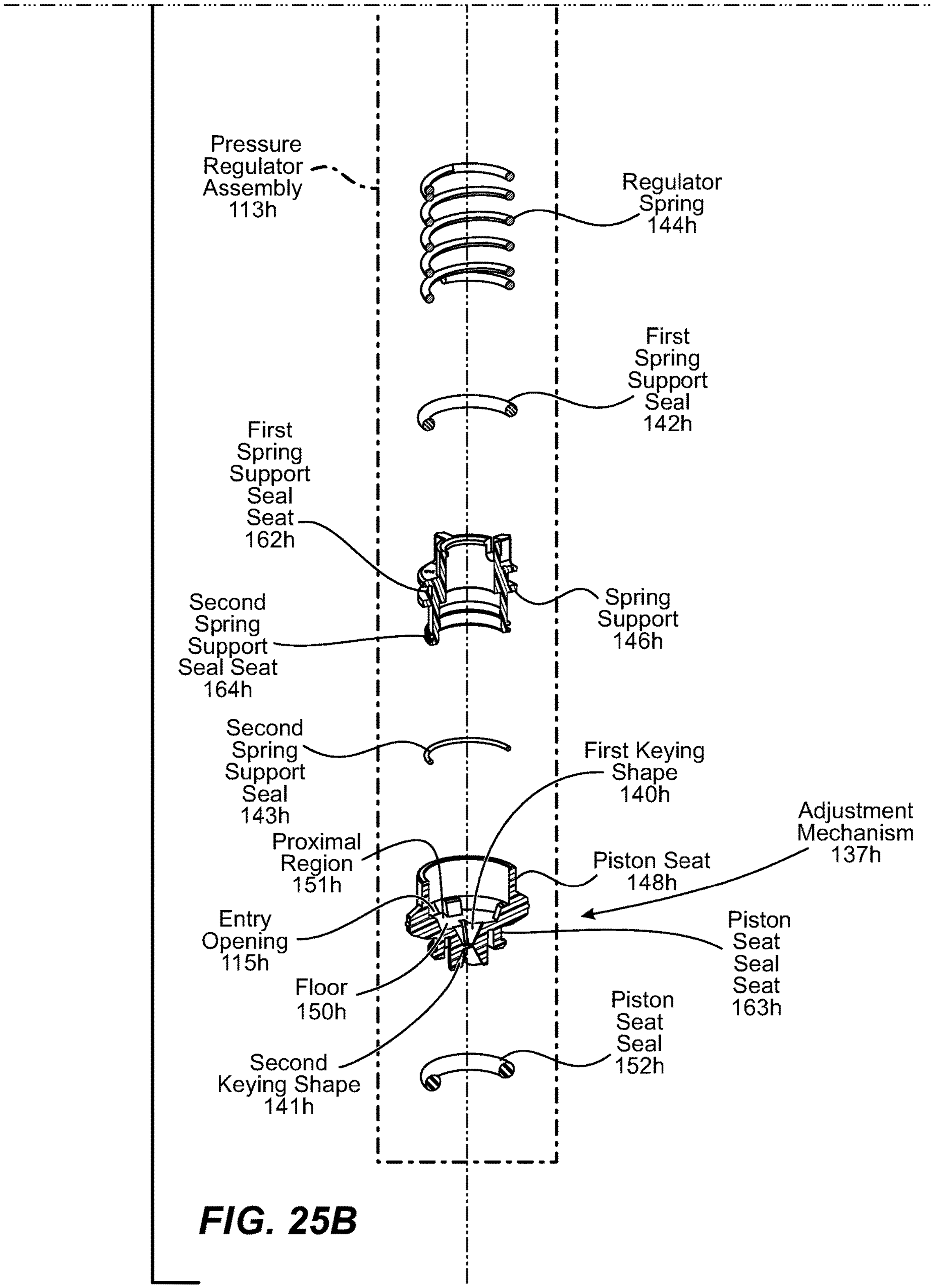
Figure 26A:
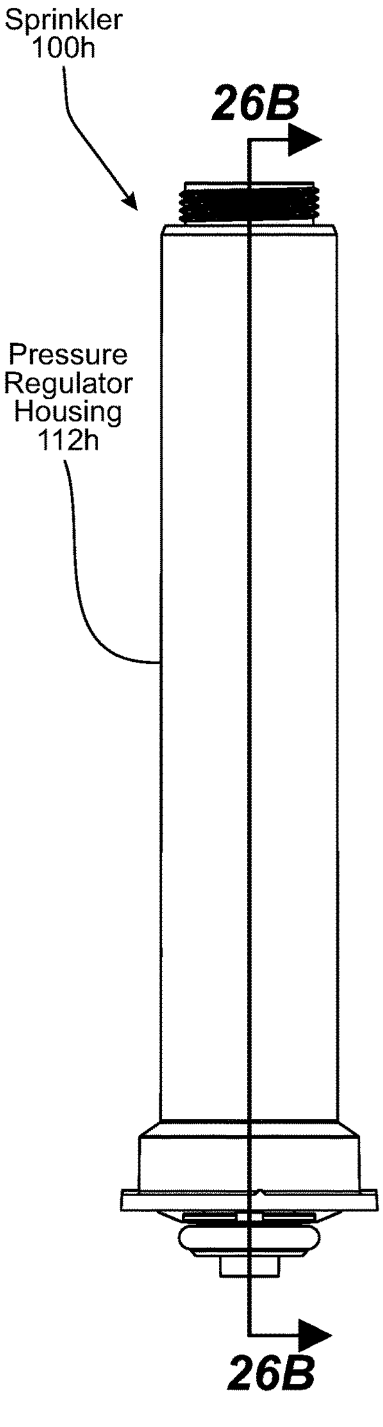
FIG. 26A is a side elevational view of the eighth embodiment of the variable pressure regulator.
Figure 26B:
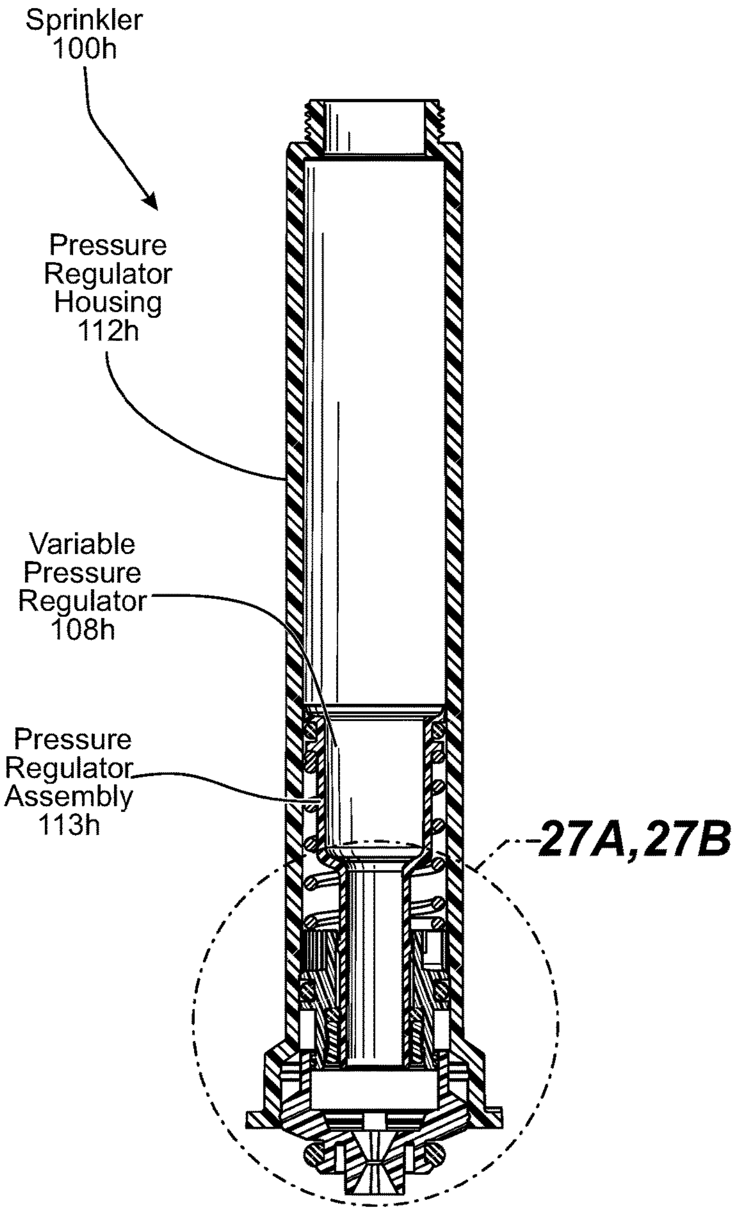
FIG. 26B is a cross-sectional side elevational view of the eighth embodiment of the variable pressure regulator taken across the line 26B-26B in FIG. 26A.
Figure 27A:
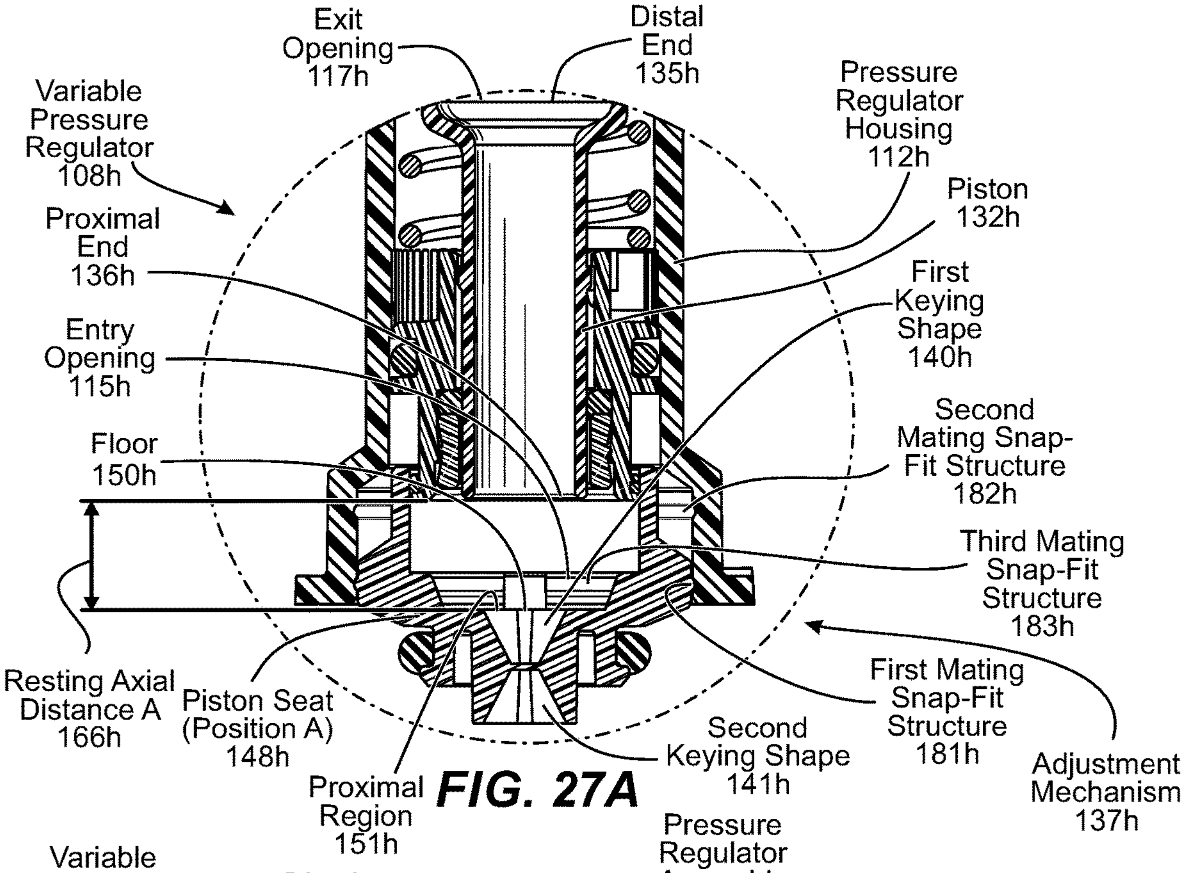
FIGS. 27A-B comprise side elevational cross-sectional views of the region 27A, 27B of FIG. 26B of the eighth embodiment of the variable pressure regulator in different user-specified positions and in a resting state.
Figure 27B:
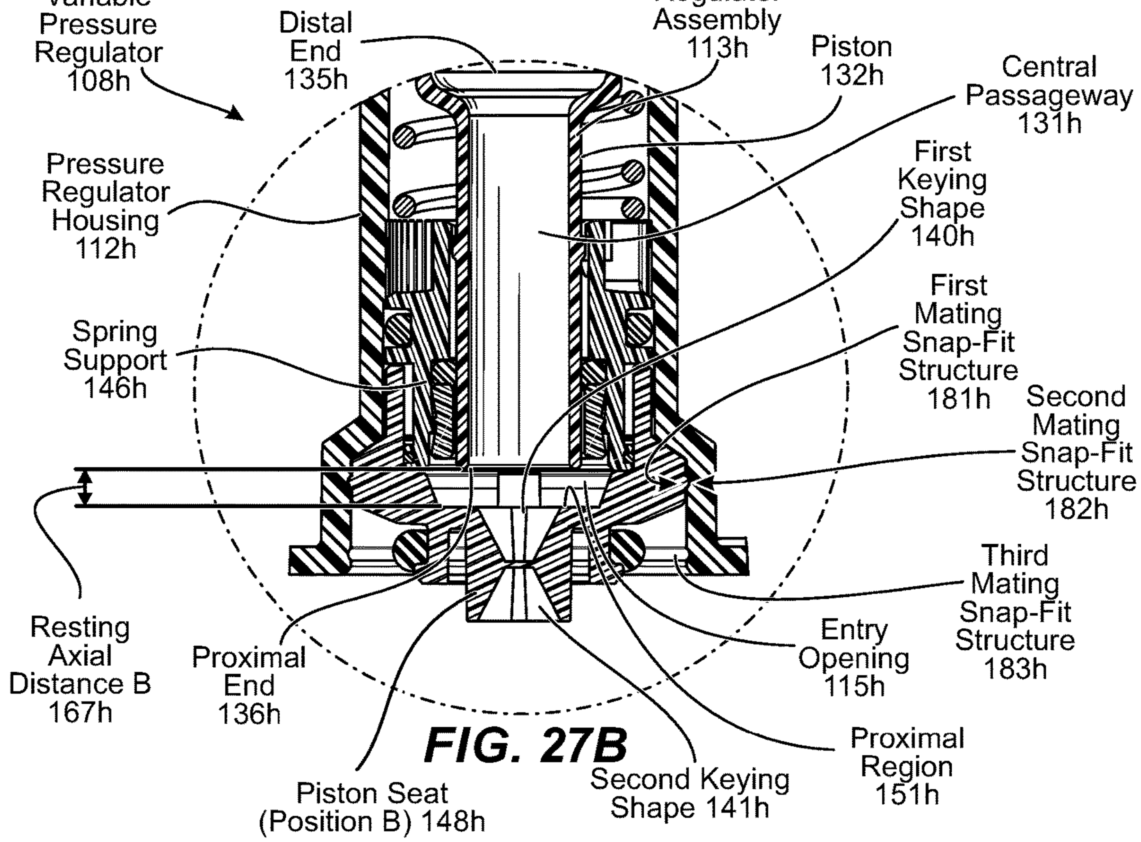

FIGS. 24A-27B illustrate an eighth embodiment of a variable pressure regulator 108*h* employed within a sprinkler 100*h*. These figures will be addressed collectively such that components may be labeled with reference numerals in one or more of the figures but not necessarily in all of these figures. Accordingly, some aspects of FIGS. 24A-27B may be described concurrently, while reference to specific figures may be explicitly indicated. FIGS. 24A-B comprise a perspective, exploded view of an eighth embodiment of a variable pressure regulator 108*h* with the outer housing of the sprinkler 100*h* comprising the pressure regulator housing 112*h*. FIGS. 25A-B comprise a perspective, exploded cross-sectional view of the eighth embodiment of the variable pressure regulator 108*h*. FIG. 26A is a side elevational view of the eighth embodiment of the variable pressure regulator 108*h*. FIG. 26B is a cross-sectional side elevational view of the eighth embodiment of the variable pressure regulator 108*h* taken across the line 26B-26B in FIG. 26A. FIGS. 27A-B comprise side elevational cross-sectional views of the region 27A, 27B of FIG. 26B of the eighth embodiment of the variable pressure regulator 108*h* in different user-specified positions and in a resting state.

This eighth embodiment of the variable pressure regulator 108*h* comprises an adjustment mechanism 137*h* employing a snap-fit mechanism (i.e., a snap-fit adjustment mechanism 137*h*). In this embodiment, the spring support 146*h* is fixedly attached to the pressure regulator housing 112*h* while the piston seat 148*h* may be in snap-fit engagement with the pressure regulator housing 112*h* at various positions along the axial dimension 119*a* of the sprinkler 100*h* to vary pressure (i.e., to alter the resting axial distance 166*h*, 167*h*). The snap-fit engagement is achieved using a first mating snap-fit structure 181*h* on the piston seat 148*h* that engages with either a second mating snap-fit structure 182*h* or a third mating snap-fit structure 183*h*.

Referring now collectively to FIGS. 24A-27B, the sprinkler 100*h* may include a pressure regulator housing 112*h*, a regulator spring 144*h*, a first piston seal 128*h*, a second piston seal 129*h*, a piston seat seal 152*h*, a piston 132*h*, a first spring support seal 142*h*, a spring support 146*h*, a piston seat 148*h*, a piston retainer 178*h* and/or second spring support seal 143*h*.

The pressure regulator housing 112*h* may comprise a pipe or channel to conduct pressurized fluid through the sprinkler 100*h* and house the pressure regulator assembly 113*h*. The pressure regulator housing 112*h* may include threads on a top portion of the pressure regulator housing 112*h* to allow engagement with a flush plug 118 or nozzle 176*e*. A nozzle 176*e* with an optional filter 177*e* and/or flush plug 118 may be secured to the pressure regulator housing 112*h* but has been omitted for simplicity in the illustrations of the eighth embodiment of the variable pressure regulator 108*h*. The pressurized fluid may be dispersed from a nozzle 176*e* secured to the top of the pressure regulator housing 112*h*.

The sprinkler 100*h* may comprise a pressure regulator assembly 113*h* disposed within the pressure regulator housing 112*h*. The pressure regulator assembly 113*h* may comprise a pressure regulator housing 112*h*, a regulator spring 144*h*, a first piston seal 128*h*, a second piston seal 129*h*, a piston seat seal 152*h*, a piston 132*h*, a first spring support seal 142*h*, a second spring support seal 143*h*, a spring support 146*h*, and a piston seat 148*h*. The pressure regulator assembly 113*h* may be disposed entirely or partially within the pressure regulator housing 112*h*.

The piston 132*h* may comprise a distal end 135*h* and a proximal end 136*h* with the proximal end 136*h* being closer to a proximal region 151*h* of the floor 150*h* of the piston seat 148*h* than the distal end 135*h* along the axial dimension 119*a* of the sprinkler 100*h* when the sprinkler 100*h* is assembled. (As noted above, the axial dimension 119*a* is the dimension along which fluid generally flows through the sprinkler 100*h*.) The proximal region 151*h* of the floor 150*h* may comprise that region of the floor 150*h* closest to the proximal end 136*h* of the piston 132*h* along the axial dimension 119*a*.

The pressure regulator assembly 113*h* may comprise a number of seals, namely, a first piston seal 128*h*, a second piston seal 129*h*, a first spring support seal 142*h*, a second spring support seal 143*h*, a piston seat seal 152*h* and/or piston retainer 178*h*. When assembled, the first piston seal 128*h* may be positioned within a first piston seal seat 160*h* of the piston 132*h*; the second piston seal 129*h* may be situated within the second piston seal seat 161*h* of the piston 132*h*; the first spring support seal 142*h* may be situated within the spring support seal seat 162*h* of the spring support 146*h*; a second spring support seal 143*h* may be positioned within a second spring support seal seat 164*h*; and/or the piston seat seal 152*h* may be situated within the piston seat seal seat 163*h* of the piston seat 148*h*. These seals 128*h*, 129*h*, 142*h*, 143*h*, 152*h* form a fluid-tight or nearly fluid-tight seal at the various locations to enable pressurized fluid to flow through the sprinkler 100*h* without being diverted to undesired pathways or locations.

The regulator spring 144*h* engages the piston 132*h* and the spring support 146*h* to bias the piston 132*h* away from the spring support 146*h*. The regulator spring 144*h* aids in the regulation of pressure of fluid passing through the sprinkler 100*h*, as will be explained below.

The piston seat 148*h* may comprise one or more entry openings 115*h* and a floor 150*h* comprising a proximal region 151*h*. As noted above, the proximal region 151*h* may comprise that portion of the floor 150*h* that is closest to the proximal end 136*h* of the piston 132*h*. In various embodiments, the proximal region 151*h* may comprise the entirety of the floor 150*h* or only a portion of the floor 150*h*. Fluid entering the sprinkler 100*h* may pass through the one or more entry openings 115*h*.

The variable pressure regulator 108*h* may comprise an adjustment mechanism 137*h* to alter the pressure of fluid flowing through the sprinkler 100*h*. In the embodiment illustrated in these figures (FIGS. 24A-27B), the adjustment mechanism 137*h* may comprise a first mating snap-fit structure 181*h* on the piston seat 148*h*, a second mating snap-fit structure 182*h* on the pressure regulator housing 112*h*, and a third mating snap-fit structure 183*h* on the pressure regulator housing 112*h*. The first mating snap-fit structure 181*h* may mate with and engage either the second mating snap-fit structure 182*h* or the third mating snap-fit structure 183*h*. The second mating snap-fit structure 182*h* or the third mating snap-fit structure 183*h* are located at different positions along the axial dimension 119*a*. A force may be applied to push the piston seat 148*h* using either the first keying shape 140*h* or the second keying shape 141*h* using a tool (e.g., any type of elongate item) to engage either the second mating snap-fit structure 182*h* or the third mating snap-fit structure 183*h* to alter a distance intermediate the proximal end 136*h* of the piston 132*h* and the proximal region 151*h* of the floor 150*h* when the sprinkler 100*h* is in a resting state. (This distance may be referred to as a resting axial distance 166*h*, 167*h*, which is illustrated in FIGS. 27A-27B.) Accordingly, the position of the proximal region 151*h* of the floor 150*h* along the axial dimension 119*a* may be altered employing the adjustment mechanism 137*h*. The illustrated adjustment mechanism 137*h* comprises one embodiment of a snap-fit adjustment mechanism 137*h*.

The first mating snap-fit structure 181*h* may comprise, for example, one or more protrusions or recesses (e.g., an annular recess or protrusion) that mate with and engage the second mating snap-fit structure 182*h* and the third mating snap-fit structure 183*h* which may likewise comprise one or more protrusions or recesses so long as these structures mutually engage. Thus, the first mating snap-fit structure 181*h*, the second mating snap-fit structure 182*h*, and the third mating snap-fit structure 183*h* may be inwardly or outwardly projecting and may be configured in a number of different ways within the scope of the disclosed and claimed subject matter.

The piston seat 148*h* may include a first keying shape 140*h* and a second keying shape 141*h* to engage with a tool, which may comprise, for example, a screwdriver having a standard head or Phillips head, or an Allen wrench having a hexagonal-shaped head. In the eighth embodiment, the first keying shape 140*h* may be accessed from a top of the sprinkler 100*h* (such as by removing a nozzle and a filter) to engage and move the piston seat 148*h* and alter the resting axial distance 166*h*, 167*h* using a tool (such as the tool 179*h*). The second keying shape 141*h* may be accessed from a bottom of the sprinkler 100*h* to engage and move the piston seat 148*h* and alter the resting axial distance 166*h*, 167*h* using a tool (such as the tool 180*h*).

Referring once again collectively to FIGS. 24A-27B, the eighth embodiment may comprise a piston retainer 178*h*. The piston retainer 178*h* engages the spring support 146*h* (such as by a mating ridge and recess) and contacts the piston 132*h*. The piston retainer 178*h* together with the spring support 146*h* and piston 132*h* define an enclosure for the second piston seal 129*h*, as best seen in FIGS. 27A and 27B.

Referring now specifically to FIGS. 27A-27B, altering a position of the piston seat 148*h* along the axial dimension 119*a* may change the pressure of the pressurized fluid exiting the sprinkler 100*h* when the sprinkler 100*h* is in an operating state. For example, as the piston seat 148*h* is directed toward the proximal end 136*a*, entry openings 115*h* in the piston seat 148*h* may be at least partially obstructed, resulting in a reduction in pressure during operation (i.e., the pressure of the equilibrium state is reduced during operation of the sprinkler 100*h*). As the piston seat 148*h* is directed away from the proximal end 136*a*, the entry openings 115*h* in the piston seat 148*h* are less obstructed, thereby increasing the pressure of fluid exiting the sprinkler 100*h*. Thus, employing the first keying shape 140*h* and/or second keying shape 141*h*, the piston seat 148*h* may be repositioned to alter pressure of fluid exiting the sprinkler 100*h* in an operating state.

The regulator spring 144*h* applies a force in a downstream direction 109*a* to the piston 132*h* along the axial dimension 119*a* (i.e., the regulator spring 144*h* pushes the piston 132*h* away from the spring support 146*h* in a downstream direction 109*a*). In an operating state (with a pressurized fluid passing through the sprinkler 100*h*), a nozzle reduces the outflow of the fluid from the sprinkler 100*h* and creates a pressurized chamber downstream of the piston 132*h*. Pressure resulting from this pressurized chamber, if sufficient, may cause the piston 132*h* to move axially upstream (i.e., toward the spring support 146*h* in an upstream direction 111*a*) until an equilibrium state is reached in response to the counterbalancing axial force applied by the regulator spring 144*h*. Altering a position of the piston seat 148*h* along the axial dimension 119*a* may reduce, increase, or alter fluid flowing through entry openings 115*h* in the piston seat 148*h* to increase, restrict, or alter the movement of fluid through the entry openings 115*h* in the piston seat 148*h*, thereby causing an equilibrium to be reached at a lower or higher pressurized state. Thus, a variable pressure regulator 108*h*, which may comprise the pressure regulator housing 112*h* and the pressure regulator assembly 113*h*, may operate to alter the pressure of fluid exiting the sprinkler 100*h*. In various embodiments, the variable pressure regulator 108*h* may be designed to alter pressure between approximately 30 psi and 40 psi. (As used herein, "approximately" means plus or minus 5 psi.)

Referring still specifically to FIGS. 27A-27B, an enlarged view of a portion of the sprinkler 100*h* is illustrated in two user-controlled positions in a resting state. More specifically, FIG. 27A illustrates the piston seat 148*h* in position A with a resting axial distance A 166*h*, while FIG. 27B illustrates the piston seat 148*h* in position B with a resting axial distance B 167*h*. As illustrated, in an operating state, fluid flows through the entry openings 115*h* of the piston seat 148*h* through the central passageway 131*h* (defined by the variable pressure regulator 108*h*) and exits the one or more exit openings 117*h* at a distal end 135*h* of the piston 132*h*.

As indicated in FIG. 27A, in an operating state with the piston seat 148*h* in position A, the pressurized fluid may flow through the pressure regulator housing 112*h* of the sprinkler 100*h* without pressure reduction or with less restriction than when the piston seat 148*h* is in position B. In FIG. 27B, the piston seat 148*h* is illustrated in position B. As can be observed, the proximal end 136*h* of the piston 132*h* extends further into the central passageway 131*h* and toward the piston seat 148*h*, causing the resting axial distance 167*h* between the proximal region 151*h* of the floor 150*h* and the proximal end 136*h* of the piston 132*h* to decrease, resulting in a reduction in pressure during operation (i.e., the pressure of the equilibrium state is reduced during operation of the sprinkler 100*h*). The full extent of the variation of the position of the piston seat 148*h* relative to the piston 132*h* may be altered within the scope of the disclosed subject matter (i.e., beyond the variation illustrated in FIGS. 27A-27B). In other words, the resting axial distance A 166*h* and resting axial distance B 167*h* shown in FIGS. 27A-27B are merely illustrative.

It should be noted that the eighth embodiment shown in FIGS. 24A-27B is merely illustrative. Those skilled in the art will appreciate that many features of the disclosed eighth embodiment may be varied within the scope of the claimed and disclosed subject matter. For example, the shape of the piston 132*h* may be varied which may alter how and the extent to which the piston 132*h* responds to upstream pressure.

It should be noted that each of the embodiments disclosed herein is merely illustrative. As indicated above, for example, the shape of the piston 132 may be varied within the scope of the disclosed in the claimed subject matter. Other items may be varied within the scope of the disclosed subject matter, such as the type of nozzles, springs, and seals (e.g., O-rings or different types of seals) employed.

A method is disclosed herein in which the variable pressure regulator 108 comprises a keying shape 140*b*-140*e*, 140*h*, 141*e*, 141*h* for receiving and engaging a tool 179*e*, 180*e*. The keying shape 140*b*-140*e*, 140*h*, 141*e*, 141*h* may be disposed on a user-adjustable portion (e.g., a piston extender 134*b*, an adjustable seat floor 153*c*-153*d*, a piston seat 148*e*, or a piston seat 148*h*) of the adjustment mechanism 137*b*-137*e*, 137*h*. The method may comprise positioning the tool 179*e*, 180*e* to engage the keying shape 140*b*-140*e*, 140*h*, 141*e*, 141*h*. The method may further comprise, employing the engagement between the tool 179*e*, 180*e* and the keying shape 140*b*-140*e*, 140*h*, 141*e*, 141*h* to adjust the position of the user-adjustable portion (e.g., a piston extender 134*b*, an adjustable seat floor 153*c*-153*d*, a piston seat 148*e*, or a piston seat 148*h*) of the adjustment mechanism 137*b*-137*e*, 137*h* to alter the resting axial distance 166*b*-166*e*, 166*h*, 167*b*-167*e*, 167*h*.

Within the method, positioning a tool 179*e*, 180*e* to engage the keying shape 140*d*, 141*e*, 141*h* may comprise inserting the tool 179*e*, 180*e* through a bottom opening (e.g., an input coupling 114*a*, 114*e*) of the sprinkler 100*a-f*, 100*h* to engage the keying shape 140*d*, 141*e*, 141*h*.

Within the method, positioning the tool 179*e*, 180*e* to engage the keying shape 140*b*-140*c*, 140*e*, 140*h* may comprise removing a top portion (e.g., a nozzle 176*e* or flush plug 118*a*-118*d*) of the sprinkler 100*a*-100*f*, 100*h*, and inserting the tool 179*e*, 180*e* through a top opening created by removing a top portion (e.g., a nozzle 176*e* or flush plug 118*a*-118*d*) of the sprinkler 100*a*-100*f*, 100*h* to engage the keying shape 140*b*-140*c*, 140*e*, 140*h*.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed. For example, various embodiments of the adjustment mechanism disclosed herein may be employed in a single product.

What is claimed is:

1. A variable pressure regulator having an axial dimension and a lateral dimension, the variable pressure regulator comprising:

a pressure regulator housing;

a pressure regulator assembly disposed within the pressure regulator housing, the pressure regulator assembly comprising a piston, a regulator spring, a spring support, and a piston seat, the piston being movable along the axial dimension in response to the regulator spring and fluid pressure when the variable pressure regulator is in an operational state;

the piston seat comprising one or more entry openings and a floor, the floor comprising a proximal region;

the piston comprising a proximal end and a distal end, the proximal end being closer to the floor of the piston seat than the distal end along the axial dimension, the proximal region of the floor comprising that region of the floor closest to the proximal end of the piston along the axial dimension;

wherein the regulator spring biases the piston away from the spring support, wherein the pressure regulator assembly defines a central passageway in fluid communication with the one or more entry openings; and the pressure regulator assembly further comprising an adjustment mechanism shaped and arranged to alter a resting axial distance intermediate the proximal end of the piston and the proximal region of the floor when the variable pressure regulator is in a resting state.

2. The variable pressure regulator of claim 1, wherein the adjustment mechanism is selected from a group consisting of a threaded adjustment mechanism and a snap-fit adjustment mechanism.

3. The variable pressure regulator of claim 1, wherein the adjustment mechanism is shaped and arranged to change a position of the spring support with respect to the piston seat along the axial dimension to alter the resting axial distance.

4. The variable pressure regulator of claim 3, wherein the adjustment mechanism comprises a first set of threads on the piston seat and a second set of threads on the spring support, the first and second sets of threads being in mutual engagement such that rotational movement of the piston seat relative to the spring support alters the resting axial distance.

5. The variable pressure regulator of claim 1, wherein the piston comprises a piston body and a piston extender, and the adjustment mechanism is shaped and arranged to change a position of the piston extender with respect to the piston body along the axial dimension to alter the resting axial distance.

6. The variable pressure regulator of claim 5, wherein the adjustment mechanism comprises a first set of threads on the piston body and a second set of threads on the piston extender, the first and second sets of threads being in mutual engagement such that rotational movement of the piston extender relative to the piston body alters the resting axial distance.

7. The variable pressure regulator of claim 1, wherein the piston seat comprises a piston seat body and an adjustable seat floor, and the adjustment mechanism is shaped and arranged to change a position of the adjustable seat floor with respect to the piston seat body along the axial dimension to alter the resting axial distance.

8. The variable pressure regulator of claim 7, wherein the adjustment mechanism comprises a first set of threads on the piston seat body and a second set of threads on the adjustable seat floor, the first and the second set of threads being in mutual engagement such that rotational movement of the adjustable seat floor alters the resting axial distance.

9. The variable pressure regulator of claim 8, wherein the adjustable seat floor comprises a planar end.

10. The variable pressure regulator of claim 9, wherein the adjustable seat floor comprises the planar end disposed on a frustoconical section.

11. A variable pressure regulator having an axial dimension and a lateral dimension, the variable pressure regulator comprising:

a pressure regulator housing;

a pressure regulator assembly disposed within the pressure regulator housing, the pressure regulator assembly comprising a piston and a piston seat, the piston being movable along the axial dimension when the variable pressure regulator is in an operational state;

the piston seat comprising a floor, the floor comprising a proximal region;

the piston comprising a proximal end and a distal end, the proximal end being closer to the floor of the piston seat than the distal end along the axial dimension, the proximal region of the floor comprising that region of the floor closest to the proximal end of the piston along the axial dimension; and the pressure regulator assembly further comprising an adjustment mechanism shaped and arranged to alter a resting axial distance intermediate the proximal end of the piston and the proximal region of the floor when the pressure regulator is in a resting state.

12. The variable pressure regulator of claim 11, wherein the pressure regulator assembly further comprises a regulator spring and a spring support, wherein the regulator spring biases the piston away from the spring support, wherein the piston is movable along the axial dimension in response to the regulator spring and fluid pressure when the variable pressure regulator is in the operational state and wherein the adjustment mechanism is shaped and arranged to change a position of the spring support with respect to the piston seat to alter the resting axial distance.

13. The variable pressure regulator of claim 12, wherein the adjustment mechanism comprises a first set of threads on the piston seat and a second set of threads on the spring support, the first and second sets of threads being in mutual engagement such that rotational movement of the piston seat relative to the spring support alters the resting axial distance.

14. The variable pressure regulator of claim 11, wherein the piston comprises a piston body and a piston extender, and the adjustment mechanism is shaped and arranged to change a position of the piston extender with respect to the piston body along the axial dimension to alter the resting axial distance.

15. The variable pressure regulator of claim 14, wherein the adjustment mechanism comprises a first set of threads on the piston body and a second set of threads on the piston extender, the first and second sets of threads being in mutual engagement such that rotational movement of the piston extender relative to the piston body alters the resting axial distance.

16. The variable pressure regulator of claim 11, wherein the piston seat comprises a piston seat body and an adjustable seat floor, and the adjustment mechanism is shaped and arranged to change a position of the adjustable seat floor with respect to the piston seat body along the axial dimension to alter the resting axial distance.

17. A method of adjusting pressure in the variable pressure regulator of claim 11, wherein the variable pressure regulator comprises a keying shape for receiving and engaging a tool, the keying shape being disposed on a user-adjustable portion of the adjustment mechanism, the method comprising:

positioning the tool to engage the keying shape; and employing the engagement between the tool and the keying shape, adjusting a position of the user-adjustable portion of the adjustment mechanism to alter the resting axial distance.

18. A variable pressure regulator having an axial dimension and a lateral dimension, the variable pressure regulator comprising:

a pressure regulator housing;

a pressure regulator assembly disposed within the pressure regulator housing, the pressure regulator assembly comprising a piston and a piston seat, the piston being movable along the axial dimension when the variable pressure regulator is in an operational state;

the piston seat comprising a floor, the floor comprising a proximal region;

the piston comprising a proximal end and a distal end, the proximal end being closer to the floor of the piston seat than the distal end along the axial dimension, the proximal region of the floor comprising that region of the floor closest to the proximal end of the piston along the axial dimension; and the pressure regulator assembly further comprising an adjustment mechanism shaped and arranged to alter a resting axial distance intermediate the proximal end of the piston and the proximal region of the floor when the pressure regulator is in a resting state, wherein the adjustment mechanism is selected from a group consisting of a threaded adjustment mechanism and a snap-fit adjustment mechanism.

19. The variable pressure regulator of claim 18, wherein the pressure regulator assembly further comprises a regulator spring and a spring support, wherein the regulator spring biases the piston away from the spring support, wherein the piston is movable along the axial dimension in response to the regulator spring and fluid pressure when the variable pressure regulator is in the operational state and wherein the adjustment mechanism is shaped and arranged to change a position of the spring support with respect to the piston seat to alter the resting axial distance.

20. The variable pressure regulator of claim 18, wherein the adjustment mechanism comprises a first set of threads on the piston seat and a second set of threads on the spring support, the first and second sets of threads being in mutual engagement such that rotational movement of the piston seat relative to the spring support alters the resting axial distance.

* * * * *